US011674384B2

(12) United States Patent
Li et al.

(10) Patent No.: US 11,674,384 B2
(45) Date of Patent: Jun. 13, 2023

(54) CONTROLLER OPTIMIZATION VIA REINFORCEMENT LEARNING ON ASSET AVATAR

(71) Applicant: Schlumberger Technology Corporation, Sugar Land, TX (US)

(72) Inventors: Ziyao Li, Houston, TX (US); Paul Muller, Le Perreux sur Marne (FR); Prasanna Nirgudkar, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 372 days.

(21) Appl. No.: 16/878,692

(22) Filed: May 20, 2020

(65) Prior Publication Data
US 2020/0370423 A1 Nov. 26, 2020

Related U.S. Application Data

(60) Provisional application No. 62/850,261, filed on May 20, 2019.

(51) Int. Cl.
*G05B 13/02* (2006.01)
*E21B 47/12* (2012.01)
*G05B 13/04* (2006.01)
*E21B 47/008* (2012.01)
*G06N 3/08* (2023.01)

(52) U.S. Cl.
CPC ............ *E21B 47/12* (2013.01); *E21B 47/008* (2020.05); *G05B 13/027* (2013.01); *G05B 13/041* (2013.01); *G06N 3/08* (2013.01)

(58) Field of Classification Search
CPC ..... E21B 47/12; E21B 47/008; G05B 13/027; G05B 13/041; G06N 3/08
See application file for complete search history.

(56) References Cited

U.S. PATENT DOCUMENTS

| 5,832,468 | A | * | 11/1998 | Miller | .................. | G05B 13/027 |
| | | | | | | 706/23 |
| 7,397,363 | B2 | | 7/2008 | Joao | | |
| 8,154,419 | B2 | | 4/2012 | Daussin et al. | | |
| 8,616,274 | B2 | | 12/2013 | Belcher et al. | | |
| 9,074,468 | B1 | | 7/2015 | Selman et al. | | |
| 9,253,454 | B2 | | 2/2016 | Hobbs et al. | | |
| 9,297,250 | B2 | | 3/2016 | Dusterhoft et al. | | |

(Continued)

FOREIGN PATENT DOCUMENTS

EP 1637695 A1 3/2006
WO 2018125176 A1 7/2018
(Continued)

OTHER PUBLICATIONS

Minih et al., "Human-leval Control through Deep Reinforcement Learning", Nature, Feb. 26, 2016, vol. 518, pp. 529-533.
(Continued)

*Primary Examiner* — Gary Collins

(57) ABSTRACT

A method can include receiving sensor data from a system; encoding the sensor data to a latent space representation via a trained encoder; generating a control action using the latent space representation; and issuing an instruction that corresponds to the control action for control of the system.

19 Claims, 32 Drawing Sheets

(56) References Cited

U.S. PATENT DOCUMENTS

| | | |
|---|---|---|
| 9,650,865 B2 | 5/2017 | Kim et al. |
| 9,759,061 B2 | 9/2017 | Lerner et al. |
| 9,921,338 B2 | 3/2018 | Embid Droz et al. |
| 9,933,791 B2 | 4/2018 | Lucas et al. |
| 9,957,780 B2 | 5/2018 | Knecht et al. |
| 10,067,973 B2 | 9/2018 | Moore |
| 10,253,599 B2 | 4/2019 | Dykstra et al. |
| 10,260,327 B2 | 4/2019 | Kajaria et al. |
| 10,408,021 B2 | 9/2019 | Dykstra et al. |
| 2002/0120401 A1* | 8/2002 | Macdonald ............ E21B 44/005 702/6 |
| 2009/0222136 A1* | 9/2009 | Lou ........................ G05B 13/04 700/289 |
| 2015/0060044 A1 | 3/2015 | Scharmach et al. |
| 2016/0102528 A1 | 4/2016 | Wise et al. |
| 2017/0328194 A1* | 11/2017 | Liu ........................ G06N 3/0454 |
| 2018/0025269 A1* | 1/2018 | Dursun .................. E21B 41/00 175/24 |
| 2018/0238164 A1* | 8/2018 | Jamison ................ G06Q 10/10 |
| 2019/0112910 A1* | 4/2019 | Oehring ................ E21B 41/00 |
| 2019/0120024 A1 | 4/2019 | Oehring et al. |
| 2019/0169986 A1* | 6/2019 | Storm, Jr ............... E21B 49/00 |
| 2019/0206007 A1 | 7/2019 | Leach |
| 2019/0228110 A1* | 7/2019 | Yan ........................ G06N 3/0472 |
| 2019/0234207 A1* | 8/2019 | Subramaniyan ..... G05B 13/048 |
| 2019/0287005 A1* | 9/2019 | Subramaniyan ........ G06F 30/20 |
| 2019/0292891 A1 | 9/2019 | Kajaria et al. |
| 2019/0330975 A1 | 10/2019 | Martysevich et al. |
| 2019/0331100 A1 | 10/2019 | Gable et al. |
| 2020/0056466 A1 | 2/2020 | Mazrooee et al. |
| 2020/0183046 A1* | 6/2020 | Wheelock ............ G01V 99/005 |
| 2021/0148213 A1* | 5/2021 | Madasu .................. E21B 44/00 |

FOREIGN PATENT DOCUMENTS

| | | |
|---|---|---|
| WO | 2018136052 A1 | 7/2018 |
| WO | 2018143918 A1 | 8/2018 |
| WO | 2019117862 A1 | 6/2019 |

OTHER PUBLICATIONS

Van Hasselt et al., "Deep Reinforcement Learning with Double Q-Learning", Proceedings of the Thirtieth AAAI Conference on Artificial Intelligence (AAAI-16), 2016, pp. 2094-2100.

Wang et al., "Dueling Network Architectures for Deep Reinforcement Learning", arXiv preprint arXiv:1511.06581 (2015), Apr. 5, 2016, 15 pages.

* cited by examiner

Pump System 700

Diesel Engine 710

Engine Sensors 800

Some Examples:

Load
Shaft Speed
Cam Speed
Coolant Temp.
Fuel Temp.
Leak Fuel level
Oil Refill Pump Pressure
Exhaust Temp. by Cylinder
Lube Oil Pressure after filter
Lube Oil Pressure before filter
Fuel Pressure in Common Rail Lube Oil Temp.
Crankcase Pressure
Intake Air Temp.
Main Bearing Temp.
Other Pump 1000

Method 1710

Method 1750

Plot 1910 (Model Transient State Error Characterization)

Plot 1930 (Model Steady State Error Characterization)

Method 2010

MRC

Method 2050

MRC + PumpIQ

Training Method 2100

Inference Method 2105

CONTROLLER OPTIMIZATION VIA REINFORCEMENT LEARNING ON ASSET AVATAR

RELATED APPLICATION

This application claims priority to and the benefit of a U.S. Provisional Application having Ser. No. 62/850,261, filed 20 May 2019, which is incorporated by reference herein.

BACKGROUND

Various field operations can include controllable equipment. For example, a controller can be operatively coupled to one or more pieces of equipment to control one or more actions thereof. A controller may be a tunable controller with various types of parameters for control such as a proportional, integral and/or derivative control (e.g., PI, PID, etc.). Controller tuning may aim to optimize a controller for control of equipment. For a PI controller, tuning constants include controller gain and the integral time constants. Tuning of controller gain and integral time constants, to provide a tuned fixed equation PI controller, can be a manual, iterative trial and error process performed with the controller controlling physical equipment during operation where approximate values of the constants can be initially entered and then tuned by introducing a setpoint change and observing a response.

SUMMARY

A method can include receiving sensor data from a system; encoding the sensor data to a latent space representation via a trained encoder; generating a control action using the latent space representation; and issuing an instruction that corresponds to the control action for control of the system. A system can include a real time data interface; a compressor operatively coupled to the real time data interface; and a controller operatively coupled to the compressor, wherein the compressor receives real time data via the real time data interface and outputs reduced dimensionality data of the real time data and where the controller generates a control action using the reduced dimensionality data. One or more computer-readable storage media can include processor-executable instructions executable to instruct a computing system to: receive sensor data from a system; encode the sensor data to a latent space representation via a trained encoder; generate a control action using the latent space representation; and issue an instruction that corresponds to the control action for control of the system. Various other methods, systems, etc. are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
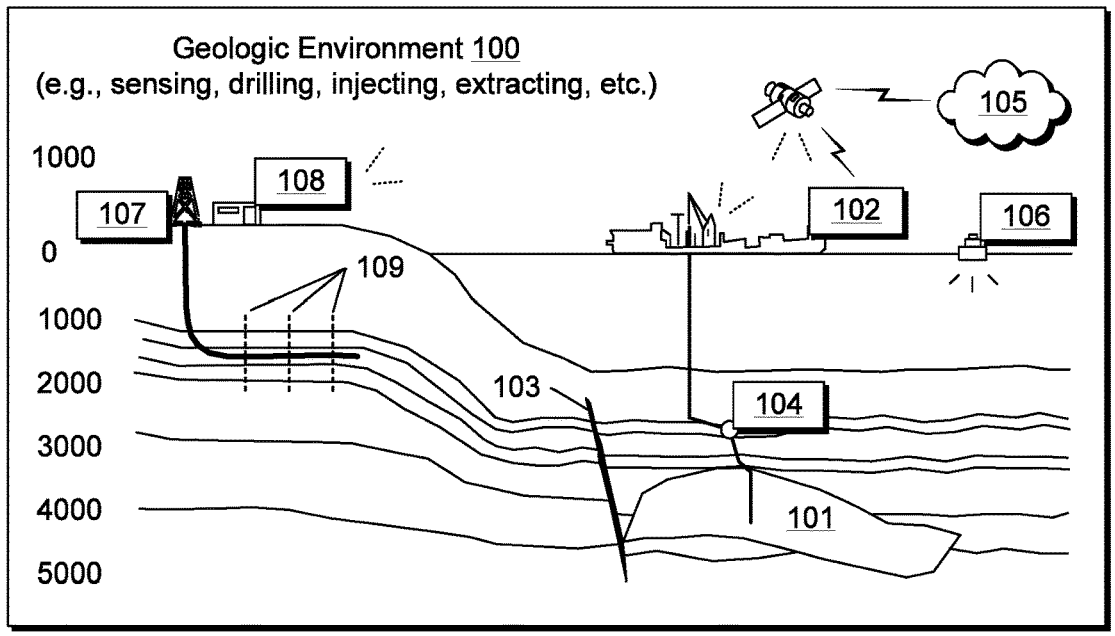
FIG. 1 illustrates an example of a geologic environment and an example of a technique.
Figure 1:
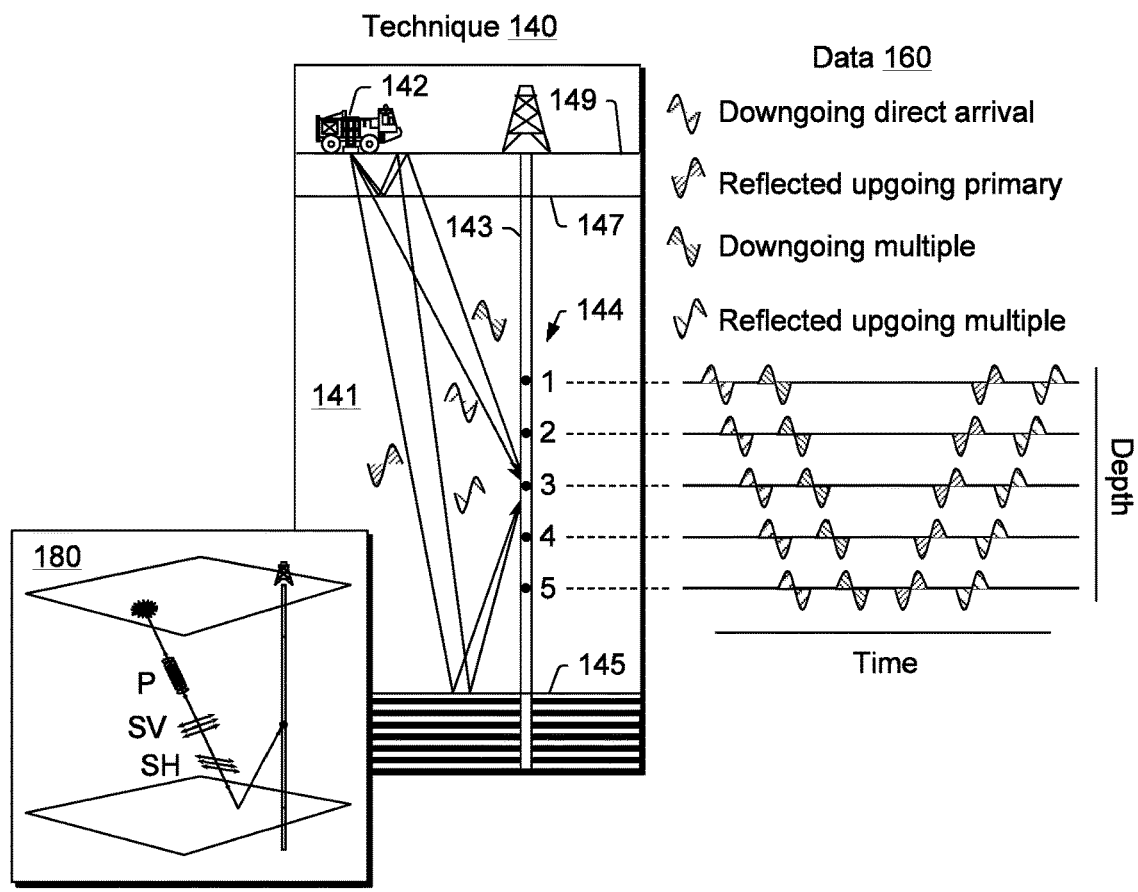

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As mentioned, various field operations can include controllable equipment. For example, a controller can be operatively coupled to one or more pieces of equipment to control one or more actions thereof. As mentioned, tuning, to provide a tuned controller, can be a manual iterative trial and error process. Further, once tuned, a controller may operate in a "fixed" manner for control according to a couple of constants (e.g., gain and integral time constant). Such a controller may be sub-optimal for various types of equipment, particularly equipment that may experience changes over time. For example, where one or more pieces of equipment wear, a fixed constant approach may become less acceptable and/or demand re-tuning, the latter of which can involve taking a controller off-line resulting in non-productive time (NPT).

In various examples, a controller can be optimized via reinforcement learning on one or more asset avatars. Such an approach can generate an optimized controller. Such a controller can operate to account for various factors, which may include factors pertaining to changes that may occur for equipment, a process or processes to be controlled, environmental factors, etc. As an example, a controller can be an optimized controller that can account for prognostics and health management (PHM). For example, a controller may be optimized such that control is effectuated in a manner that accounts for one or more operational goals that are to be achieved by equipment that can wear, fail, etc., which may give rise to risk of meeting such one or more operational goals. As an example, a controller may be optimized such that control is effectuated in a manner that accounts for energy utilization (e.g., electrical power, fuel, etc.). As an example, a controller may be optimized such that control is effectuated to account for various factors, which can include PHM factors, energy factors, process factors, environmental factors, etc.

As mentioned, a controller can be optimized using an asset avatar. An asset avatar can be a digital representation of a physical asset. An asset may be a piece of equipment or pieces of equipment. An asset may be an assembly or a system.

As mentioned, a controller can be optimized using reinforcement learning (RL), which is an area of machine learning (ML) concerned with taking actions in an environment that aims to maximize some notion of reward or rewards (e.g., consider cumulative reward, etc.). As an example, RL can differ from supervised learning in that RL may occur without labelled input/output pairs and in that sub-optimal actions do not demand explicit handling (e.g., adjustment). As an example, in RL, a focus can be on finding a balance between exploration (e.g., exploration of uncharted territory) and exploitation (e.g., exploitation of current knowledge).

As an example, an approach to control can involve policy. For example, an approach can aim to find a policy with maximum expected return. As an example, an approach can involve policy identification via a mapping from a set of states to a set of actions. As an example, an approach can involve transfer. For example, learning can occur with a digital avatar to generate a trained controller (e.g., an optimized controller) where the trained controller is applied to a physical asset. In such an example, policy transfer may be employed. For example, a policy can be a digital avatar policy that is transferred to a physical asset.

As an example, a digital avatar can be generated using data from operations performed by one or more physical assets. A digital avatar can be utilized in a workflow that involves RL for controller optimization, for example, to generate an optimized controller. Such an optimized controller can be utilized to control equipment (e.g., a physical asset or assets) for one or more operations. Such an implementation of an optimized controller may, for example, operate with or without use of the digital avatar. For example, a digital avatar may be utilized in parallel with an optimized controller for one or more purposes.

As an example, an optimized controller can include a processor (e.g., one or more cores), memory and instructions executable by the processor. Such an optimized controller can include a compressor (e.g., an encoder) that compresses (e.g., encodes) input from an input dimensional space to a lesser dimensional space where the compressed input is received by a trained machine model (ML) that can output one or more actions. In such an example, one or more of the one or more actions may be considered as being appropriate to control equipment. In such an example, an action may be issued to equipment directly and/or indirectly (e.g., subject to analysis, etc.). As an example, an optimized controller can be operatively coupled to equipment directly and/or indirectly. As an example, an optimized controller may be operatively coupled to a master controller, which can include one or more interfaces that are operatively coupled to one or more pieces of equipment to be controlled.

In describing controller optimization via reinforcement learning (RL) on an asset avatar, various examples refer to equipment suitable for pumping fluid; noting that other types of equipment may be physical assets with corresponding digital avatars and/or that transfer learning may be utilized where one type of digital avatar of a physical asset may be a proxy for another type of physical asset.

As to pumping fluid, consider, as an example, hydraulic fracturing operations that can include pumping fluid into a borehole in a formation to generate fractures in the formation. Such pumping can utilize a pump driven by an internal combustion engine where a drive shaft of the internal combustion engine can be operatively coupled to a transmission, which can include various gears that can gear-up or gear-down rotational speed of the drive shaft of the internal combustion engine in a manner that aims to effectively control a pump shaft to achieve one or more desirable pumping parameters (e.g., pump pressure, pump flow rate, etc.). While a single pump is mentioned, a field operation can involve a fleet of pumps where each pump may be mounted on a trailer along with an internal combustion engine and a transmission. A fleet operation can pump fluid to a manifold or manifolds, mixing equipment, etc. A fleet can include homogenous equipment or heterogeneous equipment. For example, a fleet can include a plurality of trailers that include equipment with common specifications or with at least some differing specifications. Further, even where equipment has common specifications, there can be differences in history and/or manufactured specifications from unit to unit, system to system, etc. In some instances, each pump system in a fleet may differ and possess its own characteristics, peculiarities, behaviors, etc. Such a fleet can make unified control problematic, which can result in suboptimal pumping, suboptimal hydraulic fracture generation, suboptimal equipment usage, etc. As explained herein, controller optimization via reinforcement learning (RL) on a digital avatar can be utilized to generate an optimized controller that can be utilized to control a fleet.

Figure 12:
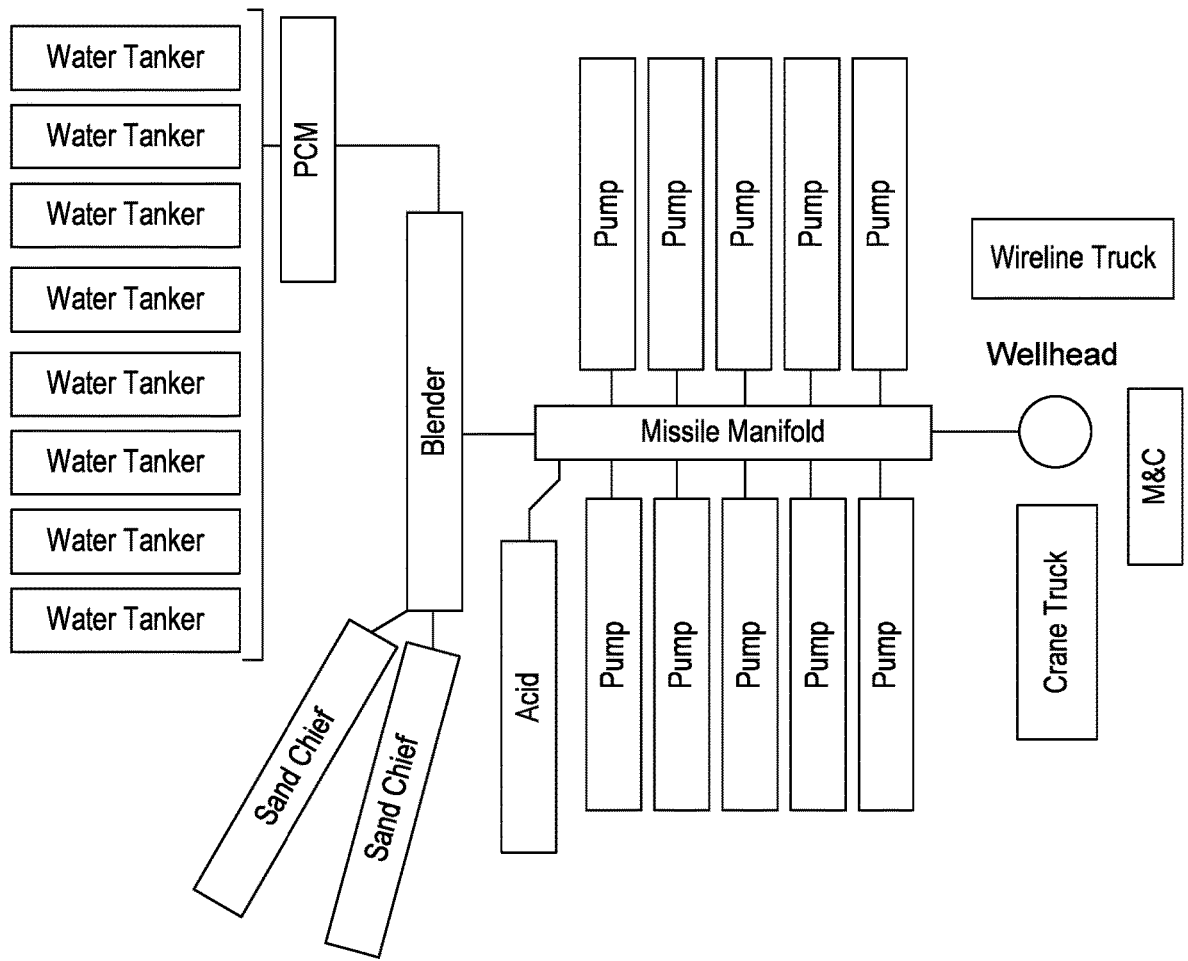
FIG. 12 illustrates an example of a system.
Figure 13:
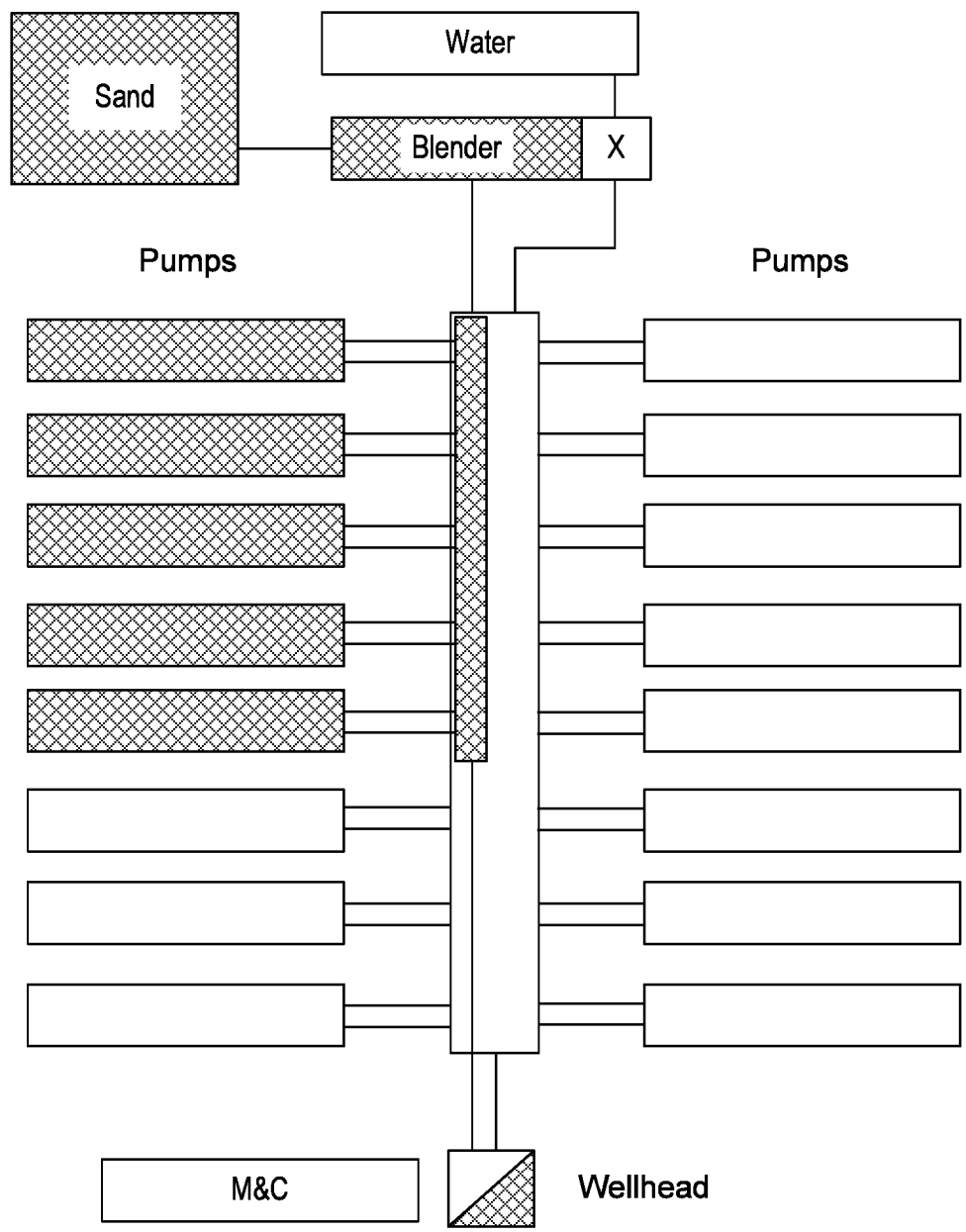
FIG. 13 illustrates an example of a system.

FIGS. 1 to 6 are described with respect to some examples of operations, equipment, etc., that can be performed, utilized, etc., in hydraulic fracturing. FIGS. 7 to 11 are described with respect to some examples of equipment that can be represented in digital form, for example, as one or more digital avatars. FIGS. 12 and 13 are described with respect to some examples of field equipment, which may be arranged with respect to a well (e.g., a wellhead) for performing one or more types of treatments such as one or more types of hydraulic fracturing or related treatments. Various examples of methods, systems, etc., are shown and described, which include examples of methods of controller optimization via a RL and digital avatar and examples of optimized controllers.

FIG. 1 shows an example of a geologic environment 100 (e.g., an environment that includes a sedimentary basin, a reservoir 101, a fault 103, one or more fractures 109, etc.) and an example of an acquisition technique 140 to acquire seismic data. As an example, a system may process data acquired by the technique 140, for example, to allow for direct or indirect management of sensing, drilling, injecting, extracting, etc., with respect to the geologic environment 100. In turn, further information about the geologic environment 100 may become available as feedback (e.g., optionally as input to the system). As an example, an operation may pertain to a reservoir that exists in the geologic environment 100 such as, for example, the reservoir 101. As an example, a technique may provide information (e.g., as an output) that may specifies one or more location coordinate of a feature in a geologic environment, one or more characteristics of a feature in a geologic environment, etc.

As an example, a system may include features of a simulation framework such as the PETREL seismic to simulation software framework (Schlumberger Limited, Houston, Tex.). The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of simulating a geologic environment, decision making, operational control, etc.).

As an example, a system may include add-ons or plug-ins that operate according to specifications of a framework environment. For example, a framework environment marketed as the OCEAN framework environment (Schlumberger Limited, Houston, Tex.) allows for integration of add-ons (or plug-ins) into a PETREL framework workflow. The OCEAN framework environment leverages .NET tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework may be implemented within or in a manner operatively coupled to the DELFI cognitive exploration and production (E&P) environment (Schlumberger Limited, Houston, Tex.), which is a secure, cognitive, cloud-based collaborative environment that integrates data and workflows with digital technologies, such as artificial intelligence and machine learning. As an example, such an environment can provide for operations that involve one or more computational frameworks. For example, various types of computational frameworks may be utilized within an environment such as a drilling plan framework, a seismic-to-simulation framework (e.g., PETREL framework, Schlumberger Limited, Houston, Tex.), a measurements framework (e.g., TECHLOG framework, Schlumberger Limited, Houston, Tex.), a mechanical earth modeling (MEM) framework (PETROMOD framework, Schlumberger Limited, Houston, Tex.), an exploration risk, resource, and value assessment framework (e.g., GEOX, Schlumberger Limited, Houston, Tex.), a reservoir simulation framework (INTERSECT, Schlumberger Limited, Houston, Tex.), a surface facilities framework (e.g., PIPESIM, Schlumberger Limited, Houston, Tex.), a stimulation framework (MANGROVE framework, Schlumberger Limited, Houston, Tex.). As an example, one or more methods may be implemented at least in part via a framework (e.g., a computational framework) and/or an environment (e.g., a computational environment).

In the example of FIG. 1, the geologic environment 100 may include layers (e.g., stratification) that include the reservoir 101 and that may be intersected by a fault 103 (see also, e.g., the one or more fractures 109, which may intersect a reservoir). As an example, a geologic environment may be or include an offshore geologic environment, a seabed geologic environment, an ocean bed geologic environment, etc.

As an example, the geologic environment 100 may be outfitted with any of a variety of sensors, detectors, actuators, etc. For example, equipment 102 may include communication circuitry to receive and to transmit information with respect to one or more networks 105. Such information may include information associated with downhole equipment 104, which may be equipment to acquire information, to assist with resource recovery, etc. Other equipment 106 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 105 that may be configured for communications, noting that the satellite may additionally or alternatively include circuitry for imagery (e.g., spatial, spectral, temporal, radiometric, etc.).

FIG. 1 also shows the geologic environment 100 as optionally including equipment 107 and 108 associated with a well that includes a substantially horizontal portion that may intersect with one or more of the one or more fractures 109. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 107 and/or 108 may include components, a system, systems, etc. for fracturing, seismic sensing, analysis of seismic data, assessment of one or more fractures, etc.

As an example, a system may be used to perform one or more workflows. A workflow may be a process that includes a number of worksteps. A workstep may operate on data, for example, to create new data, to update existing data, etc. As an example, a system may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL software, for example, that operates on seismic data, seismic attribute(s), etc. As an example, a workflow may be a process implementable in the OCEAN framework. As an example, a workflow may be a process implementable in the DELFI framework. As an example, a workflow may include one or more worksteps that access a module such as a plug-in (e.g., external executable code, etc.). As an example, a workflow may include rendering information to a display (e.g., a display device). As an example, a workflow may include receiving instructions to interact with rendered information, for example, to process information and optionally render processed information. As an example, a workflow may include transmitting information that may control, adjust, initiate, etc. one or more operations of equipment associated with a geologic environment (e.g., in the environment, above the environment, etc.).

In FIG. 1, the technique 140 may be implemented with respect to a geologic environment 141. As shown, an energy source (e.g., a transmitter) 142 may emit energy where the energy travels as waves that interact with the geologic environment 141. As an example, the geologic environment 141 may include a bore 143 where one or more sensors (e.g., receivers) 144 may be positioned in the bore 143. As an example, energy emitted by the energy source 142 may interact with a layer (e.g., a structure, an interface, etc.) 145 in the geologic environment 141 such that a portion of the energy is reflected, which may then be sensed by one or more of the sensors 144. Such energy may be reflected as an upgoing primary wave (e.g., or "primary" or "singly" reflected wave). As an example, a portion of emitted energy may be reflected by more than one structure in the geologic environment and referred to as a multiple reflected wave (e.g., or "multiple"). For example, the geologic environment 141 is shown as including a layer 147 that resides below a surface layer 149. Given such an environment and arrangement of the source 142 and the one or more sensors 144, energy may be sensed as being associated with particular types of waves.

As an example, a "multiple" may refer to multiply reflected seismic energy or, for example, an event in seismic data that has incurred more than one reflection in its travel path. As an example, depending on a time delay from a primary event with which a multiple may be associated, a multiple may be characterized as a short-path or a peg-leg, for example, which may imply that a multiple may interfere with a primary reflection, or long-path, for example, where a multiple may appear as a separate event. As an example, seismic data may include evidence of an interbed multiple from bed interfaces, evidence of a multiple from a water interface (e.g., an interface of a base of water and rock or sediment beneath it) or evidence of a multiple from an air-water interface, etc.

As shown in FIG. 1, acquired data 160 can include data associated with downgoing direct arrival waves, reflected upgoing primary waves, downgoing multiple reflected waves and reflected upgoing multiple reflected waves. The acquired data 160 is also shown along a time axis and a depth axis. As indicated, in a manner dependent at least in part on characteristics of media in the geologic environment 141, waves travel at velocities over distances such that relationships may exist between time and space. Thus, time information, as associated with sensed energy, may allow for understanding spatial relations of layers, interfaces, structures, etc. in a geologic environment.

FIG. 1 also shows various types of waves as including P, SV an SH waves. As an example, a P-wave may be an elastic body wave or sound wave in which particles oscillate in the direction the wave propagates. As an example, P-waves incident on an interface (e.g., at other than normal incidence, etc.) may produce reflected and transmitted S-waves (e.g., "converted" waves). As an example, an S-wave or shear wave may be an elastic body wave, for example, in which particles oscillate perpendicular to the direction in which the wave propagates. S-waves may be generated by a seismic energy sources (e.g., other than an air gun). As an example, S-waves may be converted to P-waves. S-waves tend to travel more slowly than P-waves and do not travel through fluids that do not support shear. In general, recording of S-waves involves use of one or more receivers operatively coupled to earth (e.g., capable of receiving shear forces with respect to time). As an example, interpretation of S-waves may allow for determination of rock properties such as fracture density and orientation, Poisson's ratio and rock type, for example, by crossplotting P-wave and S-wave velocities, and/or by other techniques.

As an example, seismic data may be acquired for a region in the form of traces. In the example of FIG. 1, the technique 140 may include the source 142 for emitting energy where portions of such energy (e.g., directly and/or reflected) may be received via the one or more sensors 144. As an example, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be of the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

Figure 2:
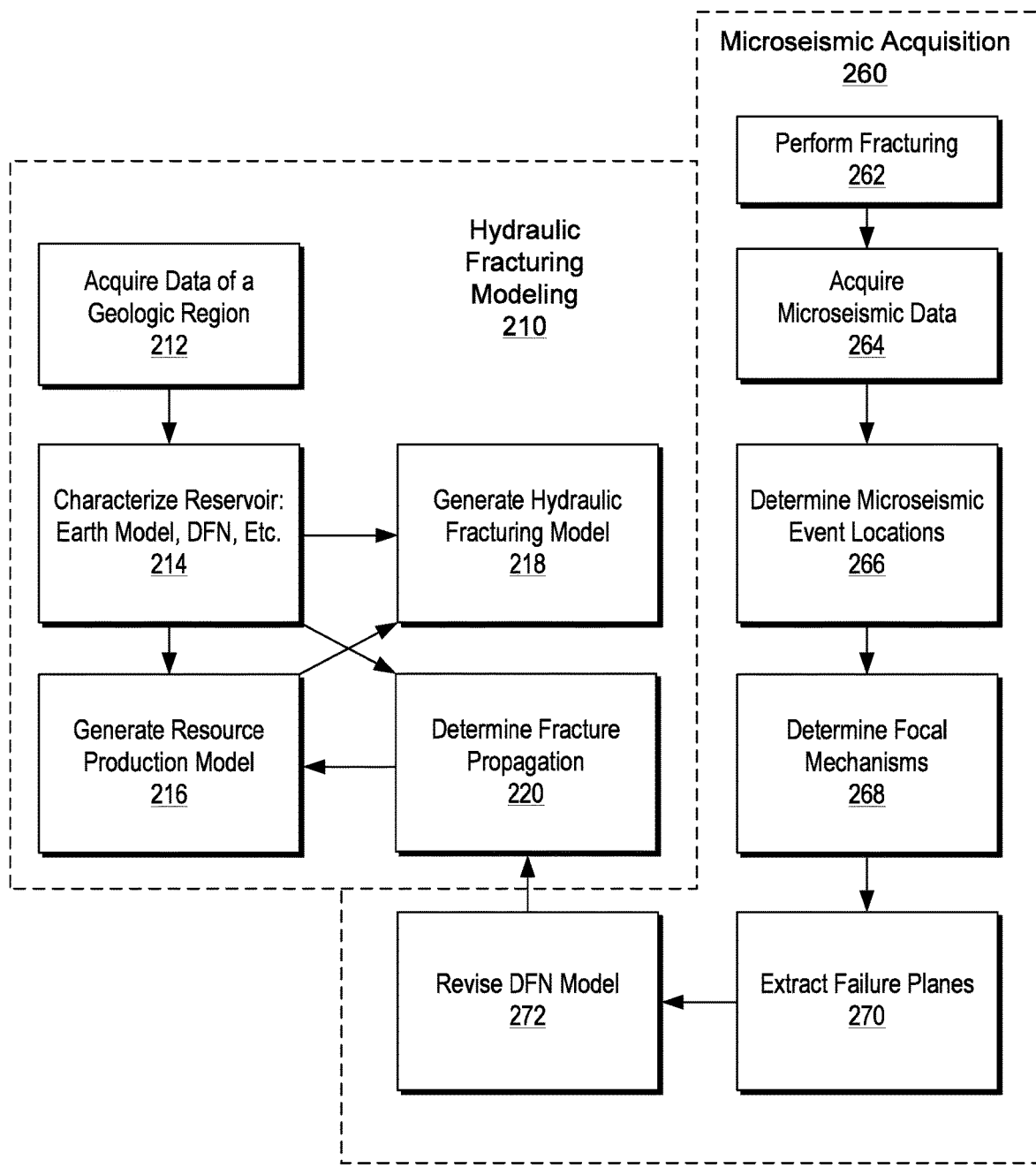
FIG. 2 illustrates an example of a method.

FIG. 2 shows an example of a method 200 that includes various actions associated with hydraulic fracturing modeling 210 and various actions associated with microseismic data acquisition 260. As shown, the method 200 includes an acquisition block 212 for acquiring data of a geologic region, a characterization block 214 for characterizing a reservoir in the geologic region via a 3D earth model and a discrete fracture network (DFN) and optionally one or more other actions, a generation block 216 for generating a resource production model of the geologic region, a generation block 218 for generating a hydraulic fracturing model and a determination block 220 for determining information associated with fracture propagation in the geologic region. As shown, the method 200 includes a performance block 262 for performing hydraulic fracturing in the geologic region, an acquisition block 264 for acquiring microseismic data responsive to generation and/or reactivation of fractures in the geologic region, a determination block 266 for determining microseismic event locations in the geologic region, a determination block 268 for determining one or more focal mechanisms based at least in part on the microseismic event locations, an extraction block 270 for extracting one or more failure planes based at least in part on the determined one or more focal mechanisms in the geologic region, a revision block 272 for revising the DFN model that characterizes the reservoir where, as shown, the revised DFN model can be utilized to inform the determination block 220 as to fracture propagation in the geologic region noting that one or more loops can exist within the method 200 that can be performed responsive to fracturing and data acquisition, which can inform, for example, one or more operations in the geologic region (e.g., further fracturing, further data acquisition, production, etc.).

Mechanical earth models (e.g., MEMs, 3D earth models, etc.) can be generated from a variety of geologic, petrophysical, geomechanical, and geophysical information, which characterizes complexity and heterogeneity of a reservoir and completion properties in one or more formations of interest (see, e.g., the block 214). As an example, data can be acquired via one or more of 3D seismic surveys, acoustic impedance and other seismic-derived property volumes (e.g., bulk modulus, Poisson's ratio, etc.), microseismic surveys, sonic logs, rock cores, burial history, petrophysical measurements from well logs, etc. (see, e.g., the block 212). As an example, natural fracture patterns and regional stress field may be mapped using such multi-domain, multi-scale information as borehole images and 2D and 3D seismic surveys, which can then be used to develop and calibrate fracture propagation models (see, e.g., the block 220). As an example, a mechanical earth model may be used to generate maps to assess, perform, etc., one or more of drilling, fracturing, and operational risks. As explained with respect to FIG. 2, the method 200 can include integrating hydraulic fracturing models (see, e.g., the block 218) developed through integration of geologic and structural models with production simulation models and risk maps (see, e.g., the block 216), which can provide for decision making for completion operations, execution of an optimum stimulation plan, etc.

As an example, hydraulic fracturing models developed through the integration of geologic and structural reservoir characterization models, fracture propagation models and production models may be utilized in evaluating different unconventional completion operations. For example, consider operations that include real-time microseismic data acquisition for evaluating performance of hydraulic fracturing stimulations and in providing information about for calibrating and developing revised fracture models for one or more of ongoing and future stimulations.

Microseismic monitoring provides a valuable tool to evaluate hydraulic fracture treatments in real-time and can be utilized in planning and managing reservoir development. Microseismic event locations, source characteristics and attributes provide can provide estimates of hydraulic fracturing geometry that can be evaluated with respect to a completion plan and expected fracture growth. Microseismic event derived attributes such as fracture azimuth, height and length, location and complexity, may be utilized to determine the extent of fracture coverage of the reservoir target and effective stimulated volume, as well as in diagnosing under-stimulated sections of the reservoir and in planning re-stimulation of under-producing perforations and wells. Microseismic event locations can also help to avoid hazards during stimulation (e.g. faults, karst, aquifers, etc.). As an example, a method can include modifications to one or more treatment plans and operations based at least in part on microseismic interpretations.

As an example, microseismic monitoring results may be used in updating and calibrating geologic and structural models used in planning completions. Information about the inelastic deformation of the fracture source (e.g., fracture plane orientation and slip) that generates the microseismic signal may be, for example, obtained through moment tensor inversion. The moment tensor can describe various source types (e.g. explosion, tensile crack opening or closing, slip on a plane or combination thereof). As hydraulic fracture microseismicity can be a result of high-pressure injection of fluids and proppant to open fracture paths, moment tensor inversion can be used to determine fracture opening and closing events from shear displacements, providing valuable information to engineers as to whether their fractures pathways are open or closed. Moment tensors may also provide a direct measurement of the local stress-strain regime, fracture orientations, and changes to the local stresses and fracture orientation through time that can be used to develop and calibrate discrete fracture network (DFN) models.

Integrated workflows leveraging multi-scale, multi-domain measurements and microseismic interpretation enables optimization of hydraulic fracturing treatment for increased production. These integrated completions planning workflows may use a wide variety of information about the geology (e.g., lithology, stress contrast, natural fracturing, structural or depositional dip, faulting), and the associated rock properties, (e.g., noise, slowness, anisotropy, attenuation) to improve hydraulic fracturing operations to lead to improved hydraulic fracture stimulations, completion plans, and well placement and, thereby, improved production. As an example, microseismic event locations and attributes may be integrated and compared with treatment pressure records, proppant concentration, and injection rate to better perform field operations.

Figure 3:
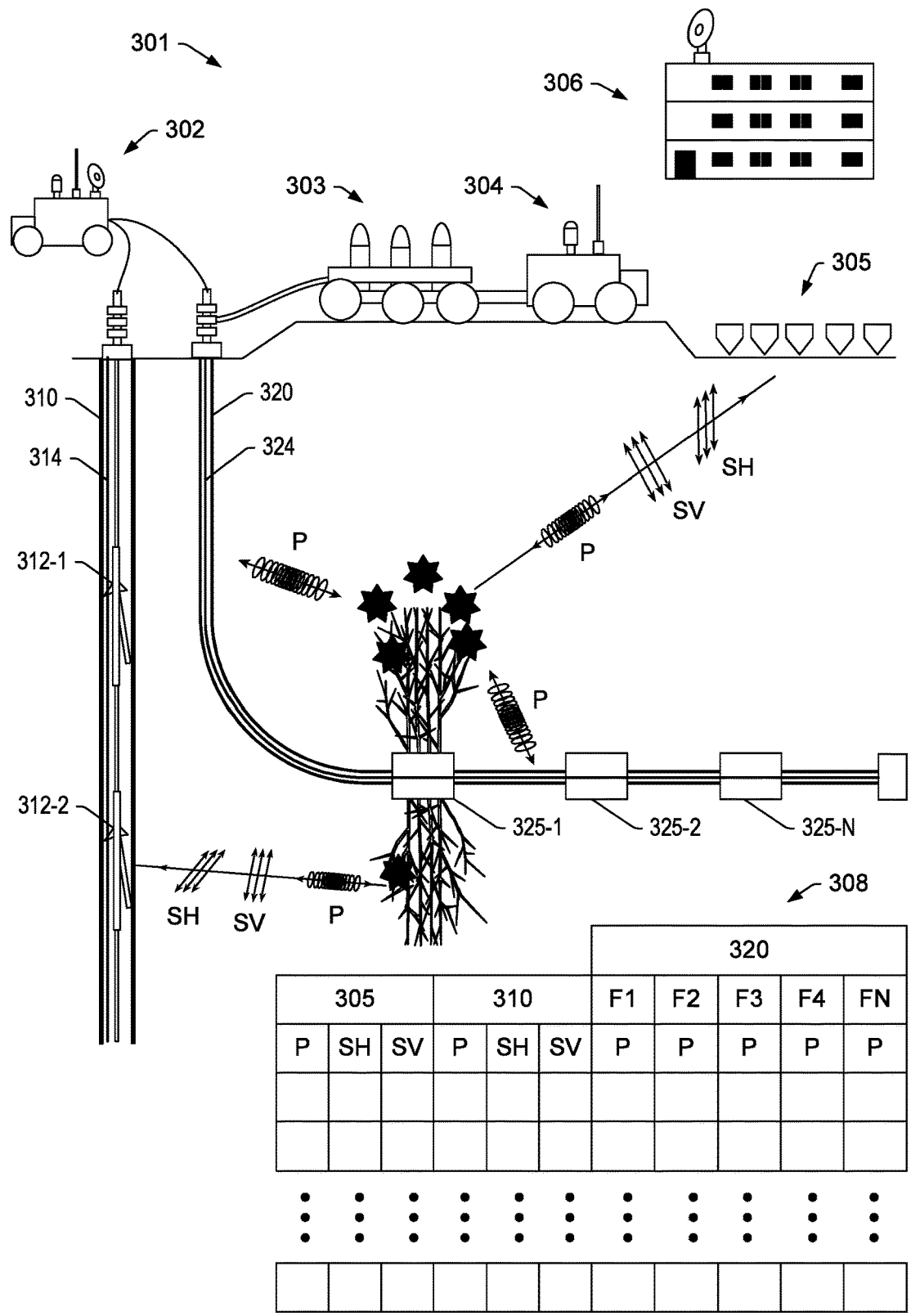
FIG. 3 illustrates an example of a system.

FIG. 3 shows an example of a geologic environment 301 that includes monitoring equipment 302, a pump 303, equipment 304, a seismic sensor or receiver array 305 and a remote facility 306. As shown, various types of communication may be implemented such that one or more pieces of equipment can communicate with one or more other pieces of equipment. As an example, equipment can include geo-positioning equipment (e.g., GPS, etc.). As an example, equipment can include one or more satellites and one or more satellite links (e.g., dishes, antennas, etc.).

In the example of FIG. 3, a monitoring well 310 and a treatment well 320 are disposed in the geologic environment 301. The monitoring well 310 includes a plurality of sensors 312-1 and 312-2 and optionally a fiber cable sensor 314 and the treatment well 320 optionally includes a fiber cable sensor 324 and one or more sets of perforations 325-1, 325-2, 325-N (e.g., as generated by perforating equipment, which may utilize force generated via one or more mechanisms).

Equipment in the example of FIG. 3 can be utilized to perform one or more methods. As an example, data associated with hydraulic fracturing events may be acquired via various sensors. As an example, P-wave data (compressional wave data) can be utilized to assess such events (e.g., microseismic events). Such information may allow for adjusting one or more field operations. As an example, data acquired via the fiber cable sensor 324 can be utilized to generate information germane to a fluid flow-based treatment process (e.g., to determine where fluid pumped into a well may be flowing, etc.).

FIG. 3 shows an example of a table or data structure 308 with some examples of information that may be acquired via the seismic sensor array 305 (e.g., P-wave as "P", SH-wave as "SH", SV-wave as "SV"), sensors of the monitoring well 810 (e.g., P, SH, SV) and sensors of the treatment well 320 (e.g., P). In the example of FIG. 3, information may be sensed with respect to position, for example, sensor position, position along a fiber cable sensor, etc. As shown, the fiber cable sensor 324 may sense information at a variety of positions along the fiber cable sensor 324 within the treatment well 320 (see, e.g., F1, F2, F3, F4 to FN).

In the example of FIG. 3, the set of perforations 325-1 are shown as including associated fractures and microseismic events that generate energy that can be sensed by various sensors in the geologic environment 301. Arrows indicate a type of wave that may be sensed by an associate sensor. For example, as mentioned with respect to the table or data structure 308, the seismic sensor array 305 can sense P, SV and SH waves while the fiber cable sensor 324 can sense P waves.

As an example, the equipment 302 can be operatively coupled to various sensors in the monitor well 310 and the treatment well 320. As an example, the equipment 302 may be on-site where wires are coupled from sensors to the equipment 302, which may be vehicle-based equipment (e.g., a data acquisition and/or control truck, etc.). As an example, the equipment 304 may control the pump 303 (e.g., or pumps) that can direct fluid into the treatment well 320. For example, a line is shown as a conduit that is operatively coupled between the pump 303 and the treatment well 320.

As an example, information acquired by the equipment 302 may be utilized to control one or more treatment processes controlled by the equipment 304. For example, the equipment 302 and the equipment 304 may be in direct and/or indirect communication via one or more communication links (e.g., wire, wireless, local, remote, etc.). In such an example, information acquired during a treatment process can be utilized in real-time (e.g., near real-time) to control the treatment process. For example, the equipment 302 can acquire data via sensors in the wells 310 and 320 and output information to the equipment 304 for purposes of controlling an on-going treatment process (e.g., the pump 303, pumps, etc.). As an example, such information may be utilized to control and/or to plan a subsequent treatment process, for example, additionally or alternatively to controlling an on-going treatment process.

As an example, a treatment process can include hydraulic fracturing. As an example, acquired data can include microseismic event data. As an example, a method can include determining the extent of rock fracturing induced by a treatment process, which may aim to stimulate a reservoir.

As an example, a method can include hydraulic fracture monitoring (HFM). As an example, a method can include monitoring one or more types of reservoir stimulation processes where one or more of such processes may be performed in stages. As an example, a stage may be of a duration of the order of hours or longer (e.g., several days). As an example, a method can include determining the presence, extent, and/or associated volume of induced fractures and fracture networks, which may be utilized for calculating an estimated reservoir stimulation volume (e.g., ESV) that may assist, for example, in economic evaluation of well performance.

As an example, real-time data may be rendered to a display (e.g., as a plot, plots, etc.). As an example, real-time data may be assessed in real-time (e.g., near real-time that includes computation and transmission times) during perforation flow for one or more sets of perforations. In such an example, such assessments may allow a treatment process to be optimized during the treatment process in real-time (e.g., near real-time). Such assessments may be utilized for one or more post treatment analyses, for example, to plan, perform, control, etc. one or more future treatments (e.g., in a same well, a different well, etc.).

As an example, a method can include acquiring data germane to flow in one or more wells and/or via perforations in one or more wells. As an example, a method can include acquiring data germane to locating one or more fractures. As an example, a method can include a real-time portion and a post-process portion.

As an example, a data acquisition technique may be implemented to help understand a formation, a reservoir, a bore, a bore wall, a fracture, fractures, a fracture network, etc. As an example, a hydraulically induced fracture or fractures may be monitored using one or more borehole seismic methods. For example, while a fracture is being created in a treatment well, a multicomponent receiver array in a monitor well may be used to record microseismic activity generated by a fracturing process.

As mentioned, equipment may include fracturing equipment where such equipment may be employed to generate one or more fractures in a geologic environment. As an example, a method to generate fractures can include a delivery block for delivering fluid to a subterranean environment, a monitor block for monitoring fluid pressure and a generation block for generating fractures via fluid pressure. As an example, the generation block may include activating one or more fractures. As an example, the generation block may include generating and activating fractures.

As an example, a method may be referred to as a treatment method or a "treatment". Such a method may include pumping an engineered fluid (e.g., a treatment fluid) at high pressure and rate into a reservoir via one or more bores, for example, to one or more intervals to be treated, which may cause a fracture or fractures to open (e.g., new, pre-existing, etc.).

As an example, a fracture may be defined as including "wings" that extend outwardly from a bore. Such wings may extend away from a bore in opposing directions, for example, according in part to natural stresses within a formation. As an example, proppant may be mixed with a treatment fluid to keep a fracture (or fractures) open when a treatment is complete. Hydraulic fracturing may create high-conductivity communication with an area of a formation and, for example, may bypass damage that may exist in a near-wellbore area. As an example, stimulation treatment may occur in stages. For example, after completing a first stage, data may be acquired and analyzed for planning and/or performance of a subsequent stage.

Size and orientation of a fracture, and the magnitude of the pressure to create it, may be dictated at least in part by a formation's in situ stress field. As an example, a stress field may be defined by three principal compressive stresses, which are oriented perpendicular to each other. The magnitudes and orientations of these three principal stresses may be determined by the tectonic regime in the region and by depth, pore pressure and rock properties, which determine how stress is transmitted and distributed among formations.

Where fluid pressure is monitored, a sudden drop in pressure can indicate fracture initiation of a stimulation treatment, as fluid flows into the fractured formation. As an example, to break rock in a target interval, fracture initiation pressure exceeds a sum of the minimum principal stress plus the tensile strength of the rock. To determine fracture closure pressure, a process may allow pressure to subside until it indicates that a fracture has closed. A fracture reopening pressure may be determined by pressurizing a zone until a leveling of pressure indicates the fracture has reopened. The closure and reopening pressures tend to be controlled by the minimum principal compressive stress (e.g., where induced downhole pressures exceed minimum principal stress to extend fracture length).

After performing fracture initiation, a zone may be pressurized for furthering stimulation treatment. As an example, a zone may be pressurized to a fracture propagation pressure, which is greater than a fracture closure pressure. The difference may be referred to as the net pressure, which represents a sum of frictional pressure drop and fracture-tip resistance to propagation (e.g., further propagation).

As an example, a method may include seismic monitoring during a treatment operation (e.g., to monitor fracture initiation, growth, etc.). For example, as fracturing fluid forces rock to crack and fractures to grow, small fragments of rock break, causing tiny seismic emissions, called microseisms.

Equipment may be positioned in a field, in a bore, etc. to sense such emissions and to process acquired data, for example, to locate microseisms in the subsurface (e.g., to locate hypocenters). Information as to direction of fracture growth may allow for actions that can "steer" a fracture into a desired zone(s) or, for example, to halt a treatment before a fracture grows out of an intended zone. Seismic information (e.g., information associated with microseisms) may be used to plan one or more stages of fracturing operations (e.g., location, pressure, etc.).

Figure 4:
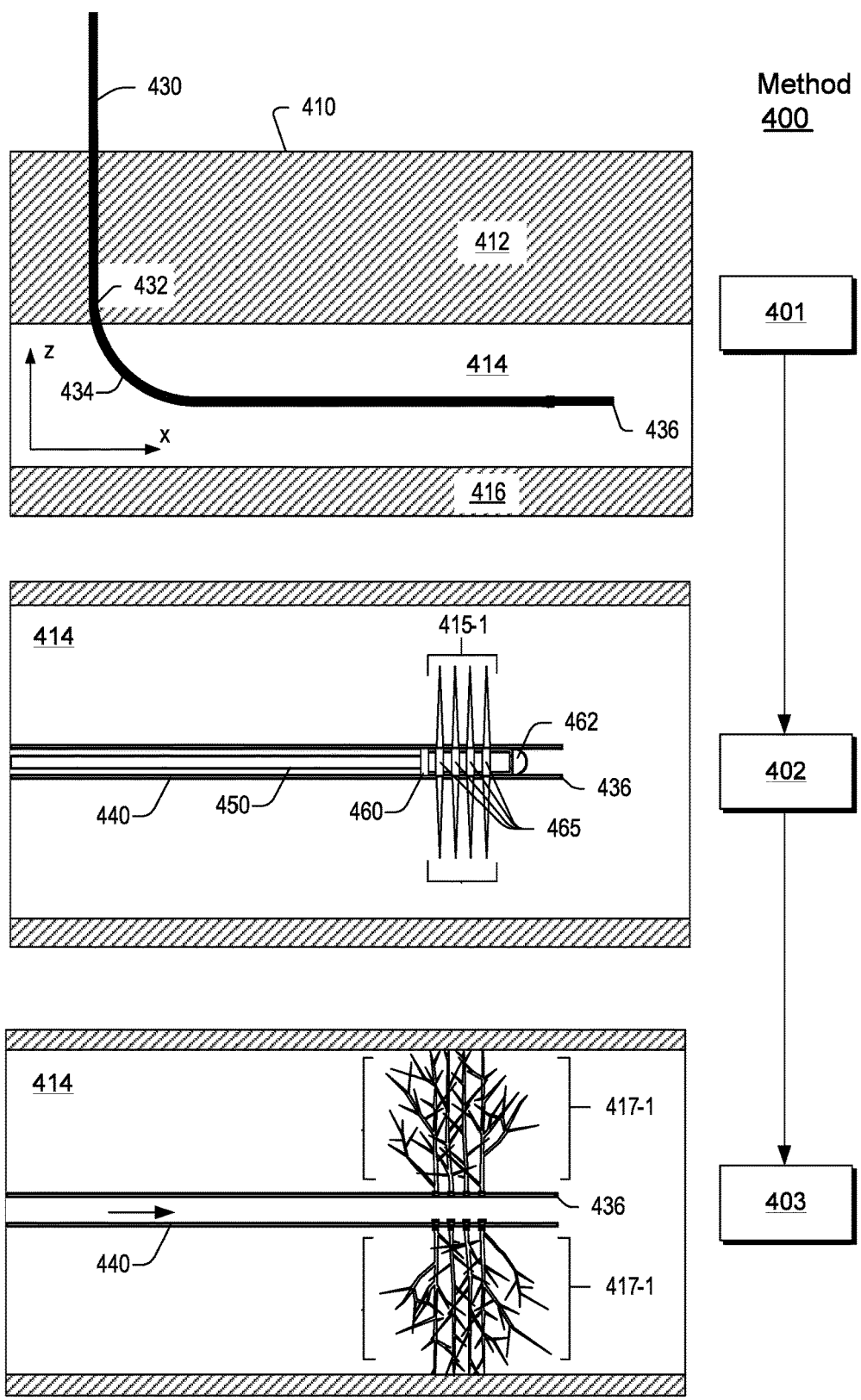
FIG. 4 illustrates an example of a portion of a method.
Figure 5:
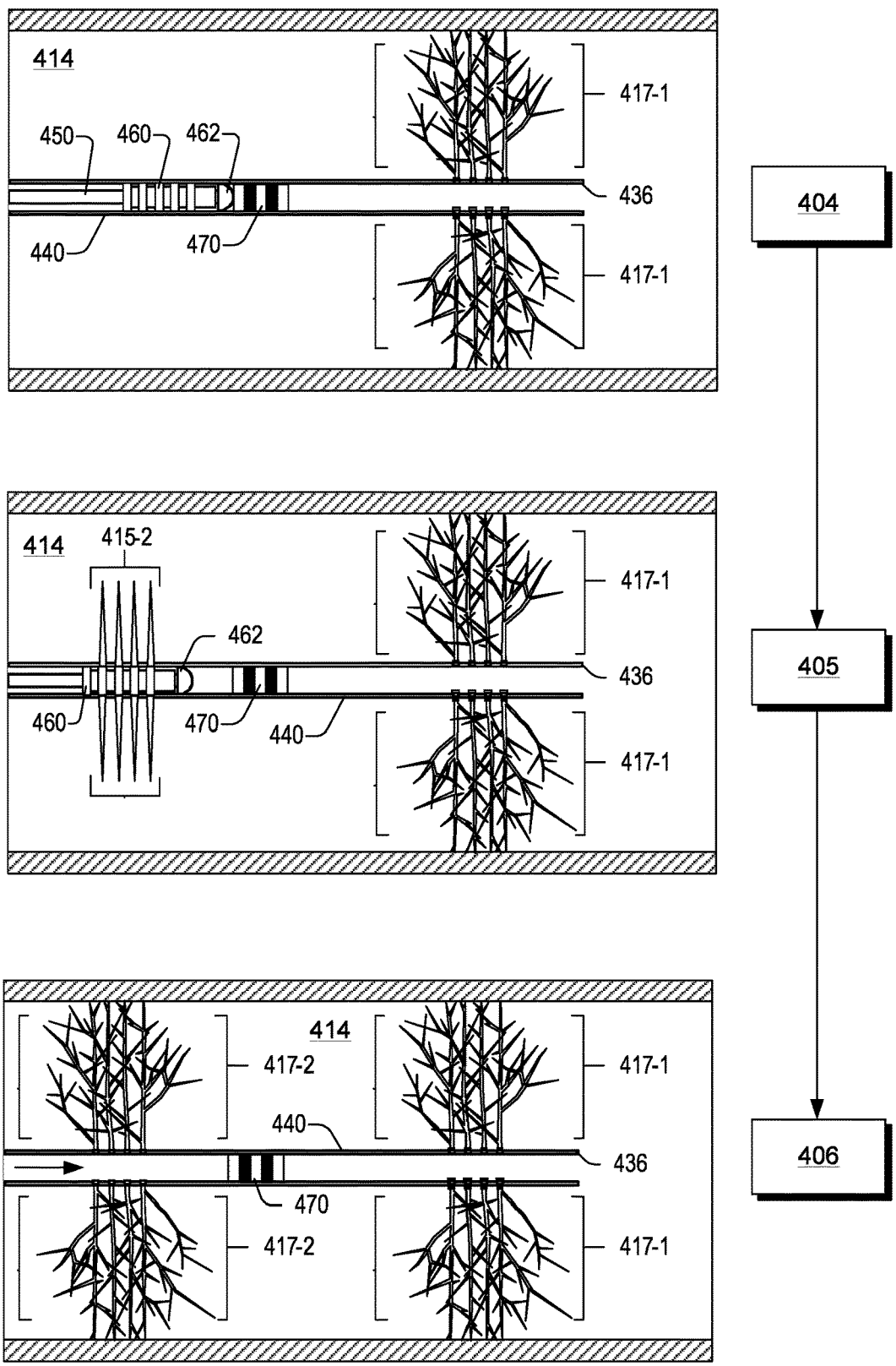
FIG. 5 illustrates an example of a portion of the method of FIG. 4.

FIGS. 4 and 5 show an example of a method 400 that includes generating fractures. As shown, the method 400 can include various operational blocks such as one or more of the blocks 401, 402, 403, 404, 405 and 406. The block 401 may be a drilling block that includes drilling into a formation 410 that includes layers 412, 414 and 416 to form a bore 430 with a kickoff 432 to a portion defined by a heel 434 and a toe 436, for example, within the layer 414.

As illustrated with respect to the block 402, the bore 430 may be at least partially cased with casing 440 into which a string or line 450 may be introduced that carries a perforator 460. As shown, the perforator 460 can include a distal end 462 and charge positions 465 associated with activatable charges that can perforate the casing 440 and form channels 415-1 in the layer 414. Next, per the block 403, fluid may be introduced into the bore 430 between the heel 434 and the toe 436 where the fluid passes through the perforations in the casing 440 and into the channels 415-1. Where such fluid is under pressure, the pressure may be sufficient to fracture the layer 414, for example, to form fractures 417-1. In the block 403, the fractures 417-1 may be first stage fractures, for example, of a multistage fracturing operation.

Per the block 404, additional operations are performed for further fracturing of the layer 414. For example, a plug 470 may be introduced into the bore 430 between the heel 434 and the toe 436 and positioned, for example, in a region between first stage perforations of the casing 440 and the heel 434. Per the block 405, the perforator 460 may be activated to form additional perforations in the casing 440 (e.g., second stage perforations) as well as channels 415-2 in the layer 414 (e.g., second stage channels). Per the block 406, fluid may be introduced while the plug 470 is disposed in the bore 430, for example, to isolate a portion of the bore 430 such that fluid pressure may build to a level sufficient to form fractures 417-2 in the layer 414 (e.g., second stage fractures).

In a method such as the method 400 of FIGS. 4 and 5, it may be desirable that a plug (e.g., the plug 470) includes properties suited to one or more operations. Properties of a plug may include mechanical properties (e.g., sufficient strength to withstand pressure associated with fracture generation, etc.) and may include one or more other types of properties (e.g., chemical, electrical, etc.). As an example, it may be desirable that a plug degrades, that a plug seat degrades, that at least a portion of a borehole tool degrades, etc. For example, a plug may be manufactured with properties such that the plug withstands, for a period of time, conditions associated with an operation and then degrades (e.g., when exposed to one or more conditions). In such an example, where the plug acts to block a passage for an operation, upon degradation, the passage may become unblocked, which may allow for one or more subsequent operations.

Figure 6:
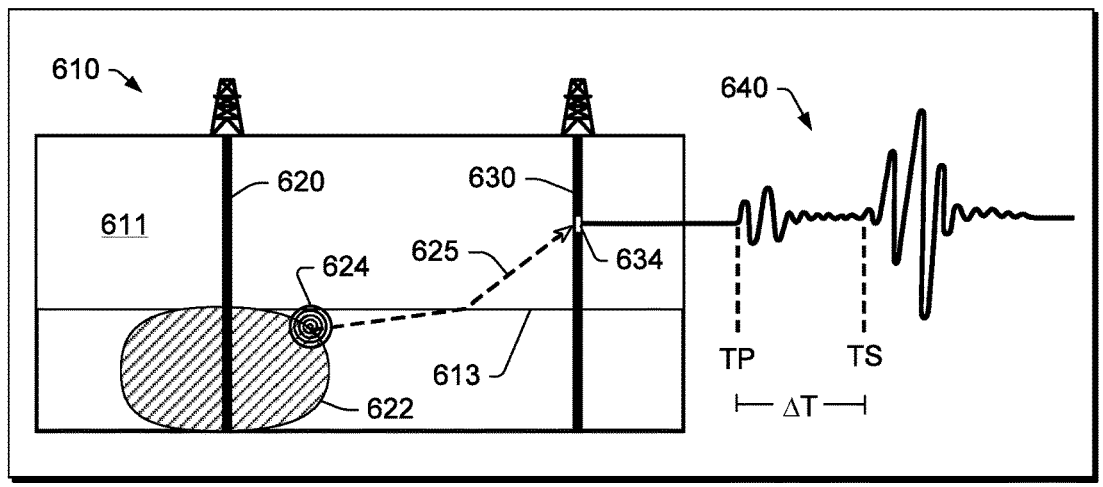
FIG. 6 illustrates examples of techniques and equipment associated with microseismicity.
Figure 6:
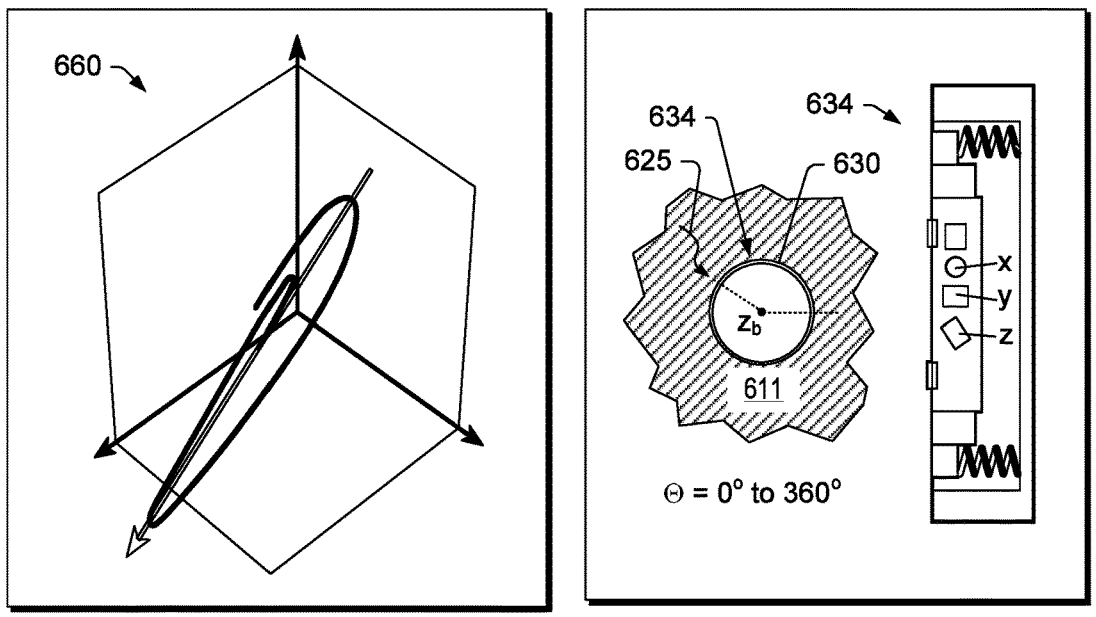
Figure 6:
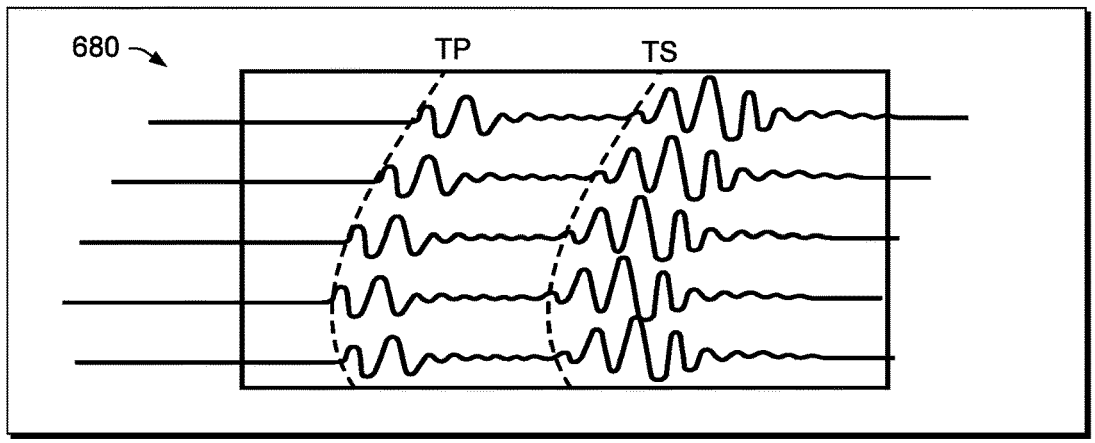

FIG. 6 shows an example of a microseismic survey 610, which may be considered to be a method that implements equipment for sensing elastic wave emissions of microseismic events (e.g., elastic wave energy emissions caused directly or indirectly by a treatment). As shown, the survey 610 is performed with respect to a geologic environment 611 that may include a reflector 613. The survey 610 includes an injection bore 620 and a monitoring bore 630. Fluid injected via the injection bore 620 generates a fracture 622 that is associated with microseismic events such as the event 624. As shown in the example of FIG. 6, energy 625 of a microseismic event 624 may travel through a portion of the geologic environment 611, optionally interacting with one or more reflectors 613, and pass to the monitoring bore 630 where at least a portion of the energy 625 may be sensed via a sensing unit 634, which may include a shaker, three-component geophone accelerometers isolated from a sensing unit body (e.g., via springs, etc.), coupling contacts, etc. In the example of FIG. 6, the sensed energy includes compressional wave energy (P-wave) and shear wave energy (S-wave).

As shown in the example of FIG. 6, one or more sensors of the sensing unit 634 can be oriented in the monitoring bore 630 with respect to the position of the microseismic event 624 and/or the energy 625 as received by at least one of the one or more sensors of the sensing unit 634. As an example, the orientation of a sensor may be defined in a coordinate system or coordinate systems such that orientation information may be defined as to one or more microseismic events and/or energy received as associated with one or more microseismic events. FIG. 6 shows an approximate diagram of a cross-sectional view of the sensing unit 634 in the monitoring bore 630 of the geologic environment 611 where energy 625 is arriving at the sensing unit 634 at an angle $\Phi$, which may be defined in a range of angles from approximately 0 degrees to approximately 360 degrees (e.g., where 0 and 360).

In FIGS. 1 and 3 various examples of machines can include one or more processors, memory, interfaces, etc. For example, the monitoring equipment 302 (e.g., a truck, etc.), the equipment 304 (e.g., a truck, etc.) and the remote facility 306 can include one or more processors, memory, interfaces, etc. As an example, equipment may be operatively coupled to a cloud environment (e.g., a cloud platform, etc.) that includes various types of computing resources (e.g., processors, memory, etc.). As an example, a vehicle and/or a trailer may include wheels and an engine and/or a motor and one or more processors, memory, interfaces, etc.

As mentioned, a field operation can include using one or more pump systems. As an example, a pump system can include an internal combustion engine that is operatively coupled to a transmission that is operatively coupled to a pump that can pump fluid. As an example, such a pump system may be carried by a vehicle or a trailer.

Figure 7:
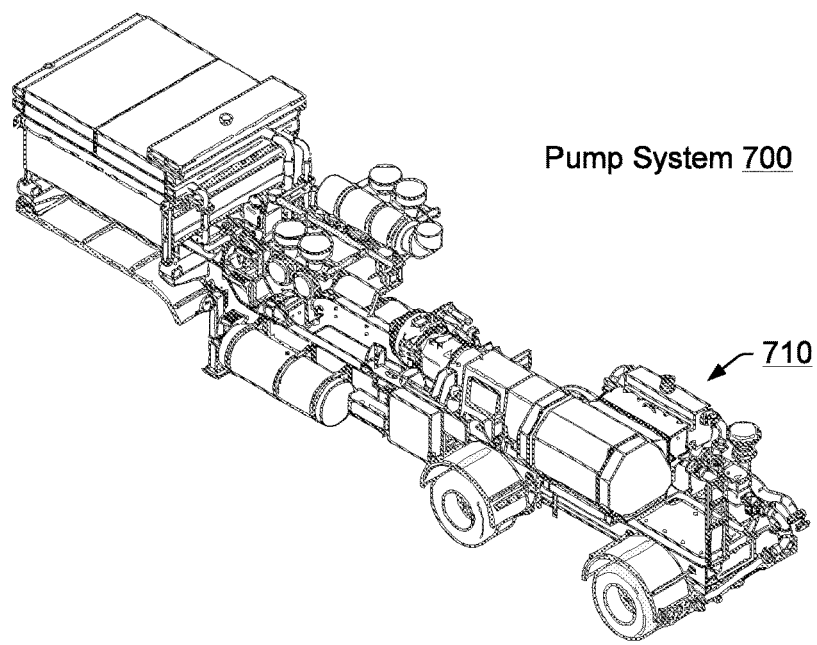
FIG. 7 illustrates an example of a pump system and an example of an internal combustion engine.
Figure 7:
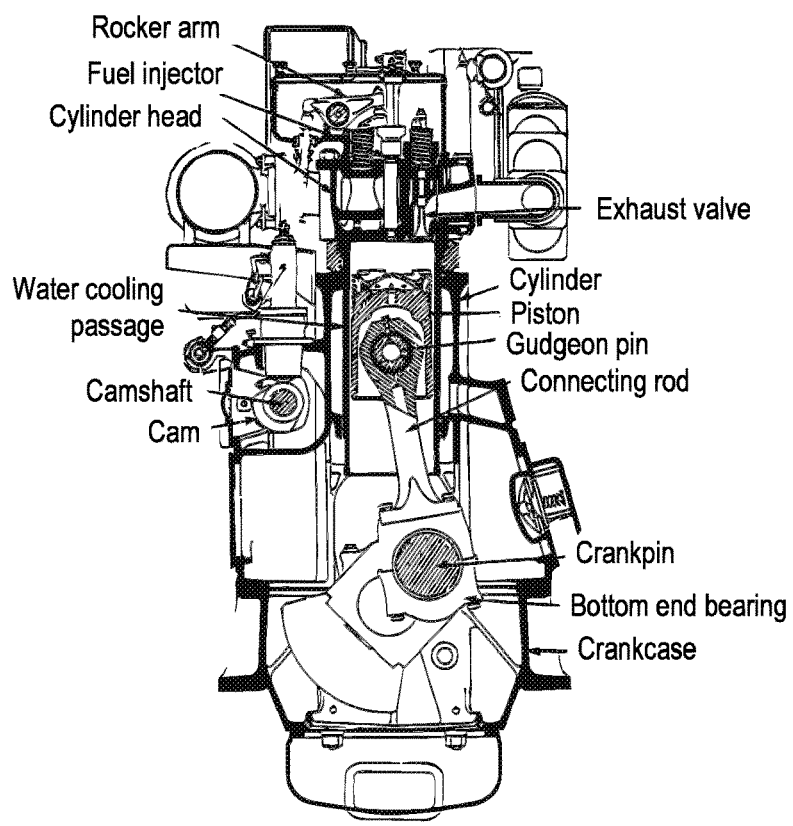

FIG. 7 shows an example of a pump system 700 that includes an internal combustion engine such as a diesel engine 710. The diesel engine 710 includes various features such as fuel injectors, water cooling passages, a lubricant and cooling oil crankcase that covers a crank shaft where the crank shaft is driven by pistons set in cylinders. The fuel injectors can inject fuel into the cylinders where the fuel is mixed with intake air and combusted through use pressure and/or other equipment (e.g., glow plugs, etc.). The combustion in the cylinders can be in a firing order (e.g., 1-3-4-2 for a four cylinder engine) with scavenging, compression, ignition and exhaust as in a two-stroke scheme with four "cycles" that occur in one revolution (360 mechanical degrees); whereas, in a four-stroke scheme, the four cycles occur in two complete revolutions (720 mechanical degrees). In a two-stroke engine, more than one function occurs at any given time during the engine's operation.

In a two-stroke scheme, intake begins when a piston is near the bottom dead center. Air is admitted to the cylinder through ports in the cylinder wall (e.g., without intake valves). Two-stroke diesel engines include artificial aspiration, for example, a mechanically driven blower or blowers or a turbocharger or turbochargers to charge cylinders with air. In the early phase of intake, the air charge can be used to force out remaining combustion gases from a preceding power stroke, a process referred to as scavenging. As a piston rises, the intake charge of air is compressed. Near top dead center, fuel is injected, resulting in combustion due to the charge's high pressure and heat created by compression, which drives the piston downward. As the piston moves downward in the cylinder, it will reach a point where the exhaust port is opened to expel the high-pressure combustion gasses. However, various two-stroke diesel engines use top-mounted poppet valves and uniflow scavenging. Continued downward movement of the piston will expose the air intake ports in the cylinder wall, and the cycle will start again.

In various two-stroke engines, few parameters are adjustable and various parameters are fixed by mechanical design of the engines. As an example, scavenging ports can be open from 45 degrees before BDC, to 45 degrees after BDC (e.g., symmetrical about BDC in piston-ported engines). Adjustable parameters can be associated with exhaust valve and injection timing, which may not necessarily be symmetrical about TDC or BDC. Such parameters may be established to maximize combustion gas exhaust and to maximize charge air intake. As an example, a single camshaft can operate poppet-type exhaust valves and a unit injector that uses three lobes: two lobes for exhaust valves (either two valves on the smallest engines or four valves on the largest, and a third lobe for the unit injector).

As an example, an internal combustion engine can be a gasoline engine, a diesel engine, a two-stroke engine, a four-stroke engine, a supercharged engine, a turbocharged engine, etc.

Figure 8:
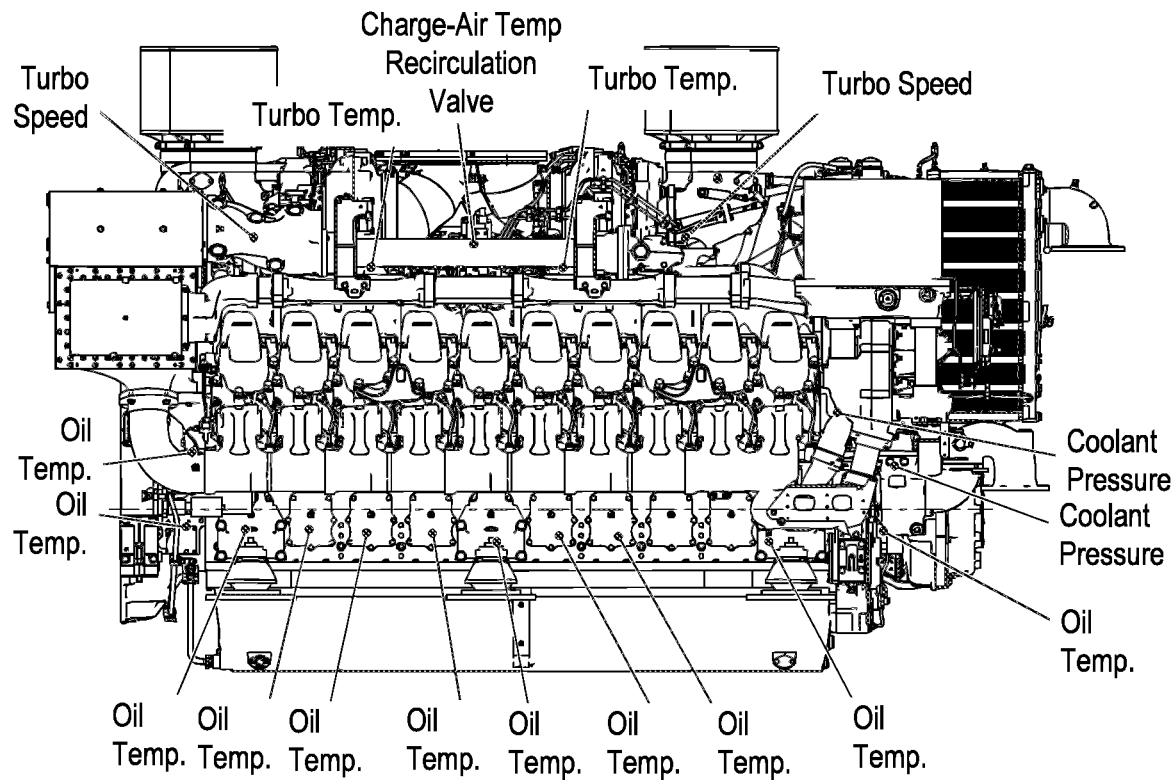
FIG. 8 illustrates an example of an internal combustion engine.

FIG. 8 shows an example of an internal combustion engine with various examples of engine sensors 800. For example, consider a load sensor, a turbocharger speed sensor, a turbocharger temperature sensor, a charge air temperature recirculation valve sensor, a coolant pressure sensor, a coolant pressure sensor, an oil temperature sensor, a shaft speed sensor, a cam speed sensor, a fuel temperature sensor, a leak fuel level sensor, an oil refill pump pressure sensor, an exhaust temperature sensor, a lube oil pressure sensor pre-filter, a lube oil pressure sensor post-filter, a fuel pressure sensor in a common rail of an fuel distribution assembly, a lube oil temperature sensor, an intake air temperature sensor, a main bearing temperature sensor, etc. Such sensors may be operatively coupled to one or more engine sensor and/or control units. As an example, such sensors may generate signals that can be recorded in analog and/or digital form. As an example, an engine can generate a history that can include various sensor values, maintenance procedures, etc.

Figure 9:
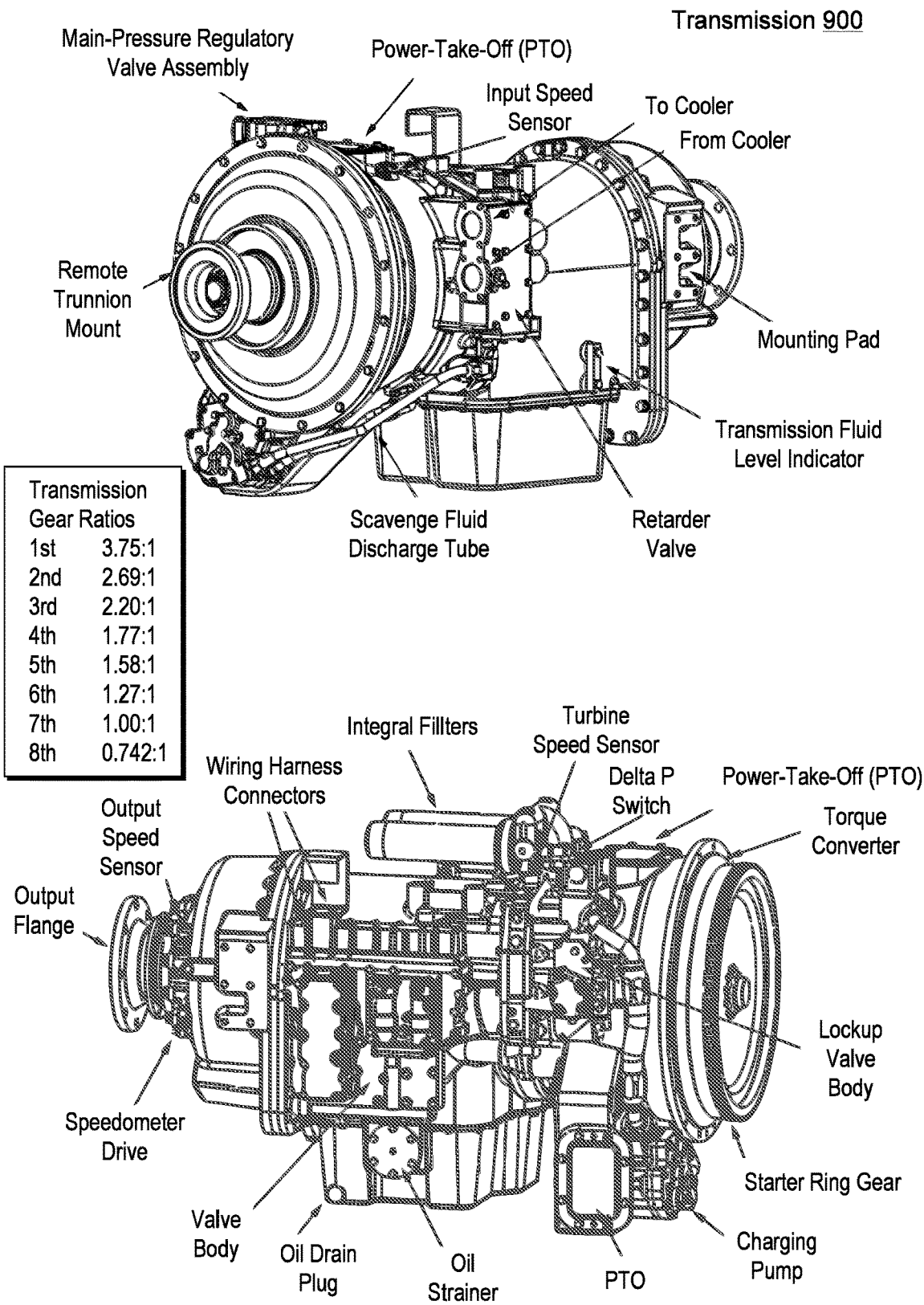
FIG. 9 illustrates an example of a transmission.

FIG. 9 shows perspective views of an example of a transmission 900, which may be operatively coupled to an internal combustion engine and operatively coupled to a pump. As shown, the transmission 900 can include various features, which can include one or more sensors. For example, consider a speed sensor, an oil temperature sensor, an oil pressure sensor, a gear sensor, a shift sensor, etc.

As an example, an internal combustion engine can be an engine such as a Detroit Diesel engine (Detroit Diesel Corporation, Detroit, Michigan). For example, consider a Detroit Diesel 12V4000, four-cycle diesel engine with the following performance characteristics and features: Rated 2,250 BHP @ 1900 RPM; electronic engine management system; electronic throttle control; air cleaners; fuel filters; lubricating oil filters; rear housing adaptation kit (SAE00 to SAE0) for use with an Allison transmission (Allison Transmission, Indianapolis, Indiana) or one or more other transmissions; lifting eyes; exhaust manifolds; oil filter bank and oil pan sight gauge; pumps, fuel and lubricating, fuel transfer, lubricating oil; pumps, water, and jacket water; support, front trunnion; thermostats and housing; vibration dampers; horizontal exhaust silencer with rain cap and stainless steel connections; alternator; heavy-duty hydraulic starter; and transmission oil cooler.

As an example, a transmission can be a transmission such as an Allison transmission. For example, consider an Allison S9820 powershift transmission. As an example, transmission accessories can include: a TC 1080 torque converter; a transmission powershift; an electrically activated hydraulic shift assembly; a SAE #0 mounting; a lockup clutch; an output shaft disc brake; a transmission oil to coolant heat exchanger; an auxiliary output adapter plate on a back of an oil pump drive gear for the pump power-end lubrication pump; and a transmission oil sump. As an example, gear ratios can be associated with one or more gears where an actuator can provide for shifting gears: 3.75:1 (1st); 2.69:1 (2nd); 2.20:1 (3rd); 1.77:1 (4th); 1.58:1 (5th); 1.27:1 (6th); 1.00:1 (7th); and 0.742:1 (8th).

As to a pump, consider a pump that includes one or more features of a SPM family of pumps (Weir SPM, Fort Worth, Tex.). For example, consider the SPM QWS-2500SD "Severe Duty" pump, which is designed to withstand 10 hours of operation up to six days a week while maintaining a high performance rod load capacity. The QWS-2500SD pump has a rated maximum brake HP of 2,500 BHP (1,866 Kw), a maximum rod load of 192,325 lb (87,239 kg), a stroke length of 8" (203.2 mm), a gear ratio of 6.353:1, a length of 84¾" (2,153 mm), a width of 73⅞" (1,877 mm), a height of 43⅜" (1,102 mm), and an approximate dry weight of 16,000 lb (7,257 kg).

Another SPM pump is the SPM DESTINY TWS 2500 fracturing pump, which can be suitable for multistage fracturing applications with a 2500 BHP rating, a 273,000 lb rod load, and a 10" stroke. A longer stroke demands fewer cycles to produce an equivalent flow rate compared to an 8" stroke quintuplex pump; resulting in less overall wear on expendables and improved overall pump durability. Such a combination may provide more operating ranges than other triplex pumps in this category.

As an example, a pump may be rated in the hundreds of gallons per minute (e.g., more than 1000 liters per minute). For example, consider a SPM pump rated at 650 gpm (2,458 lpm) at 300 pump strokes per minute (e.g., SPM QWS 2500 XL).

Figure 10:
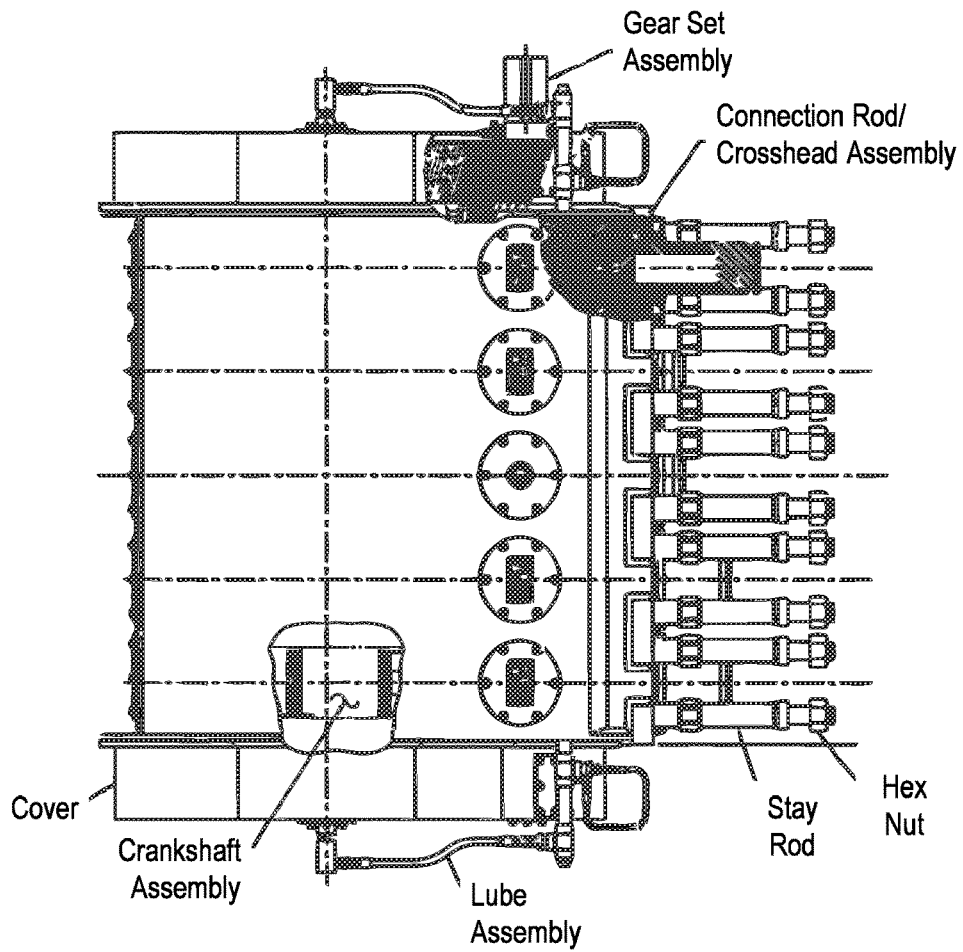
FIG. 10 illustrates an example of a pump.
Figure 10:
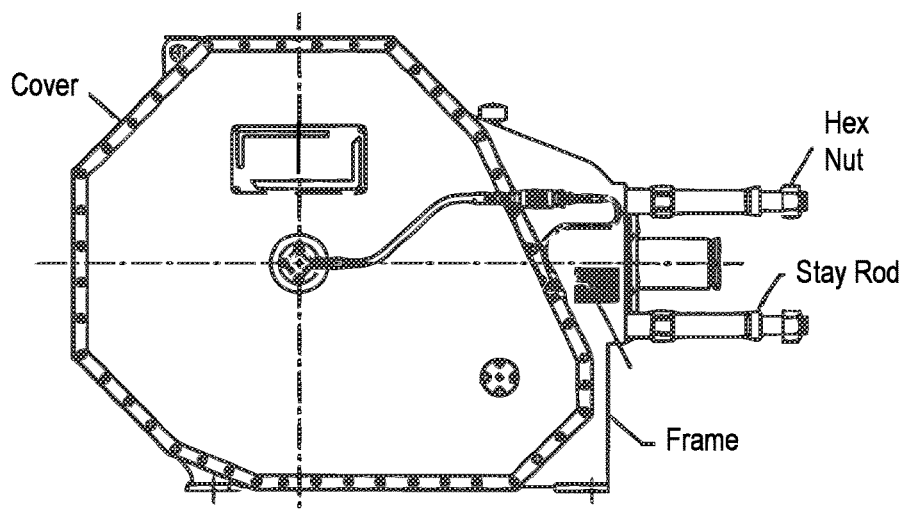

FIG. 10 shows an example of a pump 1000 and various features such as a crankshaft assembly, a connection rod/crosshead assembly, a lube assembly, etc. The pump 1000 can include a plurality of cylinders for pumping fluid and a coupling that can operatively couple the crankshaft directly and/or indirectly to an internal combustion engine (e.g., via a transmission, etc.).

Figure 11:
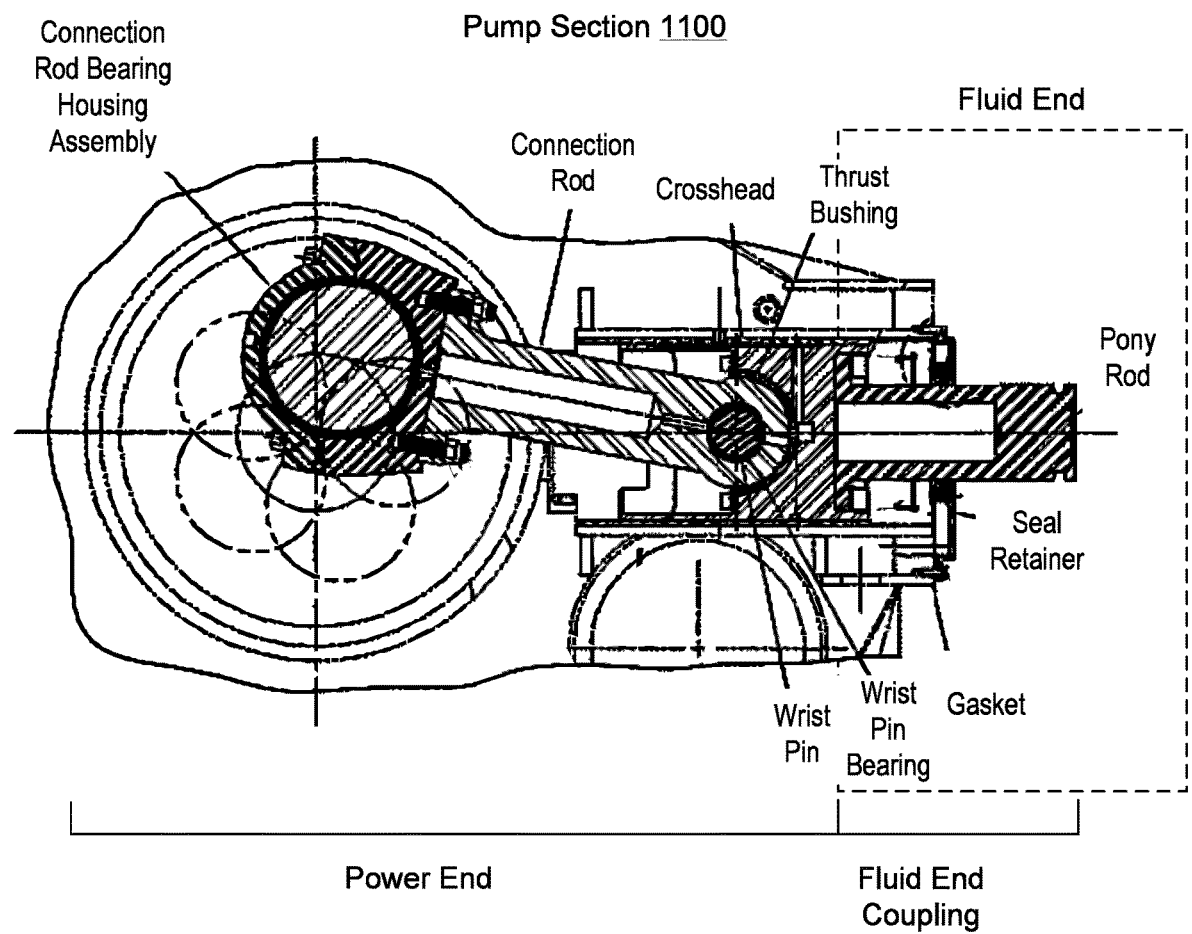
FIG. 11 illustrates a portion of an example of a pump.

FIG. 11 shows an example of a section of the pump 1000 where the connection rod bearing housing assembly is shown with a connection to a connection rod that can reciprocate a plunger to pump fluid. In the example of FIG. 11, the pump 1000 is illustrated as including a power end and a fluid end coupling for a fluid end (e.g., represented by a dashed line). The power end includes mechanical components that provide power for the fluid end such that the fluid end can pump fluid. A power end can be matched to a suitable fluid end and vice versa.

Multiplex pumps include a power end and a fluid end where the power end houses a crankshaft in a crankcase. The connecting rods can be similar to those in an internal combustion engine but connect to crossheads instead of pistons. A fluid end includes individual plungers that can be in fluid communication with intake and discharge check valves that may be spring loaded. A fluid end can be attached to a power end by a spacer block, which can include intermediate rods and provide a working space for access to a plunger system.

Multiplex pumps tend to run at relatively low speeds to minimize vibration and wear and to reduce dynamic problems with the spring-loaded intake and discharge valves. Various types of multiplex pumps operate in a range that can be between approximately 200 and approximately 450 rev/min. Such speeds tend to be below the speeds of fuel engines or electric motors and hence transmissions or other reduction equipment can be utilized. As a positive-displacement pump has a relatively constant discharge flow rate for a given prime-mover speed, bypass of excess fluid can be used to match a particular pressure and flow demand. Another option can be to drive a multiplex pump through a multi-speed transmission (e.g., multiple gear ratio transmission). Pumping at reduced speed may help to increase life of various components (e.g., packing, valving, etc.).

As to plunger pumps, an individual plunger can pump individually from a common intake manifold into a common discharge. As discharge occurs on an upstroke, the pumped fluid can exhibit pulsation. As an example, one or more types of pulsation dampers may be utilized. Pulsation may, depending on circumstances, present some issues such as, for example, noise that may interfere with some types of measurements. Pulsation may result in undesirable vibrations. As an example, a system may be equipped with one or more sensors that can measurement vibrations where vibration measurements can be utilized to control one or more pieces of equipment such that vibrations are reduced, altered, etc. For example, where vibrations may be present near a resonant frequency, a controller may adjust one or more operational parameters such that the vibrations are reduced and/or altered in their frequency (e.g., away from the resonant frequency, etc.).

As an example, a maintenance program may include one or more of the following: daily (leak checks); weekly (above daily checks plus additional system checks); monthly or every 100 pumping hours (e.g., plus tighten bolts, change filters, check consumable/wear parts inventories); quarterly or every 250 hours (e.g., plus change oil, clean lube oil strainers and breathers, and other recommended parts); and yearly (e.g., plus complete pump inspection, replacing worn components, all flange/manifold seals). As an example, lubricant samples may be taken and analyzed.

As an example, a fleet of pump systems can include one or more features of the internal combustion engine of FIGS. 7 and 8, the transmission of FIG. 9, and/or the pump of FIGS. 10 and 11. As an example, the pump system 700 of FIG. 7 can include an internal combustion engine, a transmission and a pump. As an example, a fleet of pump systems can be the same or differ and may have different operating histories and/or manufactured specifications (e.g., due to manufacture variability, etc.).

FIG. 12 shows an example of a system 1200 that includes water tankers, a precision continuous mixer (PCM), one or more sand chiefs, an optional acid and/or other chemical supply, a blender, a missile manifold, and a fleet of pump systems (see, e.g., blocks labeled "Pump"). The pump systems are operatively coupled to the missile manifold, which is supplied with fluid via at least the PCM and the blender, which may receive fluid from one or more of the water tankers, which can include conduits operatively coupled via a manifold or manifolds. As shown, the system 1200 can provide for output of blended fluid, optionally with solids (e.g., sand as proppant, etc.) and optionally with chemicals (e.g., surfactant, acid, etc.), to a wellhead, which is a wellhead to at least a partially completed well (e.g., with one or more completion components). As an example, one or more operations may be performed as explained with respect to, for example, FIGS. 3, 4, 5 and 6. For example, hydraulic fracturing can be performed using the system 1200.

FIG. 13 shows another example of a system 1300 that includes various pumps (e.g., pump systems). As shown, a blender can handle sand (e.g., proppant) and water where pumps can direct a slurry to a wellhead.

FIGS. 12 and 13 show monitoring and control equipment (M&C), which may be or include equipment such as the FracCAT equipment (Schlumberger Limited, Houston, Tex.). The FracCAT equipment (a fracturing computer-aided treatment system) includes hardware and software for monitoring, controlling, recording and reporting various types of fracturing treatments. Its real-time displays, plots, surface schematics and wellbore animations present information of a treatment as it occurs, which can provide for decision making using real-time detailed job information from the surface to the perforations.

During a job, M&C equipment can track job parameters, which may be compared to planned values. M&C equipment can use design specifications to control proppant and additive concentrations in one or more blenders. M&C equipment may be operatively coupled to a local area network (LAN) environment, for example, to allow for networking of equipment at a wellsite and provide a connection to the Internet (e.g., through satellite or cellular telephone technology). As an example, Internet connectivity can provide an ability to transmit real-time data from a wellsite to one or more locations (e.g., for real-time analysis, etc.).

As explained, various types of equipment can perform various types of field operations. As an example, a controller can be operatively coupled to one or more types of equipment. For example, consider automotive equipment, airline equipment, engines, transmissions, mining equipment, material handling equipment, construction equipment, rotating equipment, etc.

As an example, a controller can include or be operatively coupled to a machine learning (ML) framework that includes one or more machine learning models (ML models). An artificial neural network (ANN) model can be a machine learning model (ML model). As an example, a trained ML model may be implemented for controlling equipment. As mentioned, a controller can be an optimized controller that is generated via RL on a digital avatar (e.g., or digital avatars). As an example, a method can include providing a digital avatar and performing RL to train a ML model to generate a trained ML model that can be part of a controller (e.g., an optimized controller). Such a controller can be utilized to control a physical asset (e.g., one or more pieces of equipment, etc.).

As an example, a ML model may be utilized with or with a physics-based model. For example, a ML model may augment a physics-based model of equipment to construct a digital avatar of the equipment where such a system can effectively optimize equipment operation in real-time based on conditions indicated via sensor data from one or more sensors and/or other data.

To illustrate an approach for training a ML model and for utilizing a trained ML model, an example that pertains to pump equipment is considered. For example, consider equipment as explained with respect to FIGS. 7, 8, 9, 10, 11, 12 and 13.

As an example, a workflow can include utilizing a machine learning algorithm to automatically process large amounts of data stored in resources of a cloud platform (e.g., in a cloud environment), while the a trained ML model provides real-time feedback embedded in an equipment control system at the edge (e.g., in an edge computing architecture). In such an example, the workflow can include an edge workflow and a cloud workflow, where the edge workflow may be local and the cloud workflow may be remote. As an example, a cloud platform may provide for distributing appropriate models to an edge system. For example, resources of a cloud platform may be utilized for training a ML model to generate a trained ML model that can be distributed to an edge system. In such an example, training may involve utilization of one or more digital avatars.

As an example, a method can include developing a virtual environment to train an equipment controller on one or more digital avatars (e.g., digital avatars of one or more pieces of equipment such as equipment of a pump system). As an example, a method may utilize an ensemble of advanced machine learning techniques to confidently control and operate equipment within global optimal range(s) under given conditions.

Real-time, intelligent automation and control of equipment can allow for operation in an optimum range for given conditions and maximization of reliability and operating life and minimization of downtime (e.g., non-productive time, NPT). As an example, condition-based operation and maintenance can enable just-in-time maintenance to increase asset utilization, which may, in turn, increase efficiency (e.g., resource utilization, profit margins, etc.). A method that helps in avoiding unnecessary maintenance and preventing catastrophic failures can reduce operating and maintenance costs. As an example, automation of equipment operation and real-time control based on equipment conditions can reduce demand for a dedicated human operator, improving safety and operating costs. In various examples, a result can be improved total cost of ownership and service delivery.

As an example, a method can be applied to stimulation pumps (e.g., pump systems for hydraulic fracturing or other stimulation treatments). As an example, consider a master controller for pumps that is a master rate controller (MRC) where a PumpIQ unit can be an embedded component to provide real-time condition-based optimization feedback based on a machine learning algorithm processing data acquired from one or more MRCs.

As an example, a MRC can aim to achieve autonomous operation that is condition based, and at the same time, co-optimized for performance, horsepower produced, health and efficiency of pumps. However, a MRC does not necessarily by itself automatically control degraded pumps; thus, an operator may have to intervene and manually adjust one or more control parameters. Due to the complex and non-linear nature of pump system behaviors, a physics-based model, such as a Frac Pump Optimization Calculator (FPOC), may not be suitable to simulate precisely how a pump system will react to various control parameters.

While a FPOC may give a MRC a theoretical basis for pump control, with varying pump system deterioration, a FPOC can fail to customize and adapt. To complement a FPOC, a MRC can be utilized for planning that adds support for condition-based operation using thresholds, yet with some limitations.

As an example, where a PumpIQ approach is utilized, it can exceed a MRC's condition-based operation capabilities. As an example, a PumpIQ approach can utilize deep learning (DL), for example, to provide a data-driven pump model, which may optionally complement FPOC, and an optimized control algorithm that is adaptive to pump system deterioration.

As an example, a machine learning model (ML model) approach of a PumpIQ unit can include multiple components, including a pump system simulator and pump system controller. In such an example, the pump system simulator can be or include a digital avatar of at least a portion of a pump system.

Figure 14:
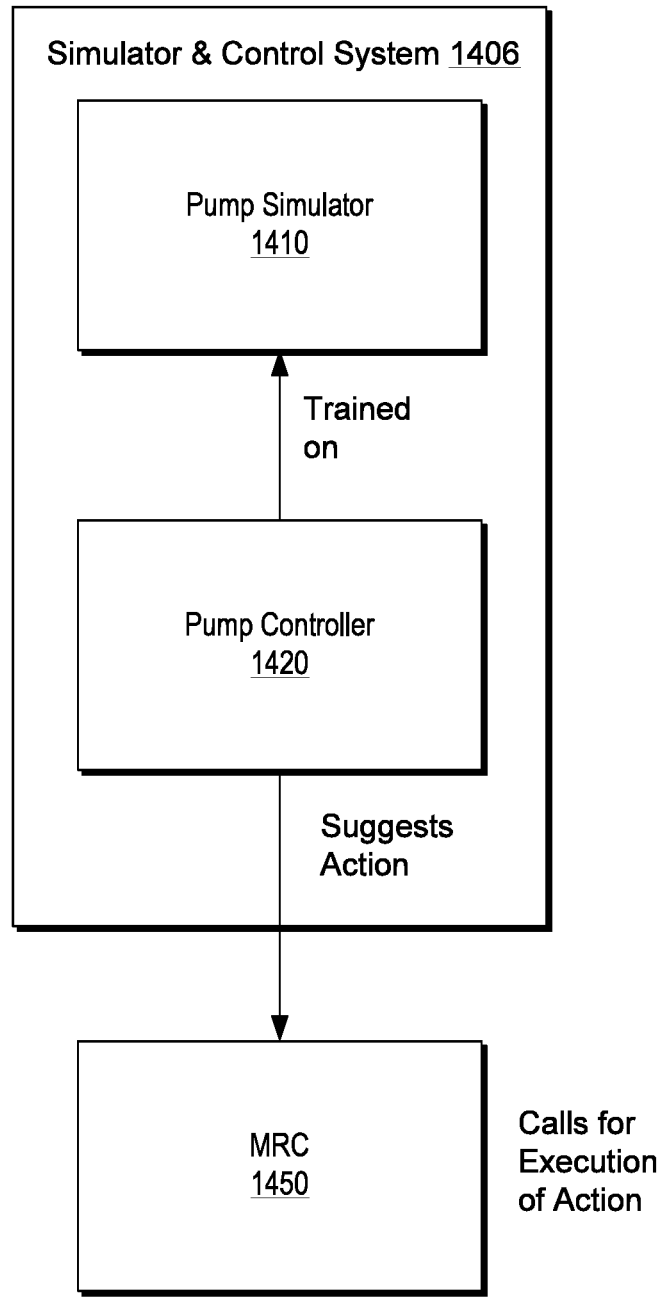
FIG. 14 illustrates an example of a system.

FIG. 14 shows an example of a system 1400 that includes a simulation and control system (SCS) 1406 that includes a pump simulator 1410 and a pump controller 1420 where the SCS 1406 is operatively coupled to a MRC 1450. As shown, the pump controller 1420 can be trained on output of the pump simulator 1410 and the pump controller 1420 can output actions (e.g., suggested actions) for execution by the MRC 1450, which can call for one or more actions (e.g., to operate one or more pieces of equipment). As an example, the pump simulator 1410 can provide a near-actual data-driven model that describes a plurality of channels (e.g., consider 14 or more (e.g., consider a command and control center (CCC), which is a control component of the MRC 1450), where the number of channels can be greater than a number of channels of a FPOC. As an example, the pump controller 1420 can utilize deep reinforcement learning (Deep RL) as a type of deep learning (DL) that is suitable for a focus on control problems.

As an example, the pump simulator 1410 can be trained with data from a plurality of fleets from a plurality of wellsites. For example, consider training a pump simulator with a period of data from a plurality of fleets from a plurality of wellsites where the data may be of the order of gigabytes (e.g., tens of GB or more) and at a suitable sampling rate (e.g., per millisecond, per second, per minute, etc.). Such an approach can include utilizing data for a plurality of channels (e.g., more than 6 channels, such as 18 channels or more). Such an approach can utilize data in temporal intervals. For example, consider handling of data in temporal intervals of seconds, minutes, etc. As an example, training data may be from a period of time or periods of time for one or more fleets. For example, consider selection of training data on a stage-by-stage basis of a hydraulic fracturing operation for a wellsite. As an example, training data may be from a week of operations, weeks of operations, etc. Above, various data amounts, times, rates, etc., are mentioned, which may be tailored to a particular operation or operations (e.g., pumps, other than pumps, etc.). Various types of operations can differ in time scales, channels, data, etc., and a system such as the system 1400 may be tailored to such operations, equipment, etc.

As an example, the pump controller 1420 can be trained on thousands of different random initializations where, for example, an episode can run for an amount of time, which may be in virtual seconds (e.g., a minute to a few minutes of virtual time), which may correspond to a number of clock seconds. As an example, a suggestion latency (see, e.g., "suggests action") may be relatively low, for example, consider a suggestion latency of less than one second (e.g., of the order of milliseconds, etc.). Above, various data amounts, times, rates, etc., are mentioned, which may be tailored to a particular operation or operations (e.g., pumps, other than pumps, etc.). Various types of operations can differ in time scales, channels, data, etc., and a system such as the system 1400 may be tailored to such operations, equipment, etc.

As an example, the SCS 1406 can be a PumpIQ unit that can use a brain-like neural network structure that incorporates anomaly detection, compressed sensing, time series modeling and deep Q-learning, which may achieve a beyond human-level of understanding of pump system dynamics and control. As an example, through millions of steps of training of a pump simulator, a PumpIQ unit can learn to understand abnormal conditions without exhaustive definition. As an example, a system can include monitoring a number of data channels over time intervals while distilling information such that a PumpIQ unit is built to understand a "bigger picture" effectively and efficiently. With a global understanding of particular pump system conditions, a pump controller can suggest proactive actions to a MRC, for example, before a threshold condition may occur. As an example, training of a pump controller can enforce an optimization of long-term cost, which can result in a globally-optimized control scheme.

As an example, a system can leverage an abundance of sensor data from a pump system and/or associated equipment. As an example, a method can include using deep learning (DL) to model pump system behavior, for example, based on gear change (e.g., gear shifting, etc.) and throttle change (e.g., fuel changes, etc.). A system can be trained in a manner such that it aims to provide a simulation of "how will a pump system react" from control parameters. Such an approach can effectively take at least some guesswork out of the picture at a wellsite, for example, allowing a MRC to dynamically change its orchestration in real-time.

As explained with respect to the system 1400 of FIG. 14, various trained ML models can enable a MRC for optimized real-time decision making and proactive actions to minimize impending failures.

As explained, hydraulic fracturing is a well stimulation technique in which rock is fractured by a pressurized fluid. To pressurize the fluid (e.g., increase fluid pressure), a fleet of frac pumps (e.g., pump systems) can be utilized where operational control is conducted inside a control center structure (e.g., equipment in a frac van). As an example, a pump system can include various components such as an internal combustion engine, a transmission, a power end, and a fluid end. In such an example, the engine and the transmission can function to provide power where it is transferred through a power end and eventually pressurizes fluid in the fluid end.

A pump system can be equipped with an array of different sensors on various components. Some of the channels of sensor readings can include engine percentage load, oil pressure, etc. These sensors can allow an operator (or operators) inside of a frac van to monitor pump conditions and make appropriate adjustments. As an example, automatic control may be effectuated using one or more suggested actions. As an example, a semi-automated control may be effectuated where a suggested action is associated with a control instruction (e.g., control signal, control command, etc.) where an operator may review and pass through and/or halt transmission of the control instruction.

As an example, a MRC can allow for a more streamlined control interface for pump operators. As an example, a MRC can monitor certain channels of a sensor array and, for example, automatically raise one or more alarms with respect to one or more certain predefined thresholds. As mentioned, an optimized controller may be operatively coupled to a MRC or, for example, may be part of a MRC (e.g., integrated into a MRC).

As an example, a PHM component can be designed to predict a single-channel alarm or multi-variate alarm, while providing a context in operating pumps; for example, high risk pumps can be proactively allocated to lower duty-cycle field jobs or operated more conservatively than specifications. In such an example, an intelligent allocation of equipment can be achieved that can meet demands while addressing risks, which may help to reduce undesirable operation or failure of a higher risk piece or pieces of equipment. As an example, a PHM component may also generate one or more triggers for maintenance, for example, such that maintenance work is performed proactively and based on condition. As an example, a method can include adjusting scheduling of maintenance work by intelligently adjusting demands amongst a plurality of pumps. In such an example, scheduling may be adjusted such that a maintenance team member or members can operate effectively, for example, at the end of a stage, successively on adjacent pumps, etc., which may help to reduce NPT, risk of movements of people and equipment, etc., while still meeting operational targets (e.g., achieving a desired fracturing result for a stage or stages, etc.).

In complementing a PHM component, a PumpIQ unit may act as a real-time advisor for a MRC at a wellsite. For example, consider reading of a data stream from a CCC where a PumpIQ unit can generate real-time control suggestions for a MRC, where the MRC may eventually decide whether to execute one or more suggestions, for example, due to a crew-level demand to stay at a designed rate.

Figure 15:
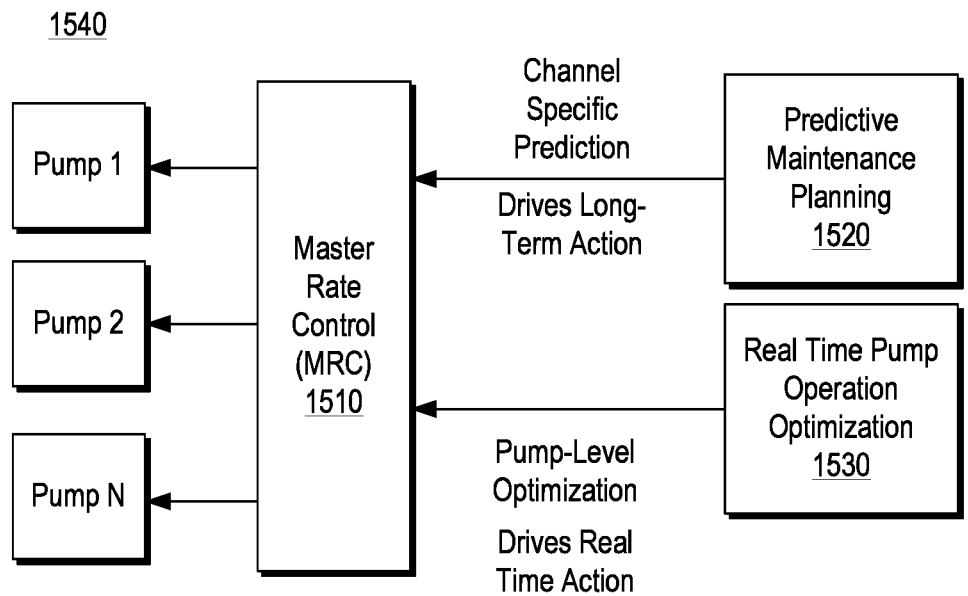
FIG. 15 illustrates an example of a system.

FIG. 15 shows an example of a system 1500 that shows a MRC 1510 with a predictive maintenance planning component 1520 (e.g., a PHM component) and a real time pump operation optimization component 1530 where the MRC is operatively coupled to a plurality of pump systems 1540 (e.g., labeled Pump 1, Pump 2, ... Pump N). As shown, the predictive maintenance planning component 1520 can provide channel specific prediction that can drive long-term action and the real time pump operation optimization component 1530 can provide pump-level optimization that can drive real time action. As such, the MRC 1510 can be provided with input that operates at multiple time frames (e.g., multiple time scales such as a real time scale and an operational life time scale).

FIG. 15 provides some details as to how various components of the system 1500 can interact with each other at a wellsite. With the help of a PumpIQ unit, a workflow at a wellsite can become connected and data-enriched. A PumpIQ approach can further reduce demand for or on a pump operator by automating a workflow of handling impending failures, while providing optimized control suggestions to assist a MRC's decision making.

Figure 16:
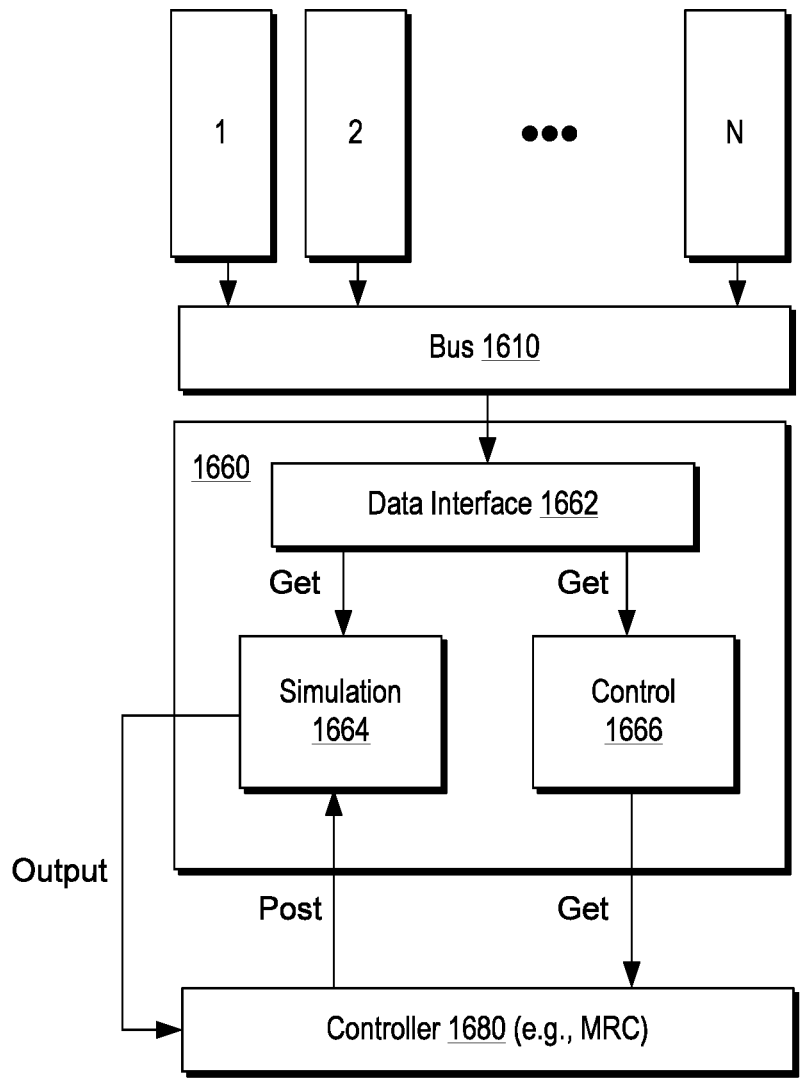
FIG. 16 illustrates an example of a system.

FIG. 16 shows an example of a system 1600 that includes a bus 1610 that is operatively coupled to various equipment (e.g., 1, 2, ..., N), a simulation and control system (SCS) 1660 that is operatively coupled to the bus 1610 to receive information associated with the equipment, and a controller 1680 that is operatively coupled to the SCS 1660 and that can effectuate at least some amount of control over the equipment (e.g., via appropriate control networks, interfaces, etc.).

In the example of FIG. 16, the SCS 1660 includes a data interface 1662, a simulation component 1664 and a control component 1666. The simulation component 1664 and the control component 1666 can "get" data received via the data interface 1662 and the controller 1680 can "get" control information from the control component 1666. As shown in the example of FIG. 16, the controller 1680 can "post" information to the simulation component 1664, which can, in response, generate output for the controller 1680. The controller 1680 may operate to control equipment (e.g., one or more pieces of equipment) based at least in part on information received from the SCS 1660.

As an example, the control component 1666 can include an inference network that can be an encoder that operates to compress data received by the data interface 1662 where a compressed (e.g., encoded) representation is processed within the control component 1666 by a Q-model, which can be a trained neural network. The Q-model can generate output that is received by the controller 1680, which may be a recommended control action, where the controller 1680 may post information to the simulation component 1664 to determine whether the recommended control action is suitable (e.g., desirable) for implementation, for example, based on output of the simulation component 1664. If so, the controller 1680 can issue information such as one or more instructions, commands, signals, etc., to cause a piece of equipment to perform an action.

The system 1500 of FIG. 15 can include one or more features of the system 1600 of FIG. 16. For example, the SCS 1680 can be operatively coupled to the MRC 1510 of FIG. 15 (e.g., as the controller 1680) and, for example, the pumps in FIG. 15 can be equipment as in FIG. 16.

As explained, the pump examples are provided to demonstrate operation of a system such as the SCS 1660 of FIG. 16 in a particular context; noting that the SCS 1660 may be implemented in one or more other contexts (e.g., for pump equipment and/or other equipment).

As an example, the SCS 1660 may be configured to operate such that the simulation component 1664 is a pump simulator and such that the control component 1666 is a pump controller (see, e.g., the pump simulator 1410 and the pump controller 1420 of FIG. 14). As an example, the SCS 1660 can be configured to be a PumpIQ unit.

In the example of FIG. 16, the SCS 1660 can include the simulation component 1664 and/or the control component 1666 as docker containers, which may be utilized to provide a secure, sealed, reproducible production environment.

A system such as the SCS 1660 of FIG. 16 can provide an environment that can be readily scaled for various types of data, as may be associated with equipment. As an example, the SCS 1660 may be implemented in a manner that utilizes an edge and cloud architecture. For example, consider training a model using cloud resources and then deploying on a trained model on an edge. In such an approach, the trained model may implement equipment control at the edge in a manner that applies parameters to the trained model.

As an example, a SCS may be utilized for optimizing assets, for example, running operation(s) with less equipment, automating performance to achieve consistency, running equipment within a desired operating range(s) to reduce failures, etc.

As an example, a SCS can be based on modelling with system level integration. For example, a model can integrate multiple component failures and determine how failures interact. Such an approach can extend beyond simple prediction of failures on a single component level. For example, if component 1 in a fracturing pump fails, then the pump is down, and it does not matter that component 2 will not fail until later.

As an example, a SCS can be implemented in an environment that can be networked at a site such as, for example, a wellsite. As an example, a SCS or multiple instances of SCSs can be implemented in a networked environment for a plurality of sites (e.g., consider inter-wellsites, etc.). As an example, a SCS can be operatively coupled to a network such as the Internet, a cellular network, a satellite network, etc. As an example, a SCS can be networked for interactions with a cloud platform or cloud platforms. As an example, a SCS may be implemented in part or in whole in a cloud environment.

As mentioned, an approach can utilize modeling that aims to optimize asset utilization. For example, consider enabling running one or more operations with less equipment, running equipment within desired operating ranges to reduce failures and increase reliability, performing automated adjustment of operating ranges to improve consistence and failure prediction, reducing power consumption (e.g., fuel, electrical, etc.) by optimizing performance.

As an example, a model as in an SCS may be applied at different system levels. For example, consider implementation in a system such as the system 1300 of FIG. 13 where system levels can include a fracturing pump level, a group of fracturing pumps level, and a fracturing fleet level (e.g., pumps, fluid ends, blender, etc.).

Figure 17:
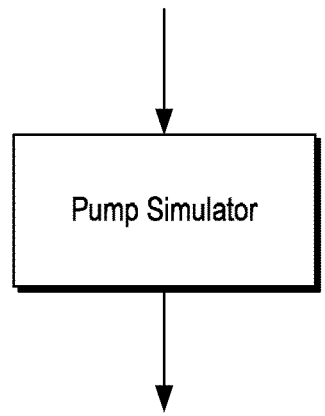
FIG. 17 illustrates examples of methods.
Figure 17:
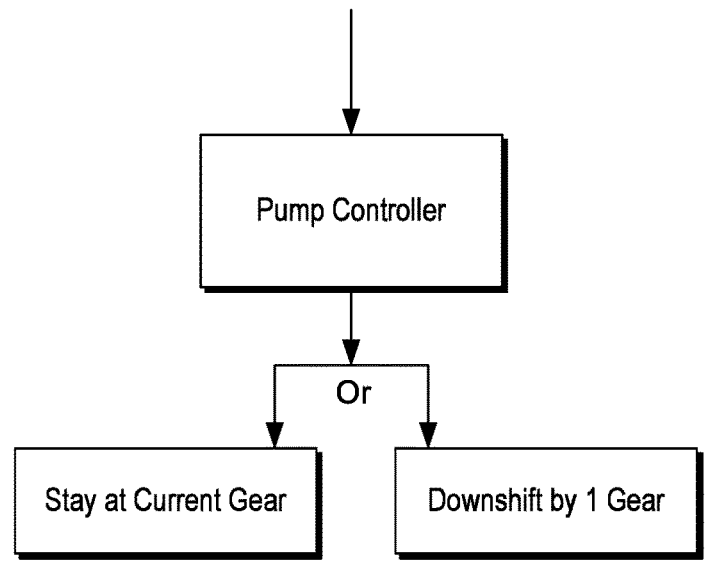

FIG. 17 shows an example of a method 1710 and an example of a method 1750 where the method 1710 pertains to a pump simulator and where the method 1750 pertains to a pump controller. As shown, the method 1710 can include receiving a gear value and a throttle value and outputting one or more predicted sensor values (e.g., sensor readings). As shown, the method 1750 can include receiving one or more sensor values (e.g., sensor readings) and outputting information such as, for example, one or more suggestions (e.g., stay at current gear, downshift by one gear, etc.).

In the example of FIG. 17, the simulator component can operate to store past states of pump systems (e.g., 10 seconds intervals, etc.) and takes an input of one or more control parameters (e.g., gear, throttle, etc.) to predict states given the input.

As an example, once a prediction is made, one or more newly predicted values can be appended to internal states and the first state can be popped. In other words, in the context of an avatar, such an avatar can act to preserve a history of at least one state (e.g., a history with respect to time, etc.).

Figure 18:
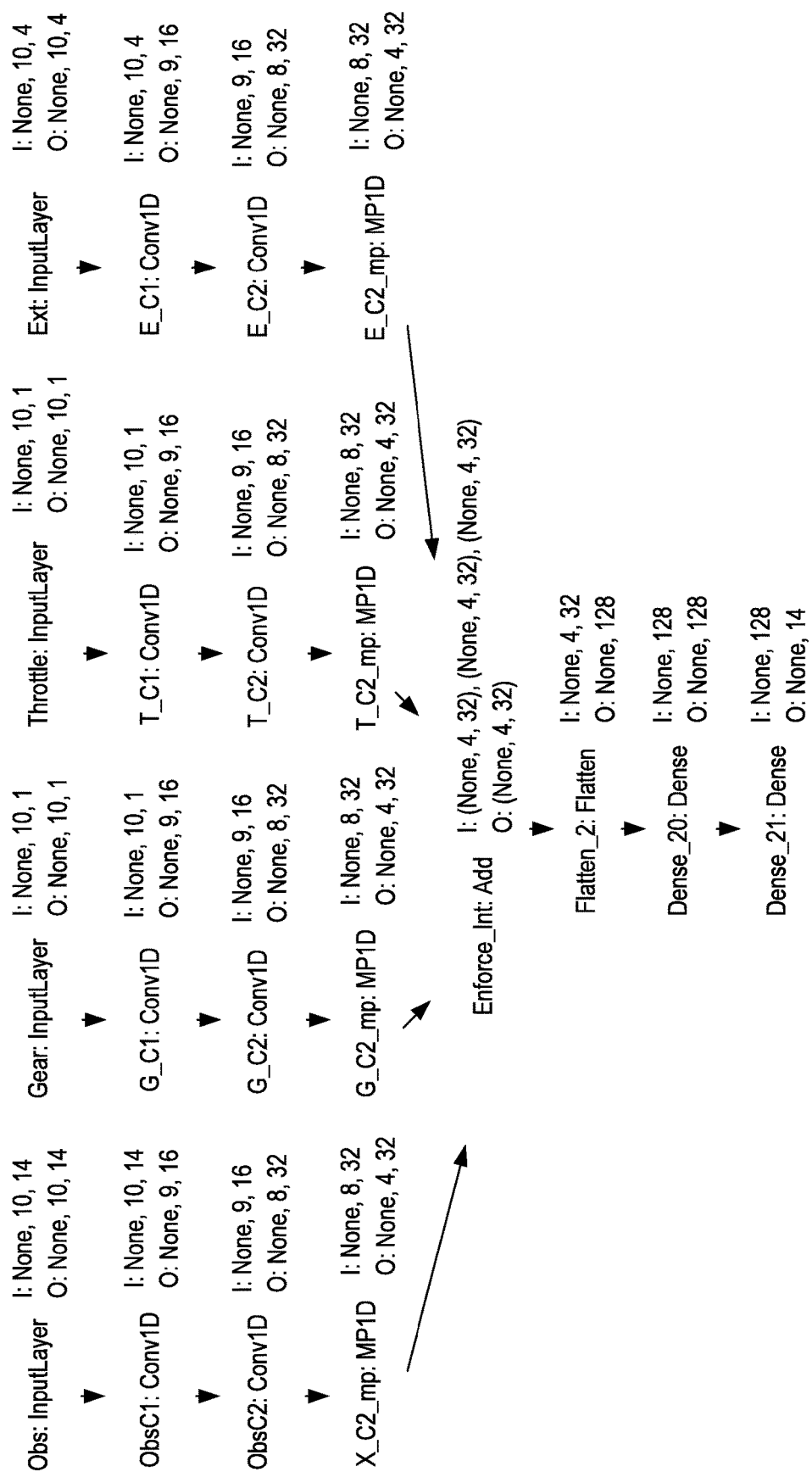
FIG. 18 illustrates an example of an architecture.

FIG. 18 shows an example of an architecture 1800 for deep learning (DL). As mentioned, a method can utilize a deep learning model architecture for generating an avatar (e.g., a digital avatar).

As an example, a pump simulator can use an ensemble of different neural networks. For example, consider one or more of the following: a dense—linearly connected network; 1D convolutional—learn short-term features; a locally connected—learn nuisance short-term features; a gated recurrent unit (GRU)—learn temporal structure; long short-term memory (LSTM)—learn long-term features; and bidirectional LSTM—learn contextual long-term features.

As an example, a pump simulator can include one or more of the following features: multi-input; "enforce layer"; and rolling forecast with unsupervised voting ensemble.

As to multi-input, various types of neural networks accept a pre-concatenated array of vectors as input; however, such scheme can suffer from various drawbacks. With a flattened array, a convolutional filter from a temporal convolution layer can convolve two sets of inputs that are from different origins, such as gear and throttle, resulting in misinformation. To address such a result, a multi-input network can be utilized where each lineage of tensor of a single origin is convolved with itself, avoiding scrambled information.

As to an enforce layer (e.g., an enforcement layer), it can find some aspects in a physical model, for example, where predicted sensor values are a result of non-linear function that combines gear, throttle, external inputs such as discharge pressure and engine type, and current states. For example, an approach can include a particular layer that enforces different linage of tensors to interact with each other in a non-linear manner that can provide a state-of-the-art result that has an average of 0.8% error in a 120-second simulation testing.

Figure 19:
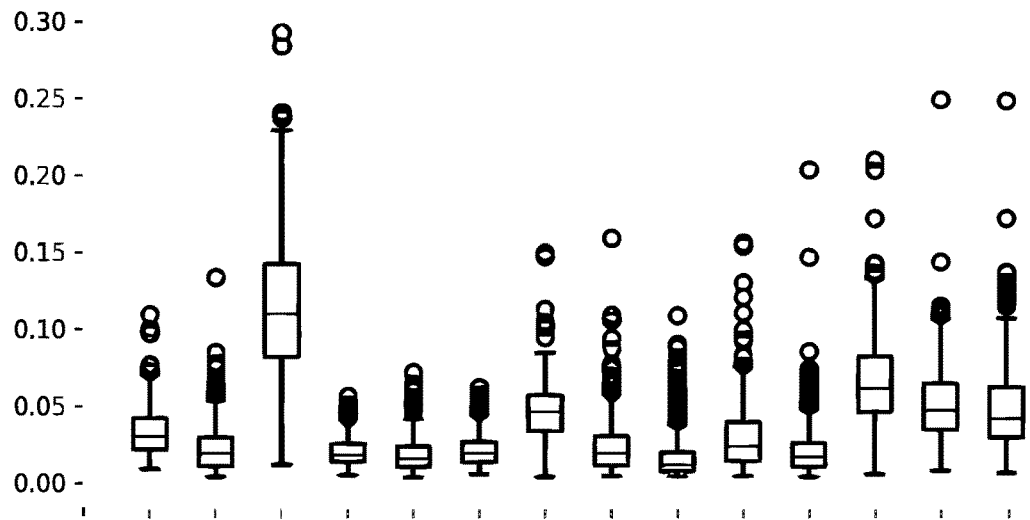
FIG. 19 illustrates example plots of model error with respect to various data channels.
Figure 19:
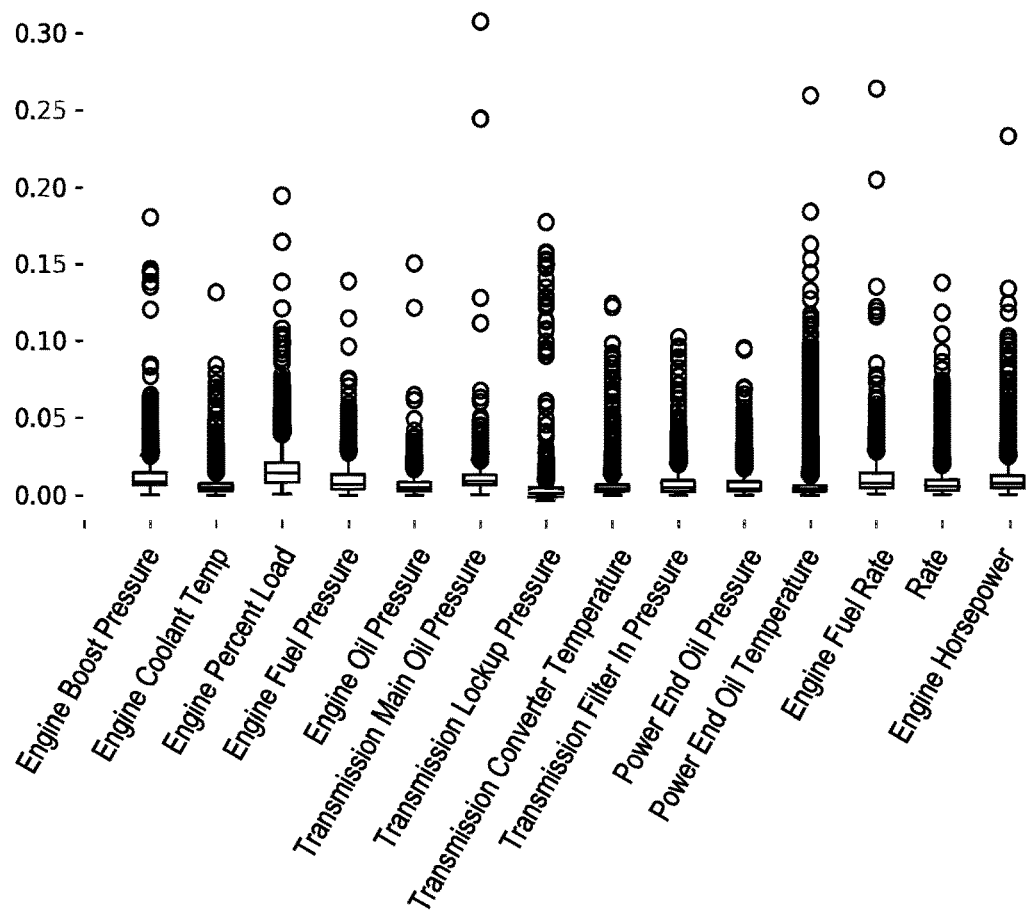

FIG. 19 shows example plots 1910 and 1930 where the plot 1910 is of transient state error characterization of error versus various channels and where the plot 1930 is of model steady state error characterization of error versus various channels, where the example channels shown include engine boost pressure, engine coolant temperature, engine percent load, engine fuel pressure, engine oil pressure, transmission main oil pressure, transmission lockup pressure, transmission converter temperature, transmission filter in pressure, power end oil temperature, engine fuel rate, rate and engine power (e.g., horsepower).

As to transient state error characterization, while tending to be larger than for steady state, the error remains acceptable for purposes of improved control. As an example, a control scheme can utilize a system (see, e.g., the system 1500, the system 1600, etc.) where intelligent control can manage transient states, which can reflect change(s) in conditions and/or health of one or more pieces of equipment. The plot 1910 provides statistical validation of such intelligent control.

As to a rolling forecast with an unsupervised voting ensemble, a simulator component can be designed to peek into the near future (e.g., to predict a state that may be in advance of a current time by a certain amount). In such an approach, a system can be able to confidently use predicted values as new inputs for a next prediction. To boost confidence in the predicted values, an approach can be utilized that mimics a discrete voting process using a modified version of K-Means. This approach allows for effectively combining multiple different outputs from a family of simulators and at the same time discarding less accurate predictions.

As an example, a model architecture can utilize one or more of multi-input; an enforce layer; and a rolling forecast with unsupervised voting ensemble. As an example, such an architecture can be applied one or more types of operations that involve various types of equipment that may be controlled (e.g., to simulate their behaviors).

Referring again to FIG. 17 and the method 1750, a pump controller block is shown. The pump controller can use RL to achieve a pump-level, fully automated and optimized pump control. The method 1750 shows examples of input and output for the pump controller. The input can be real-time data streams from a CCC at a wellsite and the pump controller can utilize such input to decide, for example, whether to stay at a current gear or to downshift (e.g., or to upshift). The example of FIG. 17 shows sensor input and output as examples; noting that one or more other inputs may be included additionally or alternatively and one or more outputs may be provided additionally or alternatively.

Figure 20:
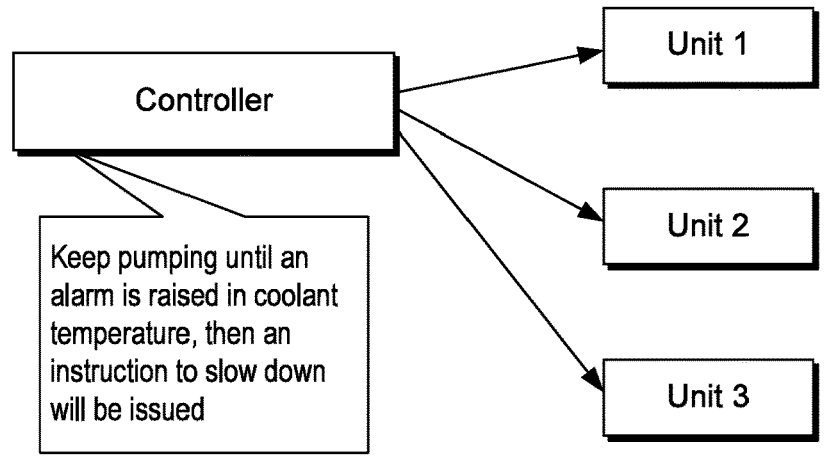
FIG. 20 illustrates examples of methods.
Figure 20:
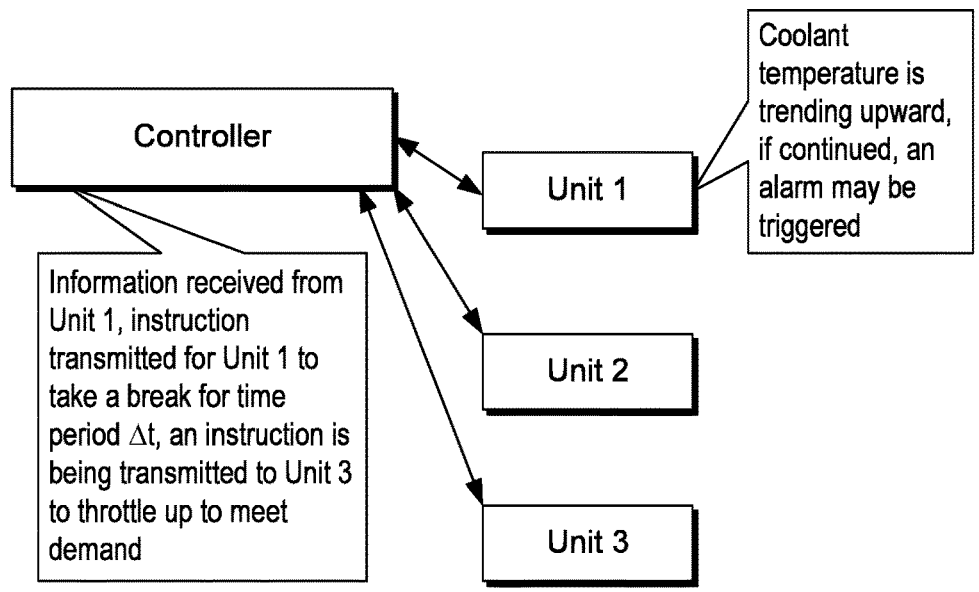

FIG. 20 shows an example of a control scheme 2010 and an example of a control scheme 2050. In FIG. 20, a MRC may be portrayed as a coach and each pump system as a player to showcase some difference between the MRC control scheme 2010 and the PumpIQ assisted control scheme 2050, which includes an artificial intelligence (e.g., machine learning) approach rather than merely threshold-based operation. As explained, the method 2050 can manage a fleet in a manner that aims to achieve a desired goal or goals, which may include reducing risk of failure of one or more members of the fleet. As mentioned, a method can include adjusting scheduling of maintenance through control of one or more members of a fleet, for example, to allow for a maintenance team to operate more effectively (e.g., reduced time demands, reduced movements of equipment and people, etc.).

As an example, consider a common failure mode being applied in both methods 2010 and 2050, such as a failure mode of high engine coolant temperature. In the method 2010, the MRC's threshold-based approach will keep running the pump until the threshold condition is met. The threshold-based operation eventually takes action; however, in the PumpIQ assisted approach of the method 2050, action can be taken proactively. On the lower side, each pump, enhanced with the intelligence of PumpIQ can be able to detect trends and pre-anomalies. In such an example, each pump can negotiate with the MRC to determine its best gear and/or throttle, which can be constrained such that pumps are not operated out of specifications.

As an example, a pump controller can use a variational autoencoder (VAE) to compress sensor readings to a low dimensional representation and the pump controller can be trained to make decisions based on the compressed signals. Such an approach can drastically reduce controller complexity and substantially boost controller learning speed, for example, allowing for convergence within as little as 0.4 million steps.

As an example, a controller's training can mathematically guarantee that it will take optimal actions on a forward-looking time horizon, meaning that it is able to proactively take action on impending failures. Further, the learning of an "abnormal situation" does not demand exhaustive definition as the controller is able to autonomously identify an abnormal situation and take appropriate actions (e.g., suggest appropriate actions to a MRC, etc.). While the pump controller is described in various examples with respect to a pump system, such a controller may be applied to one or more other types of equipment (e.g., for control thereof, etc.).

Figure 21:
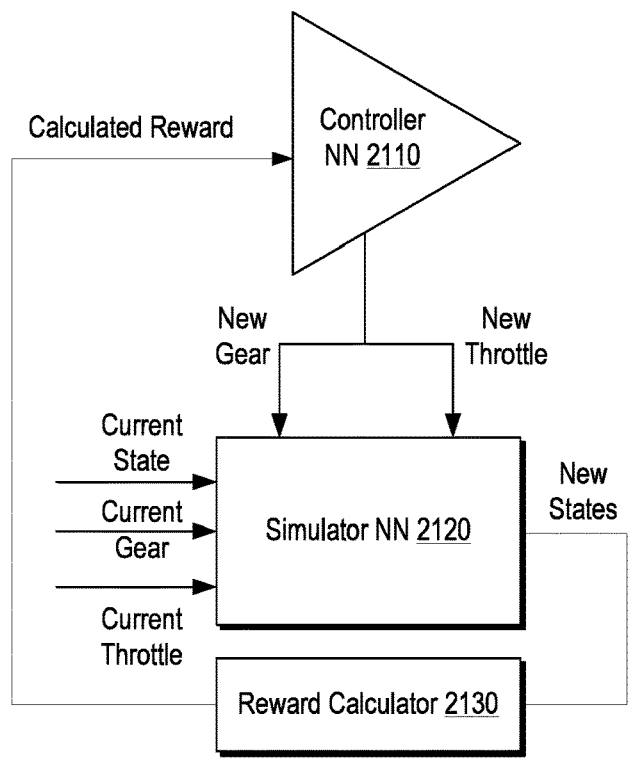
FIG. 21 illustrates examples of methods.
Figure 21:
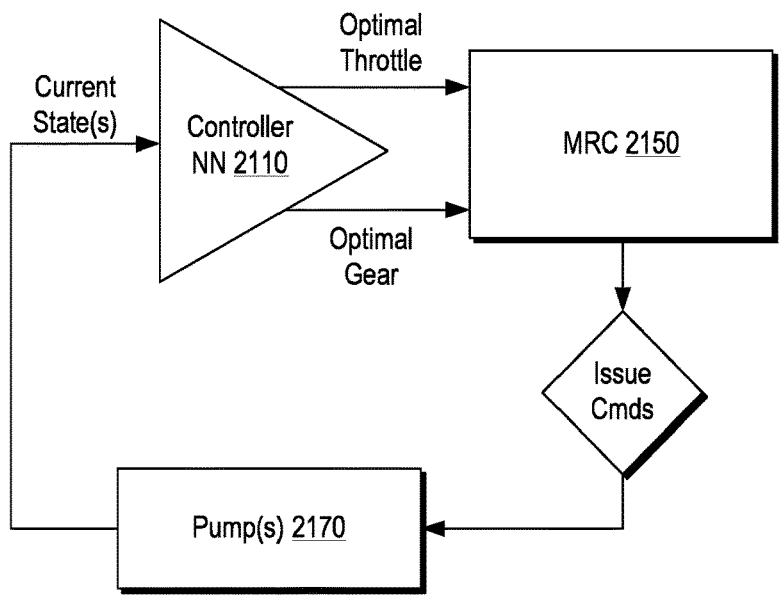

FIG. 21 shows an example of a training method 2100 and an example of an inference method 2105. The training method 2100 includes a controller 2110, a simulator 2120 and a reward calculator 2130. As shown, the controller 2110 and the simulator 2120 can be neural network machine learning models. The examples of FIG. 21 are given in the context of pump systems, for example, to facilitate understanding of how pump systems can be controlled; noting that such methods may be utilized for one or more other types of control scenarios using equipment that may or may not include a pump or pumps.

As shown in the method 2100, the simulator 2120 operates by receiving current state, current gear, current throttle, new gear and new throttle to output a new state or states, which can be assessed by the reward calculator 2130. As shown, the reward calculator 2130 can output a calculated reward to the controller 2110, which can be a type of feedback as to its output of the aforementioned new gear and new throttle. For example, one or more of those values may result in a new state or states that are less than desirable and hence cause the reward calculator 2130 to generate little reward; whereas, if the new state or new states are desirable, the reward calculator 2130 can generate a greater reward for the controller 2110.

As to the method 2105, the controller 2110 is shown as being a trained controller (e.g., a trained machine model). The controller 2110 can utilize input indicative of a current state of one or more pumps 2170 (e.g., a fleet of pump systems) to generate an optimal throttle and/or an optimal gear for one or more of the pumps, which can be received by a MRC 2150. As shown, the MRC 2150 may maintain ultimate control in deciding whether to issue one or more commands to one or more of the one or more pumps 2170.

As explained with respect to FIG. 21, a simulator can be a neural network that is utilized in training a controller where a reward calculator can effectively damp the output of the controller. For example, if the controller outputs "bad" (e.g., detrimental) new gear and/or new throttle values, it can be "tamed" such that one or more pumps (see, e.g., the one or more pumps 2170) do not enter an undesirable state based on suggestions output by the controller 2110, as trained, to the MRC 2150. In such an approach, the MRC 2150 may be operated without an additional burden as to concerns about "bad" suggestions as those have been addressed during training of the controller 2110. As an example, a reward calculator as in the method 2100 may be configured to cause a controller to be more conservative or less conservative as to its state-based outputs.

As to a reward calculator, as an example, a gradient function (e.g., a sloping function) may be utilized. For example, consider a gradient function that is utilized by a reward calculator (e.g., as a reward function). In such an example, a gradient function can include a desired range for each of a plurality of parameters. In such an example, rather than simply providing a reward for being within a specified range and not providing a reward for being outside of the specified range, a gradient is applied based on how far outside a result is from the specified range. In such an approach, values of parameters may be outside a corresponding specified range and a model tuned based on optimized parameters, for example, the gradients/scaling of reward amount and slope can be tuned based on training data (e.g., data from one or more operations, etc.).

Figure 22:
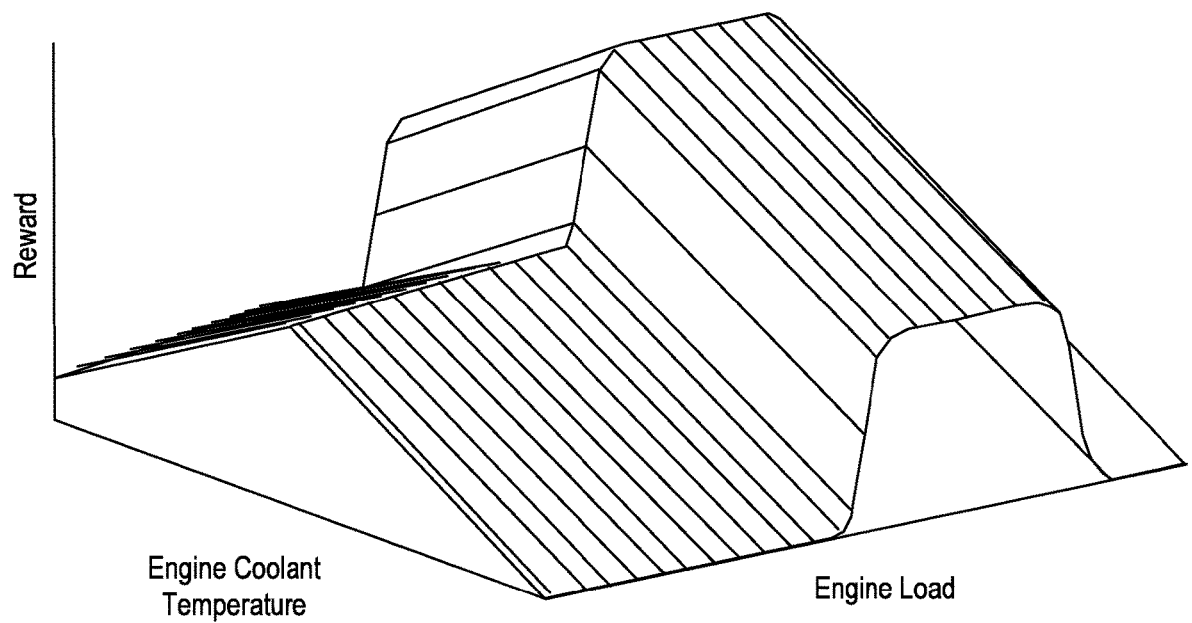
FIG. 22 illustrates an example of a reward function.

FIG. 22 shows an example of a reward function 2200 for two parameters such that the reward depends on values of the two parameters. Specifically, the reward function 2200 shows engine coolant temperature and engine load parameters along with reward values. The engine coolant temperature is plotted along an x-axis while the engine load is plotted along a y-axis where reward values are plotted along a z-axis. As shown, gradients exist for reward versus engine coolant temperature for values less than a particular engine coolant temperature and for values greater than the particular engine coolant temperature. In the example of FIG. 22, the reward function 2200 has a triangular shape with respect to engine coolant temperature. As to engine load, the shape of the reward function 2200 includes an approximate step up, an approximate plateau and an approximate step down, which cover a range of engine loads (e.g., between a step up or ramp up value and a step down or ramp down value). While two parameters are illustrated in FIG. 22, a reward function may depend on one or more parameters (e.g., one, two or more than two). As an example, the reward calculator 2130 of the training method 2100 can include one or more reward functions. For example, the reward calculator 2130 can include the reward function 2200. As shown, in the example of FIG. 21, the reward depends on a new state as output by the simulator 2120.

As an example, where a controller provides valuable output, it is rewarded; and, if not, it is not rewarded (e.g., punished, lesser value "reward", etc.). As an example, a reward can be defined by a number of statements such as, for example: (i) keeping the engine coolant temperature below X degrees (e.g., consider 200 degrees F.); (ii) keep the engine load between Y1% and Y2% of maximum load (e.g., consider 60 percent to 80 percent); and (iii) maintaining a 1500 HHP while pumping. Such statements may be adjustable.

Figure 23:
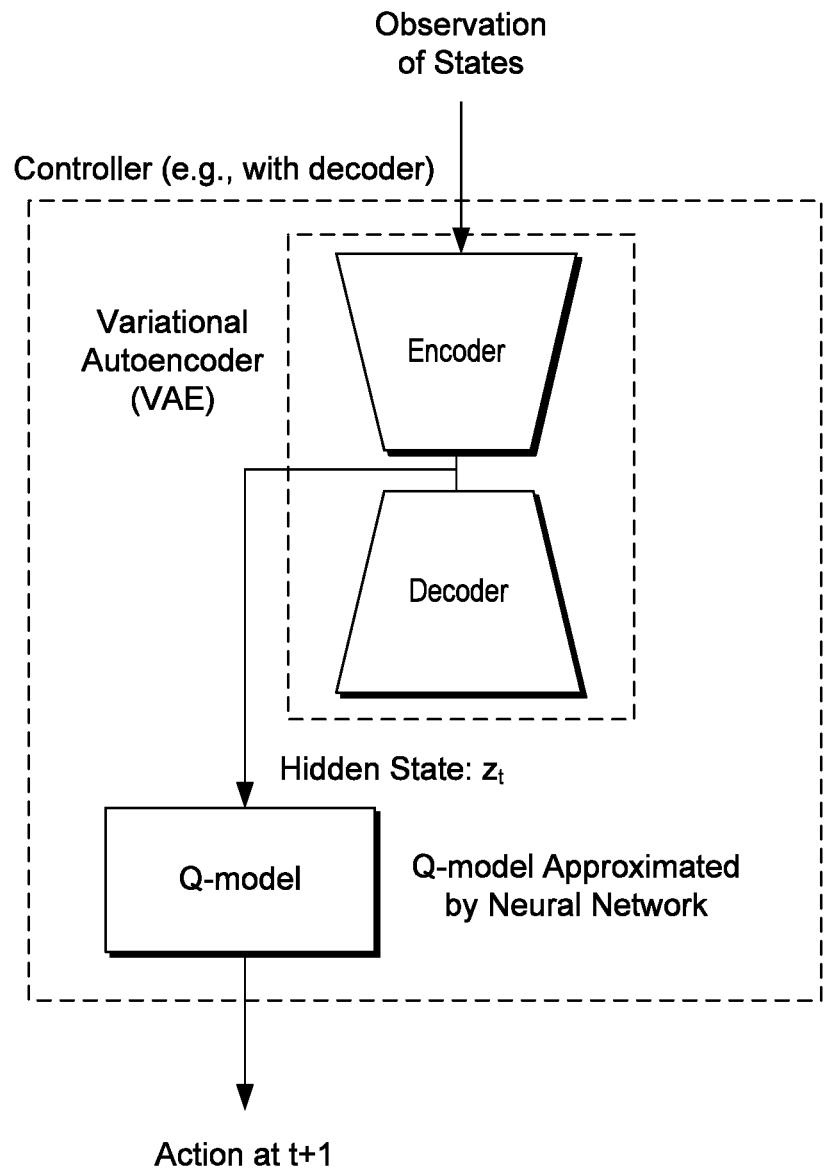
FIG. 23 illustrates an example of a system.

FIG. 23 shows an example of a system 2300 that includes a controller, which is shown as a full controller. In such an example, current and past state information can be received and compounded into a single matrix, denoted C. The matrix C can be passed into a variational autoencoder (VAE) where it is compressed, for example, to a normal-distributed, low-dimension representation zt (e.g., a latent space representation). The dimension zt is less than the dimension of the input state information. As shown, zt can be passed into a Q-model where the Q-model generates an expected future reward, denoted R*, for actions A. As shown, an action, denoted a, can be selected from the actions that maximizes the future reward R*. As an example, various operations of the system 2300 may be expressed as follows: $C = \{S_{t-n}, S_{t-n-1}, \ldots, S_t\}$ where S is within a set R, which is large (e.g., $R^{10 \times 14}$) and action at t+1=argmax R* of action a within set of actions A.

In the example of FIG. 23, the VAE can be pre-trained. For example, the VAE can be a ML model that is trained using training data to generate a trained ML model. As explained, the VAE includes an encoder and a decoder. A trained VAE includes a trained encoder and a trained decoder, for example, as trained together using training data, test data, etc. In the example of FIG. 23, the controller can optionally include the encoder without including the decoder. For example, the controller can operate using a trained encoder that is a pre-trained encoder. Such a pre-trained encoder can be utilized in a method such as the method 2100 of FIG. 21 for training a ML model such as the Q-model of the example of FIG. 23. Thus, in the example method 2100 of FIG. 21, training can be for a Q-model of the controller 2110 where an encoder (e.g., a compressor) of the controller 2110 is pre-trained and where the simulator 2120 is pre-trained. Further, the reward calculator 2130 may be part of the controller 2110 or separate therefrom but operatively coupled thereto for purposes of training the controller 2110 (e.g., a Q-model of the controller 2110).

As an example, for control of equipment, a control scheme may utilize trained simulator (e.g., a digital avatar, etc.). For example, such a simulator may be for a planning purpose. In such an approach, consider a pump in first gear being able to pump at a rate where a MRC desires to "know" what may happen if the pump is shifted to a different gear. In such an approach, the MRC can post the question to the simulator and, in response, receive an output. For example, consider the system 1600 of FIG. 16 where the controller 1680, which may be a MRC, posts information to the simulation component 1664, which responds by outputting information to the MRC (e.g., simulation-based information). In such an approach, the MRC may make a determination as to a control action to be issued to one or more pieces of equipment (e.g., at a future time, etc.). As an example, where the MRC issues a control action, which results in a change in data generated by one or more sensors as received by the data interface 1662, etc., the control component 1666 can output one or more actions to the controller 1680. In the example of FIG. 16, the controller 1680 may plan ahead using the simulation component 1664. The control component 1666, using a current running situation, can output one or more actions that may aim to reduce risk of one or more future problems and/or to meet one or more goals (e.g., as to be achieved at a future time). In such an approach, the control component 1666 can be an optimized control component 1666 that can provide for optimal operation of equipment, which may be in a changing environment. As an example, an optimized control component 1666 can provide for optimal control and, for example, reduce risk (e.g., as to goals pertaining to equipment, environment, power, etc.).

During training, as in the method 2100, where the controller 2110 includes a Q-model, a first iteration may involve randomly selecting an action or actions; whereas, a subsequent iteration is informed by information generated by the reward calculator 2130. In the method 2100, reward compounding can be utilized where, for example, R* can be based on a series of rewards for a plurality of associated times. As explained, a Q-model can be trained using a reward (e.g., or rewards). As an example, a reward can be a digital avatar-based reward. For example, the simulator 2120 in the method 2100 can be a digital avatar that generates output using input (e.g., at least in part from the controller 2110) where the output of the simulator 2120 is utilized by the reward calculator 2130 to generate a reward value, which, as explained, can be based at least in part on one or more gradients. The simulator 2120 and the reward calculator 2130 can be considered as forming a feedback loop for the controller 2110. As an example, a Q-model can determine one or more actions with associated expected return.

In the example method 2100, training may be for a Q-model that can be included in a controller. As an example, an optimized controller can include a trained Q-model and, for example, a trained compressor (e.g., encoder). For example, an optimized controller can include a trained compressor that compresses input to a latent space representation where a trained Q-model receives the latent space representation to generate one or more actions as output.

As an example, a Q-model may be understood with reference to a table, which may be a Q-table, which has a form where, for each state and for each action within that state, there is a recorded reward of that action. For a Q-table, complexity can grow quadratically with respect to states and actions. A Q-model can be generated using deep Q-learning network (DQN), where the Q-model can approximate a Q-table with a neural network. For example, consider a network that is trained using deep Q-learning where states and actions are input and Q-values are output. As an example, a system can utilize a double deep Q-learning network (DDQN). Such an approach may make training less stochastic. For example, a dueling DDQN approach can reduce experiencing chaotic regimes in training.

As to the encoder in the system 2300, as mentioned, there can be a reduction in dimension. For example, consider input to the encoder being approximately 100 items and the output of the encoder being approximately 10 items. In such an example, consider a 10×10 array as input and a 10 entry vector as output such that an approximately one order of magnitude reduction occurs through operations of the encoder.

As to the system 2300 including a variational autoencoder (VAE) that includes the encoder, the decoder and a loss function, the encoder is a neural network that receives data as input (see, e.g., observed state data) and outputs a hidden representation (see, e.g., hidden state zt), which can be referred to as a latent representation that is in a latent space (e.g., a lower dimensional space than the input). The encoder "encodes" the input by performing various computational actions that use weights and biases. The encoder effectively compresses the input into the lower-dimensional latent space. The latent space can be stochastic in that encoder can output parameters to a Gaussian probability density (e.g., a distribution), which can be sampled to get noisy values of the representations of the hidden state. The decoder of the VAE is another neural network that receives the hidden state (e.g., a latent representation of an observed state) as input and that outputs parameters to a probability distribution of the input, by performing various actions that use weights and biases. As the decoder "decodes", some information is lost as the dimensionality is increased from that of the latent space to that of the input space (e.g., from 10 to 100). The amount of lost information can be measured, for example, using a reconstruction log-likelihood with units such as nats (natural unit of information). The lost information units can characterize how well the decoder has learned to reconstruct an observed state given the latent representation of that observed state as generated by the encoder. A loss function may be, for example, a negative log-likelihood with a regularizer, where the regularizer may be given by Kullback-Leibler divergence between an encoder's distribution and a standard normal distribution of representations (e.g., $p(z)$=Normal(0,1)). In such an example, if the encoder outputs representations z that differ from those of a standard normal distribution, it will receive a penalty in the loss, where the regularizer aims to keep representations z of each observed state sufficiently diverse. As an example, a VAE may be trained using a technique such as gradient descent to optimize loss with respect to parameters of the encoder and parameters of the decoder (e.g., weights and biases). From a probability perspective, a VAE can be trained such that the encoder provides inferences, for example, the encoder can be an inference network that can infer "good" values of latent variables given observed data. In a VAE, the decoder can be a generative network that takes latent variables and outputs parameters to a data distribution. In probability model terms, a VAE refers to approximate inference in a latent Gaussian model where the approximate posterior and model likelihood are parametrized by neural networks (e.g., the inference network, which is an encoder, and a generative network, which is a decoder).

Referring again to the inference method 2105 of FIG. 21, in a neural network model sense, inference can involve prediction of latent representations given new, never-before-seen data; whereas, in a probability model sense, inference can involve inferring values of latent variables given observed data.

In the example of FIG. 23, the controller is referred to as a "full" controller as it includes the decoder, which is part of the VAE and utilized in training. A controller, as indicated, can operate on the output of the encoder (e.g., an inference network) that outputs a hidden state responsive to receipt of observed data. As explained, the hidden state can be a compressed representation of the observed data where the compressed representation is in a latent space. The Q-model can operate on the hidden state (e.g., compressed representation) to generate an output such as a control action to be taken at a particular time (e.g., time of t+1). Such a control action may or may not be suitable for implementation. For example, a MRC can be utilized to make a determination or determinations as to use of a control action from a Q-model.

In the example system 2300 of FIG. 23, the VAE, specifically the encoder, can compress observed information, for example, to speed up real time performance. As an example, a VAE approach may be utilized to handle unseen outliers by learning each feature's probability distribution. As an example, an encoder may help to damp actions output by a Q-model by compressing input data to a lesser dimensional latent space representation.

Figure 24:
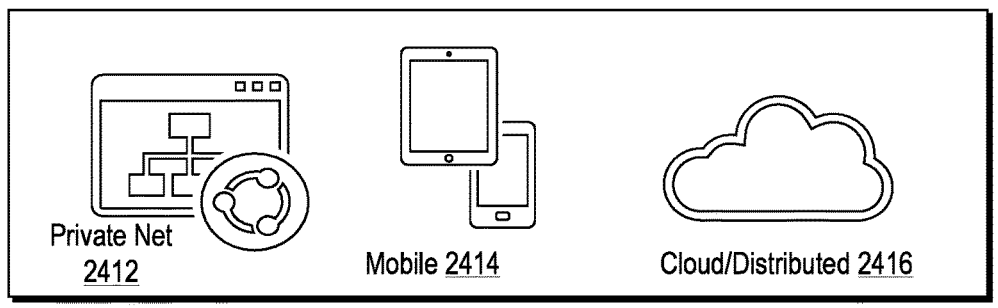
FIG. 24 illustrates examples of equipment, environments, and systems.
Figure 24:
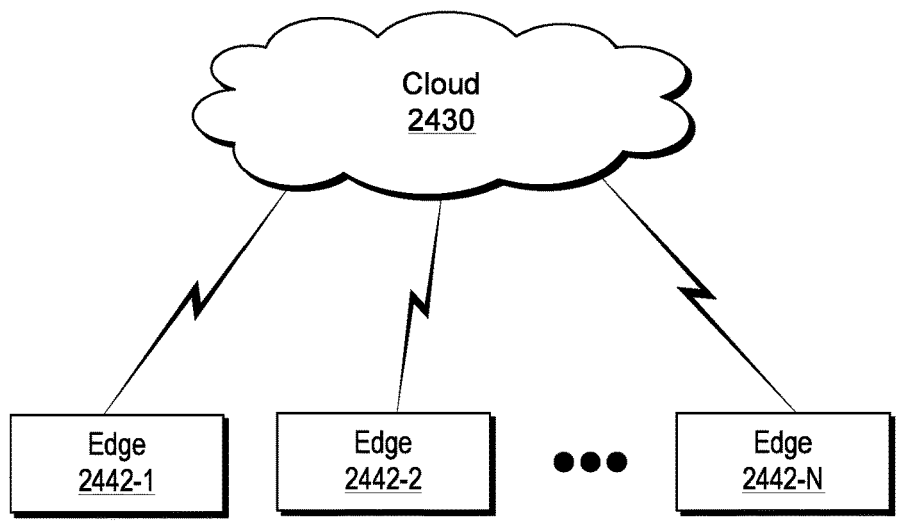
Figure 24:
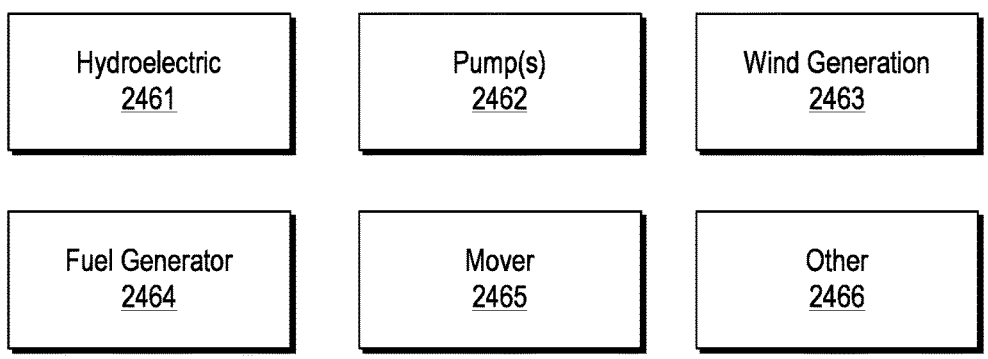

FIG. 24 shows examples of computational equipment, networks and environments such as a private network 2412, mobile computing equipment 2414 and a cloud/distributed environment 2416 along with a system 2420, which includes a cloud 2430 (e.g., computational cloud platform, etc.) and computational edge resources 2442-1, 2442-2, . . . , 2442-N.

FIG. 24 also shows some examples of systems 2460, which can include a hydraulic/water driven mover system for generating electricity 2461 (e.g., including nozzles, flow regulators, cooling equipment, lubrication equipment, one or more gearboxes, etc.), one or more pump systems 2462, one or more wind driven mover systems for generating electricity 2463, a turbine generator powered by combustible fuel or fuels 2464 (e.g., including one or more gearboxes, one or more clutches, cooling equipment, lubrication equipment, etc.), a mover system 2465 (e.g., utilizing energy to move a mass, etc.), and one or more other systems 2466.

As an example, a trained controller may be implemented at an edge in an edge environment. For example, the controller of the system 2300 of FIG. 23 may be implemented at least in part at an edge. For example, for real time operations an edge can include a trained encoder and a trained Q-model. As an example, an edge implementation or a stand-alone implementation may utilize a plurality of cores that are on-site with respect to an operation such as a hydraulic fracturing operation. Such cores may be CPU, GPU, etc., which have accessible memory located locally to the cores. As an example, an optimized controller can be equipment that includes high processing power circuitry with multiple cores.

As an example, a controller may utilize NVIDIA TENSORRT as built on a CUDA parallel programming model (NVIDIA, Santa Clara, Calif.). Such an approach may allow for inference using framework libraries, development tools and technologies in CUDA-X AI for artificial intelligence, autonomous machines, high-performance computing, and graphics. TENSORRT provides INT8 and FP16 optimizations for production deployments of deep learning inference applications, which may be for real-time services, automatic and/or embedded applications.

As an example, a workflow can include importing a trained controller component from a deep learning framework into TENSORRT. Such a workflow can include applying adjustments for performance of inferencing. For example, TENSORRT can provide for selection of platform specific kernels to maximize performance on TESLA GPUs, JETSON embedded platforms, etc.

As an example, a method can include training various neural networks with data. As an example, training may be via one or more GPU-accelerated deep learning frameworks, which may provide interfaces to one or more programming languages (e.g., PYTHON, C/C++, etc.). Some examples of DL frameworks include TENSORFLOW (Google LLC, Mountain View, Calif.), CAFFE (Convolutional Architecture for Fast Feature Embedding) (UC Berkeley, Berkeley, Calif.), PYTORCH, SCI-KIT, etc.

NVIDIA Corp. (Santa Clara, Calif.) provides a SDK for DL, which includes features for integrating deep neural networks into cloud-based or embedded applications. The SDK includes libraries that implement building block APIs for implementing training and inference directly into their apps. An approach can include scaling up in the cloud and deploying to edge devices.

As an example, the TENSORFLOW framework may be implemented, which is an open source software library for dataflow programming that includes a symbolic math library, which can be implemented for machine learning applications that can include neural networks. As an example, the CAFFE framework may be implemented, which is a DL framework. As another example, consider the SCIKIT platform (e.g., scikit-learn), which utilizes the PYTHON programming language. As an example, a framework such as the APOLLO AI framework may be utilized (APOLLO.AI GmbH, Germany).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and/or GPUs (e.g., with optional CUDA (NVIDIA Corp., Santa Clara, Calif.) and SYCL (The Khronos Group Inc., Beaverton, Oreg.) extensions for general-purpose computing on graphics processing units (GPUs)). TENSORFLOW is available on 64-bit LINUX, MACOS (Apple Inc., Cupertino, Calif.), WINDOWS (Microsoft Corp., Redmond, Wash.), and mobile computing platforms including ANDROID (Google LLC, Mountain View, Calif.) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

Figure 25:
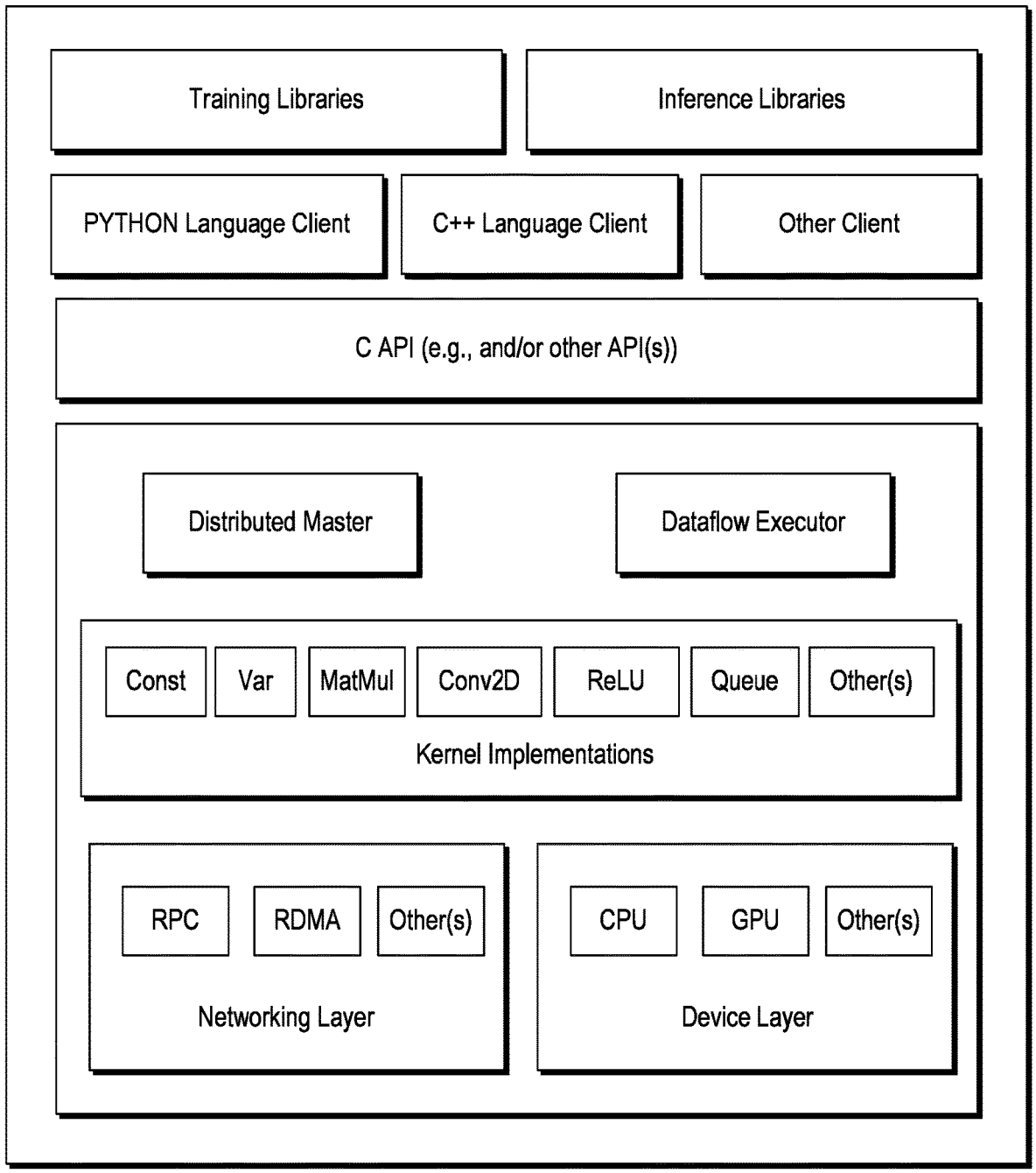
FIG. 25 illustrates an example of a framework.

FIG. 25 shows an architecture 2500 of a framework such as the TENSORFLOW framework. As shown, the architecture 2500 includes various features. As an example, in the terminology of the architecture 2500, a client can define a computation as a dataflow graph and, for example, can initiate graph execution using a session. As an example, a distributed master can prune a specific subgraph from the graph, as defined by the arguments to "Session.run( )", partition the subgraph into multiple pieces that run in different processes and devices; distributes the graph pieces to worker services; and initiate graph piece execution by worker services. As to worker services (e.g., one per task), as an example, they may schedule the execution of graph operations using kernel implementations appropriate to hardware available (CPUs, GPUs, etc.) and, for example, send and receive operation results to and from other worker services. As to kernel implementations, these may, for example, perform computations for individual graph operations.

As an example, controller optimization can be performed using a genetic algorithm (GA) approach. For example, consider a deep neuroevolution approach, which may be an evolutionary strategy (ES) approach. As an example, training may be performed at least in part using a technique that may utilize evolution (e.g., GA, ES, etc.). As an example, a technique may be a so-called gradient free method. For example, a controller may include a ML model that is trained using a gradient free method. Such a training technique can include utilizing a digital avatar of a physical asset.

Figure 26:
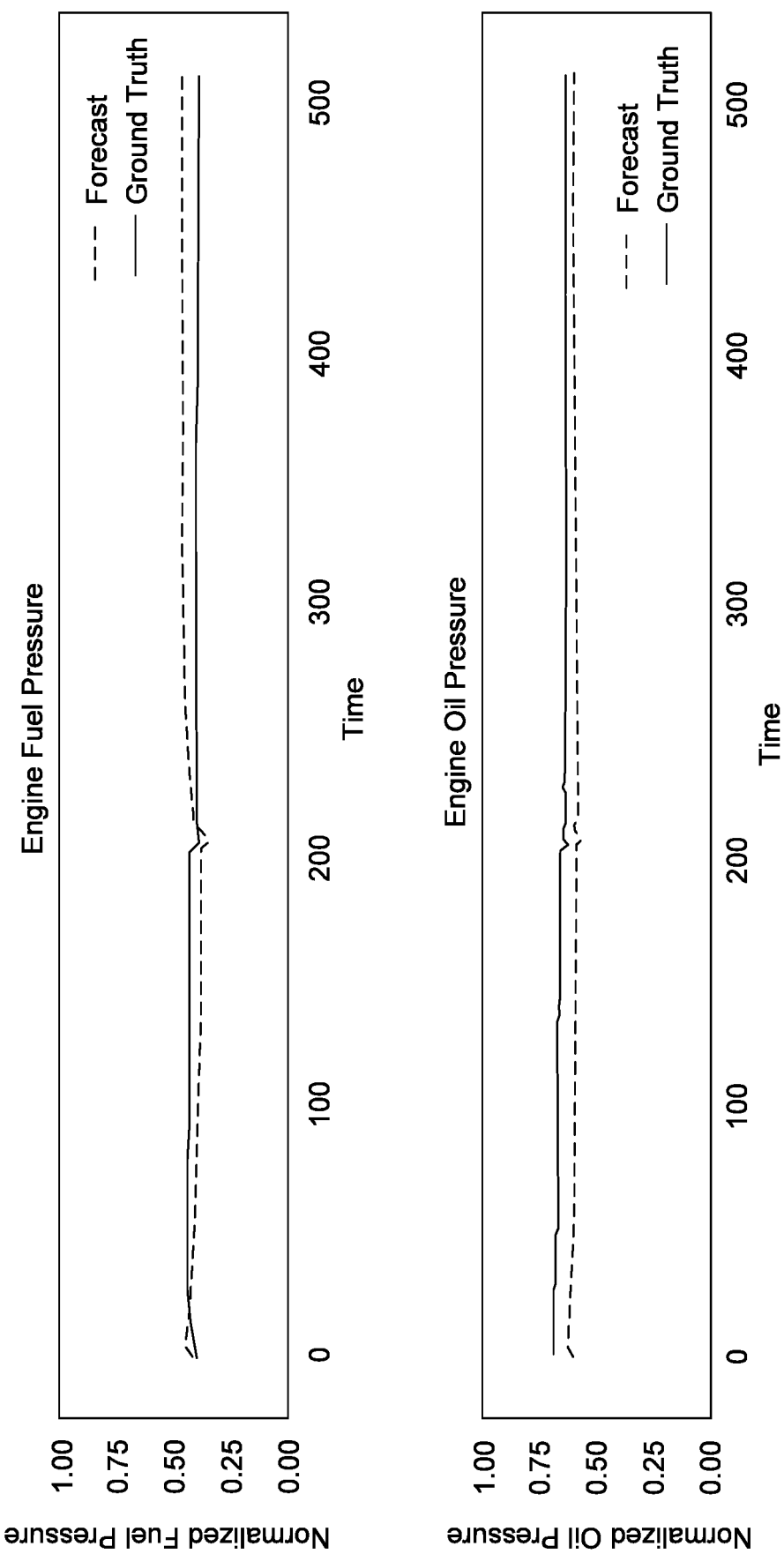
FIG. 26 illustrates examples of plots of simulation results versus actual results.

Referring again to the pump implementation, FIG. 26 shows example plots 2600 of engine fuel pressure and engine oil pressure versus time with forecast values and ground truth values. As shown, simulation results match the ground truth for an extended period of time and exhibit a variation at approximate 200 counts on the time axis that is present in the ground truth. The plots 2600 are generated using a simulator neural network such as the simulator neural network 2120 of FIG. 21. As mentioned, a reward calculator can be utilized that can include one or more reward functions that depend on one or more parameters. For example, consider a reward function that depends at least in part on engine fuel pressure and engine oil pressure. As mentioned, a reward function can utilize one or more gradients where a reward can increase or decrease in a manner dependent on parameter values.

Figure 27:
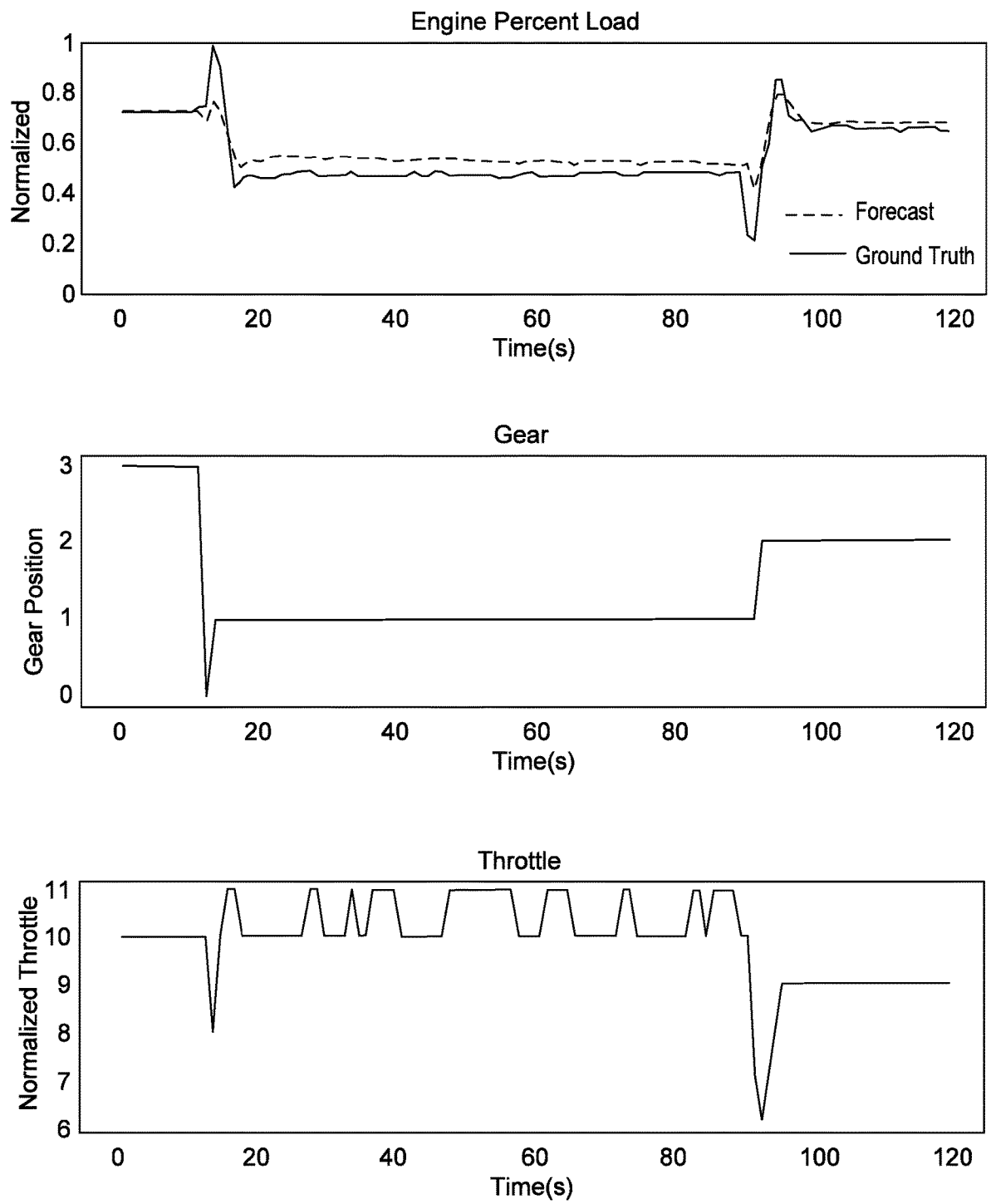
FIG. 27 illustrates examples of plots.

FIG. 27 shows example plots 2700 for engine load, gear and throttle versus time. As shown, engine load as simulated approximates actual engine load as responsive to changes in gear and/or throttle with respect to time. The plots 2700 demonstrate operation of a digital avatar, which, as explained, may be utilized for training a controller, a control component, etc. As explained, controller optimization can be performed using reinforcement learning on a digital avatar. Such an approach can, for example, utilize a ML model-based digital avatar. As an example, output of a ML model-based digital avatar can be utilized for determining a reward or rewards as a type of feedback for purposes of training a controller, a control component, etc. As explained, a reward or rewards may be utilized to train a Q-model, which can be a ML model-based Q-model. Such training can include a compressor (e.g., an encoder) that acts to reduce dimensionality of input, which can be training data input. Such an approach may help to damp output of a controller or control component, which can be utilized for making inferences, for example, as to one or more control actions. In the context of an internal combustion engine and transmission system, a control action can be, for example, a throttle setting for the internal combustion engine and a gear setting for the transmission. In combination, the output of the system can be aimed at powering equipment for a particular purpose (e.g., a pump, a power generator, etc.).

Figure 28:
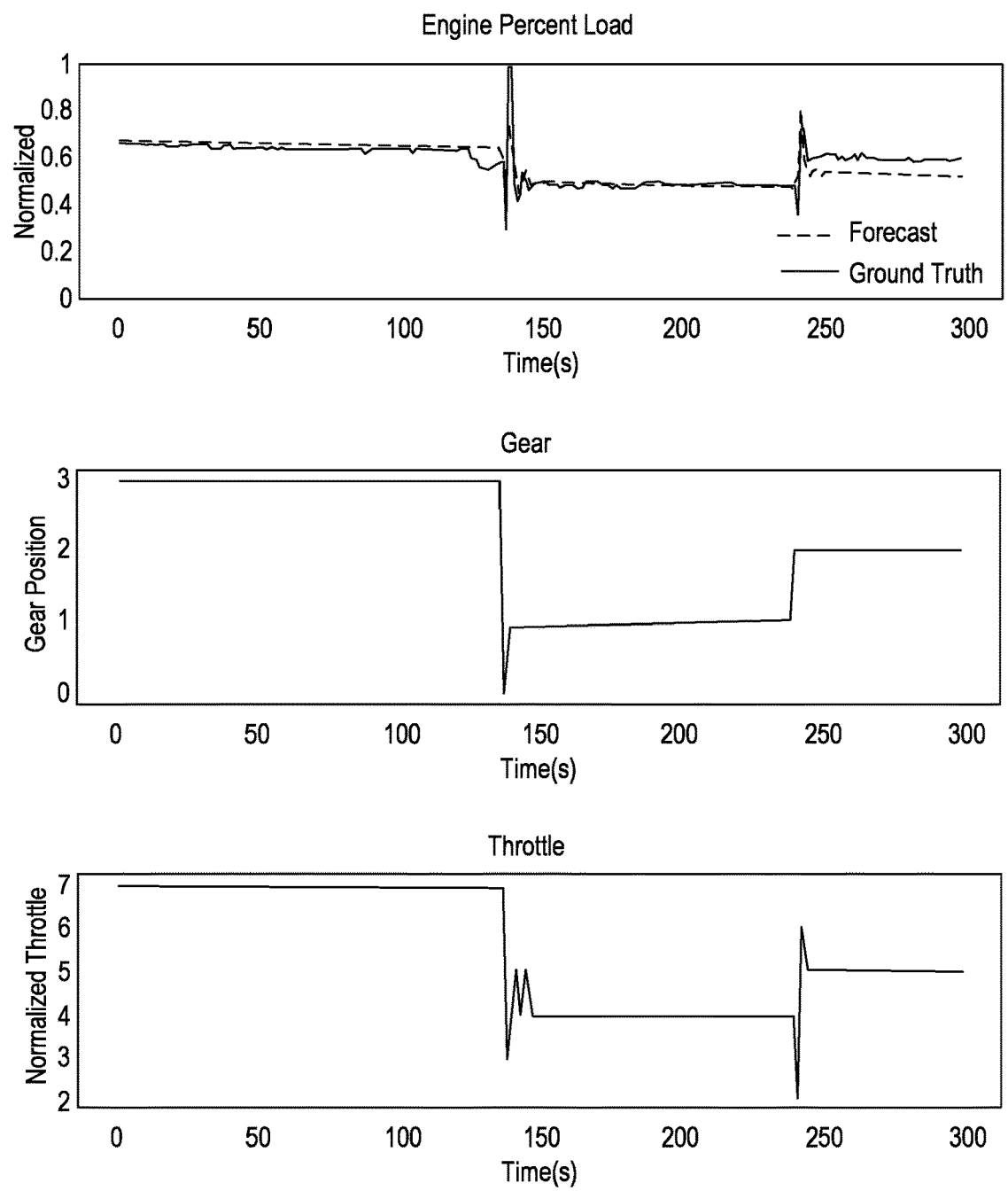
FIG. 28 illustrates examples of plots.

FIG. 28 shows example plots 2800 for engine load, gear and throttle versus time.

Figure 29:
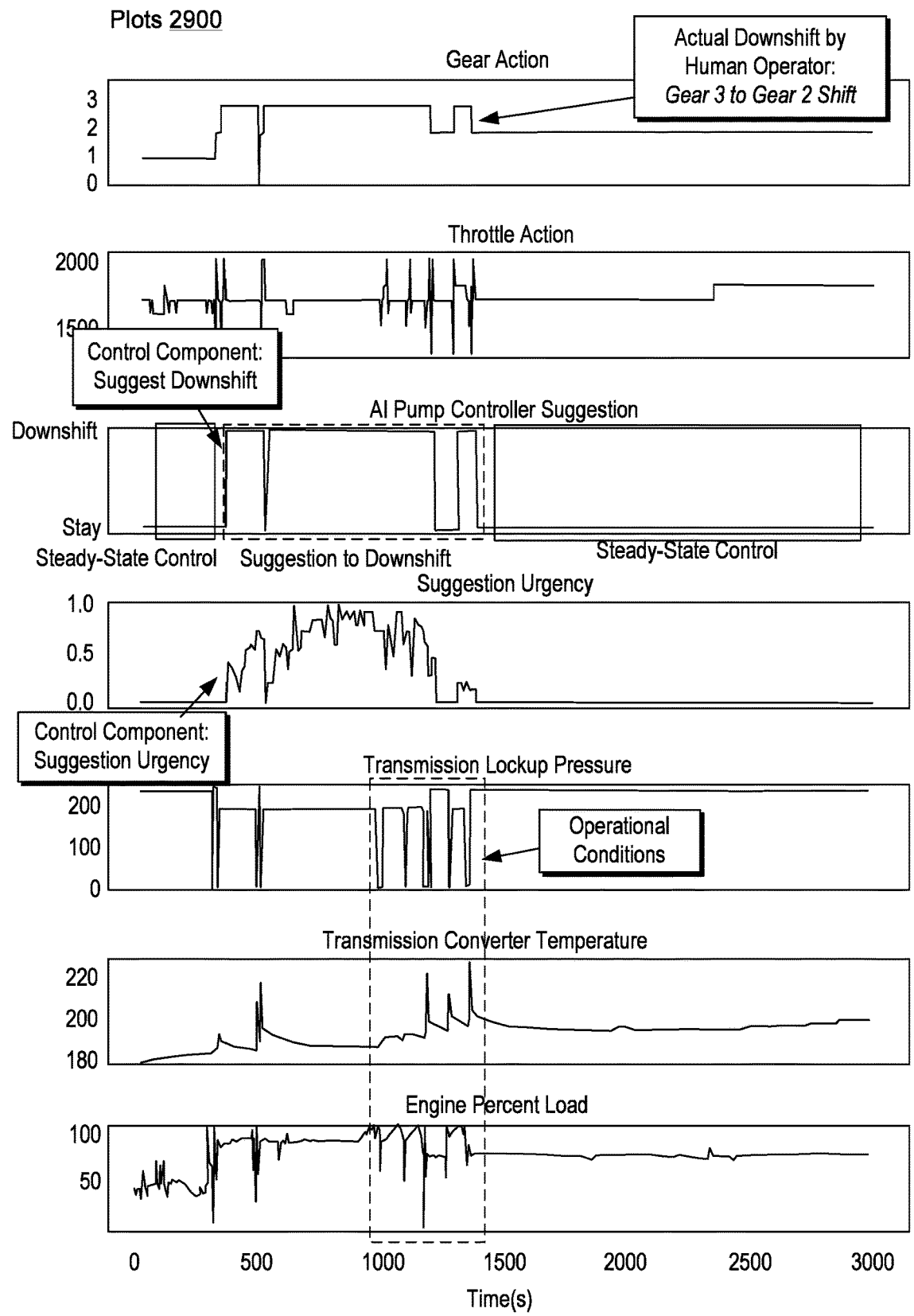
FIG. 29 illustrates examples of plots.

FIG. 29 shows plots 2900 of an example scenario where a control component (e.g., an optimized controller) outputs a recommended control action, which may be accompanied by an urgency indicator (e.g., a suggested action with a suggestion urgency).

As an example, the plots 2800 and 2900 may be considered in combination. As an example, gear, throttle and other data can be acquired as time series data for operation of an engine/transmission system or systems. As an example, a load sensor can provide engine load data versus time. As an example, a simulation component (e.g., a simulator) can generate a time series of load versus time for given input such as, for example, gear and throttle versus time.

As shown in the plots 2900, a gear is downshifted with a reduction in throttle where simulated load approximates actual load (e.g., as sensed). Then, at a later time, an upshift occurs with an accompanying change in throttle where simulated load approximates actual load. In such an example, the simulation component (e.g., trained ML model, etc.) can be a digital proxy for the engine/transmission as operatively coupled to other equipment (e.g., a pump). As to the example scenario, a recommended action is illustrated for a downshift (see, e.g., "Control Component: Suggest Downshift"). As an example, the recommended action may be implemented directly or indirectly or may be considered by an assessment component as to whether it is to be implemented. As an example, an urgency indicator may be generated at a level that persists until conditions change such as, for example, a downshift occurs. As shown, the urgency indicator is elevated for the downshift recommendation until the actual downshift occurs. As an example, the urgency values may be transformed into one or more types of indicators that may be visual, auditory and/or haptic. For example, consider a graphical user interface that includes a rendering that changes with respect to urgency, which may change in size, color, blinking rate, etc. As to auditory, consider a signal (e.g., a beep, etc.) that becomes louder, more frequent and/or different in frequency. As to haptic, consider a human input device such as a mouse that vibrates responsive to one or more urgency values, levels, etc. In the example, a manual downshift occurs; noting that a MRC or other controller feature(s) may act on a recommendation to effectuate control according to one or more recommendations and optionally, for example, based at least in part on an urgency indicator. As explained, control may be semi-automatic or automatic. As an example, a human operator may utilize a computerized system to assess a suggested action, urgency, etc., and to pass and/or halt a control instruction associated with the suggested action (e.g., a control instruction that can be transmitted to cause one or more pieces of equipment to perform an action such as, for example, a gear shift, a throttle change, etc.).

Figure 30:
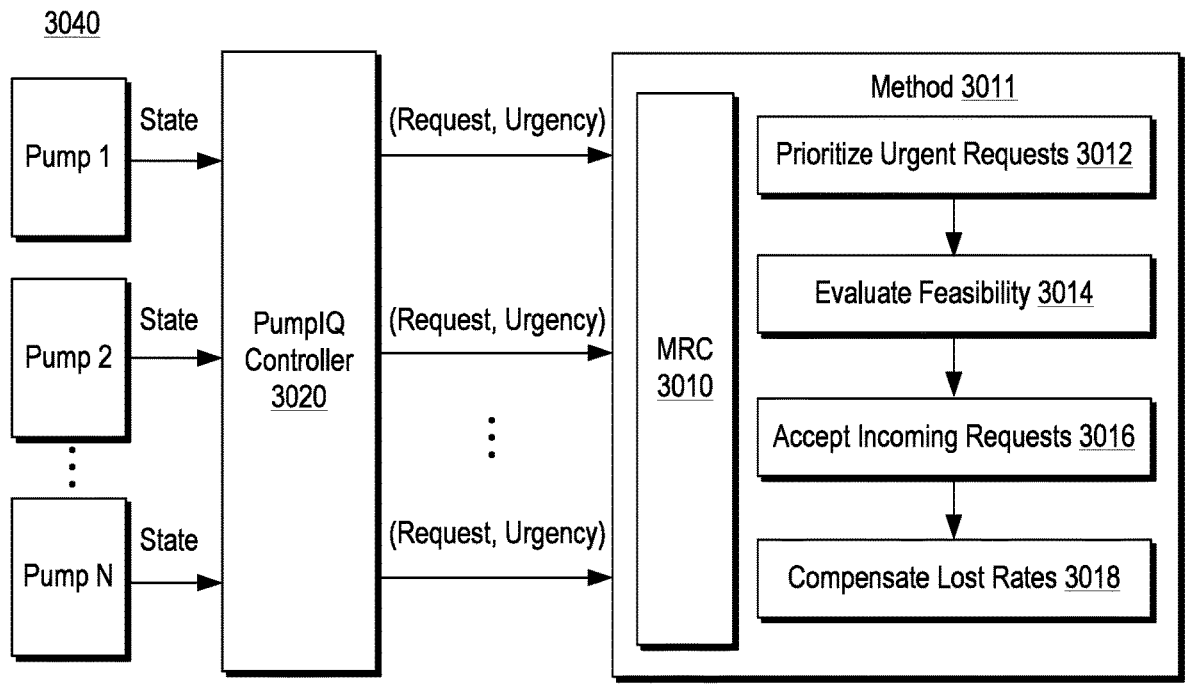
FIG. 30 illustrates an example of a system and an example of a method.

FIG. 30 shows an example of a system 3000 that includes a MRC 3010, a PumpIQ controller 3020, and pumps 3040. As shown, the MRC 3010 can provide for operation of an example of a method 3011, which includes a prioritization block 3012 for prioritizing urgent requests, an evaluation block 3014 for evaluating feasibility of meeting an urgent request, an acceptance block 3016 for accepting one or more incoming requests, and a compensation block 3018 for compensating for lost pump rate(s).

In the example of FIG. 30, the pumps 3040 can provide state information (e.g., data indicative of state) to the PumpIQ controller 3020, which can transmit one or more requests along with one or more urgency indicators to the MRC 3010, which may utilize such information, as received, to perform the method 3011 or one or more other methods.

Various features of the system 3000 are arranged in FIG. 30 in a manner whereby the PumpIQ controller 3020 and the MRC 3010 can handle fleet level integration and action, for example, consider the PumpIQ controller 3020 reading real-time condition/ states of multiple pumps 3040, recommending as applicable particular desirable actions for gear changes and/or throttle changes with a level of urgency, which the MRC 3010 may read from the PumpIQ controller 3020 and use this information to prioritize urgent requests per the block 3012, evaluate feasibility (e.g., based on equipment specs/pump curves as well as job rate demands) per the block 3014, make decisions to effect these changes per the block 3016 (e.g., accept an incoming request or requests), and compensate for one or more gear-drops with ramping up healthy pumps to pick up the slack per the block 3018.

As an example, the system 3000 or various components thereof may be arranged in an edge-cloud manner, where edge resources can be local to an operation to perform an edge workflow and where one or more edge resources can be directly or indirectly in communication with a cloud environment (e.g., a cloud platform). In such an example, the MRC 3010 may output control instructions to one or more of the pumps 3040 responsive to information received from the PumpIQ controller 3020. As explained, a PumpIQ controller may be operatively coupled to a digital avatar, which may, for example, be trained using cloud resources, optionally along with a VAE model and a PumpIQ controller model. As an example, edge resources may be loaded with one or more trained models, which may occur automatically, responsive to a command, etc. As an example, an edge operator may review a specification file as to equipment at an edge location and transmit the specification file to cloud resources where, in response, one or more trained models are received by edge resources (e.g., one or more trained models).

As an example, one or more trained models as locally present at an edge installation, may receive real-time data from equipment such as, for example, pumps. In such an example, data may be utilized by one or more trained models to generate one or more messages, which, in turn, may be directed to a MRC (e.g., directly and/or indirectly). Where the MRC issues one or more control instructions to equipment based at least in part on the one or more messages, the MRC may also provide information to the issuer of the one or more messages, for example, consider an operative container that organizes operation of the one or more trained models for responding to real-time data such as sensor data of equipment sensors. In such an example, a CCC may be included that receives real-time data and forwards such real-time data, as appropriate, to the operative container. For example, consider a control and command center (CCC) computing system that can receive data and process such data for storage (e.g., onsite and/or offsite), utilization by one or more control components, etc.

As an example, a system may utilize at an edge and/or in the cloud one or more application programming interfaces (APIs). Such APIs may facilitate loading of one or more trained models, receipt of real-time data from equipment, interactions and/or interchanges between various system components, transmission of control instructions, etc.

As mentioned, a method, a system, a controller, a digital avatar, etc., may be utilized for an operation other than pumping fluid. For example, consider power generation where one or more electrical generators may be operatively coupled to one or more prime movers. As an example, a prime mover can be operatively coupled to a transmission. A prime mover can be equipment that converts an energy source into mechanical energy. Such mechanical energy may be, for example, rotation of a shaft, reciprocation of a shaft, etc. (e.g., shaft power, etc.).

As an example, a system may be a fossil fuel power station that may be a thermal power station that burns a fossil fuel, such as coal, natural gas, etc., to produce electricity. Fossil fuel power stations include machinery to convert heat energy of combustion into mechanical energy, which then operates an electrical generator. A prime mover may be a steam turbine, a gas turbine or a reciprocating internal combustion engine. As an example, a facility can use the energy extracted from expanding gas, for example, steam, combustion gases, etc.

As an example, one or more prime movers can be operatively coupled to equipment that performs one or more operations. An operation may be or include pumping fluid, rotating a shaft, reciprocating a shaft, generating electrical energy, etc.

As an example, a system can include a fluid driven mover such as a wave driven mover, a water driven mover, a tide driven mover, a wind driven mover, etc. For example, wave energy of water waves may be a source of energy, a flowing stream or ocean current may be a source of energy, tidal level changes in water may be a source of energy, etc.

As to wind, consider a windmill or a wind turbine (see, e.g., FIG. 24). As mentioned, a power plant (e.g., fueled by coal or gas), may generate steam to provide energy to a turbine where the turbine is operatively coupled to a generator (e.g., coil(s) of wire turning in a magnetic field, etc.). Such an approach can induce electric current to flow. As to a wind turbine, rather than using a fossil fuel an energy source of a prime mover (e.g., to boil water and generate steam), wind energy is used to drive a generator and produce electricity.

A wind turbine can include a nacelle as a box at a top of a tower that includes various mechanical components (e.g., gearbox and generator). Blades can capture kinetic energy in the wind and cause gears to turn (e.g., optionally including a transmission or transmissions) to deliver power to the generator. As to variables, consider yaw of the turbine, which refers to the direction that the hub is facing, which can be rotated so that the turbine faces into the wind, and the pitch of the blades, which refers to the angle at which the blades face into the wind. Pitch control can be utilized in windy conditions, for example, to keep a gearbox from getting overloaded. In various wind turbines, the gearbox can be a source of mechanical failure.

As an example, a digital avatar can be generated of a wind turbine where various control actions can be utilized in simulations (e.g., as to power output, equipment wear, etc.). For example, consider an approach that includes a control action as to one or more of yaw and pitch. Other actions, as appropriate, may pertain to gearing (e.g., transmission shifts, etc.). As an example, a control action may include braking, which can be mechanical and/or electrical braking. A wind turbine may be instrumented with various types of sensors, which can include environmental and/or other sensors. For example, consider wind, humidity, rain, temperature, sunlight, UV, etc., as types of environmental sensors. As an example, a controller for one or more wind turbines can be optimized via reinforcement learning on a digital avatar or digital avatars. In such an example, an optimized controller can be implemented for control of one or more physical assets (e.g., one or more wind turbines, etc.).

As to components of a wind turbine, consider a nacelle as the case of the turbine which includes a gearbox and a generator; a hub connecting part for blades (e.g., attached to a low speed shaft, with a revolution speed being the same as for blades (e.g., 5 to 20 RPM)); a low speed shaft that connects the hub to the gearbox; a gearbox that transfers torque from the low speed shaft coming from hub to a high speed shaft—noting that a gearbox may be absent a low speed shaft may itself drive a generator; a generator, which may be sized inversely proportional to rotational speed, so a low-speed generator design without a gearbox may be heavier and more expensive than the combination of a gearbox and high-speed generator-noting that a generator acts to converts rotational power of the wind turbine into electricity (noting that wind may vary greatly in short period of time); a high speed shaft that can deliver power to the generator (e.g., at ~1500 RPM where a gearbox transmission ratio may be approximately 1:100 and optionally adjustable through shifting or other action etc.); a yaw mechanism that can use electric motors to rotate the nacelle around a tower axis to keep blades facing the wind (e.g., or other direction as appropriate), which may be controlled by a controller that can receive data from a wind vane; an anemometer and a wind vane that measure wind speed and direction (e.g., for use in controlling yaw and pitch mechanisms and optionally one or more other mechanisms), noting that a controller may stop a turbine when wind is lower or higher than allowed range; a controller that can be an optimized controller that includes a compressor (e.g., an encoder) and a trained ML model (e.g., a Q-model, etc.); one or more control actuators (e.g., consider yaw and pitch mechanism using a hydraulic system) and a cooling unit that can include an electrical fan to cool the generator and a radiator for cooling fluid of the gearbox (e.g., lubricant, water, etc.).

Figure 31:
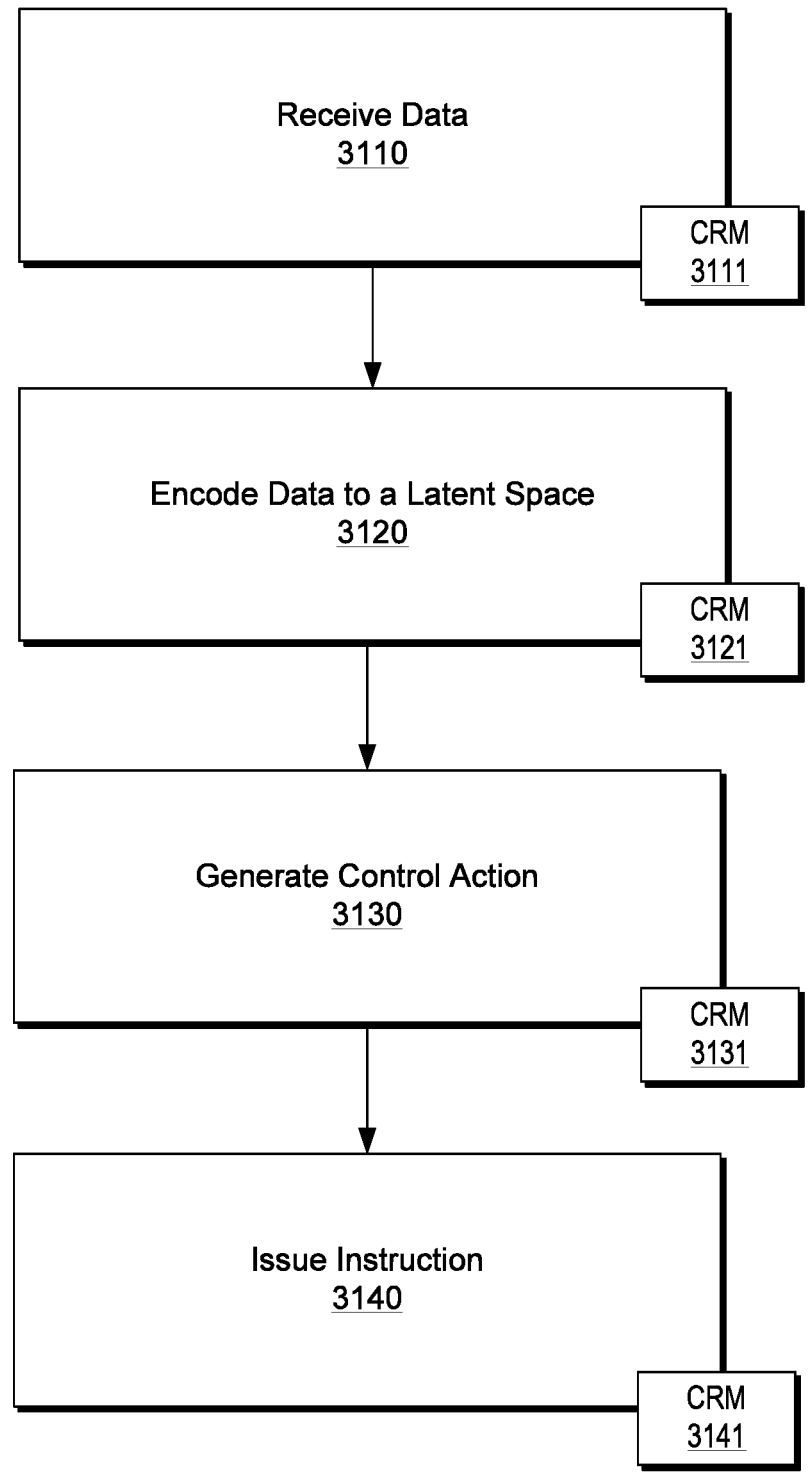
FIG. 31 illustrates an example of a method.

FIG. 31 shows an example of a method 3100 that includes a reception block 3110 for receiving data; an encoding block 3120 for encoding the data to a latent space representation; a generation block 3130 for generating a control action using the latent space representation; and an issue block 3140 for issuing an instruction.

FIG. 31 also shows various computer-readable media (CRM) blocks 3111, 3121, 3131 and 3141. Such blocks can include instructions that are executable by one or more processors, which can be one or more processors of a computational framework, a system, a computer, etc. A computer-readable medium can be a computer-readable storage medium that is not a signal, not a carrier wave and that is non-transitory. For example, a computer-readable medium can be a physical memory component that can store information in a digital format.

As an example, the method 3100 can include the reception block 3110 for receiving sensor data from a system; the encode block 3120 for encoding the sensor data to a latent space representation via a trained encoder; the generation block 3130 for generating a control action using the latent space representation; and the issue block 3140 for issuing an instruction that corresponds to the control action for control of the system.

As an example, a method can include receiving data; encoding the data to a latent space representation; and generating a control action using the latent space representation. Such a method can include encoding via a trained encoder of a variational autoencoder and/or generating the control action via a trained Q-model.

As an example, a method can include receiving time-series data. As an example, a method can include assessing a control action using a simulator and, for example, deciding whether to implement the control action based on output of the simulator.

As an example, a control action can provide for one or more of control of a prime mover, control of a transmission operatively coupled to a prime mover, control of a relationship between a prime mover and an energy source, control of equipment disposed between a prime mover and a pump, control of a pump system, control of a system within a fleet of systems. As an example, control action can provide for control of equipment disposed between a prime mover and rotating machinery such as in a pump.

As an example, a method can include providing training data to a controller; generating a control action using the controller; simulating a state based on the control action; generating a reward based on the simulated state; and using the reward to adjust one or more parameters of the controller. In such an example, the controller can include an encoder and a Q-model. For example, consider an encoder of a variational autoencoder.

As an example, a method can include generating a reward utilizing at least one datum-dependent reward function. For example, consider a datum-dependent reward function that includes a gradient where a reward increases or decreases depending on a value of the datum. As an example, reward function may be dependent on more than one datum (e.g., data-dependent reward function).

As an example, a method can include outputting a trained controller and, for example, using the trained controller to control at least one piece of equipment.

As an example, training data may be associated with heterogeneous equipment. As an example, a digital avatar may be a virtual representation of such heterogeneous equipment. As an example, where a fleet of systems is a system of physical assets, a digital avatar may be a virtual representation of an individual system and may provide for simulation of behaviors of each of the individual systems. For example, consider generating a digital avatar using training data from a fleet of equipment, which may be heterogeneous. As an example, a digital avatar of a physical asset can be utilized in training a controller (e.g., a Q-model, etc.) where the trained controller (e.g., a trained Q-model, etc.) can be utilized to control (e.g., directly and/or indirectly) the physical asset.

As an example, a method can include outputting a trained controller that is configured to control heterogeneous pieces of equipment.

As an example, training data can include pump data and a method can include outputting a trained controller for controlling pumps. As to other types of data, consider prime mover data, transmission data, generator data, etc., which may be utilized to generate a controller for control of one or more systems (see, e.g., FIG. 24).

As an example, a system can include a real time data interface; a compressor operatively coupled to the real time data interface; and a controller operatively coupled to the compressor, where the compressor receives real time data via the real time data interface and outputs reduced dimensionality data of the real time data and where the controller generates a control action using the reduced dimensionality data. In such an example, the compressor can be or include an encoder, which may be a trained encoder of a variational autoencoder (VAE).

As an example, a controller can include a trained machine model where, for example, the trained machine model is or includes a Q-model.

As an example, a system can operate to generate and utilize reduced dimensionality data, which may be in a latent space.

As an example, a system can output control action that provides for optimal asset utilization and/or optimal asset performance. As an example, a system may include a digital avatar, which may be a digital avatar of a physical asset.

As an example, a system can output control action that calls for at least one of enabling running with less equipment, running equipment according to a desired operating range to reduce failure and increase reliability, automatically adjusting at least one operating range to improve consistency and failure prediction, and reducing fuel consumption by optimizing equipment performance.

As an example, a method can include receiving sensor data from a system; encoding the sensor data to a latent space representation via a trained encoder; generating a control action using the latent space representation; and issuing an instruction that corresponds to the control action for control of the system. In such an example, the trained encoder can be a trained encoder of a variational autoencoder (VAE).

As an example, a method can include generating a control action via a trained Q-model. For example, consider using a latent space representation as an encoded (e.g., compressed) representation of sensor data for input to a trained Q-model where the Q-model can generate an action that can be a control action. As explained, for an example of a pump system, the action may be to stay at a current gear, downshift a gear or gears, upshift a gear or gears, etc. In such an example, where a gear change is indicated, an instruction can be issued to a pump system to cause a gear change. While a pump system and gear change are mentioned, a method may utilize a trained encoder and a Q-model for one or more other types of systems and/or control actions. As an example, another type of control action may be to adjust a throttle. For example, consider generating a control action to adjust a throttle of a prime mover and issuing an instruction that causes a throttle to adjust (e.g., increase or decrease). As explained, various types of prime movers can include a throttle (e.g., for fuel, etc.) and may be operatively coupled to a transmission. In such examples, sensor data may be received and encoded by a trained encoder to generate a latent space representation that can be utilized by a Q-model to generate a control action or control actions, which may include adjusting a throttle, adjusting a transmission (e.g., changing a gear) or adjusting a throttle and adjusting a transmission.

As an example, a method can include assessing a control action using a simulator. For example, consider outputting a control action to a simulator where the control action may be generated using a Q-model that receives information, directly or indirectly, from an encoder, which may be a trained encoder that encodes data such as, for example, sensor data. In such an example, the sensor data can be from equipment where the simulator can act to simulate operation of at least a portion of the equipment. In such an example, the simulator can generate simulation output, which may be assessed to determine how implementation of the control action (or control actions) may affect an operation or operations that utilize at least a portion of the equipment. As an example, a method can include deciding whether to issue an instruction that corresponds to a control action based on output of a simulator.

As an example, an instruction that corresponds to a control action may provide for control of a prime mover of a system, may provide for control of a transmission operatively coupled to a prime mover of a system, may provide for control of a relationship between a prime mover of a system and an energy source, may provide for control of equipment of a system disposed between a prime mover and rotating machinery (e.g., consider equipment that couples or transforms energy of a prime mover for driving rotation of the rotating machinery).

As an example, a system can be or include a pump system. As an example, a system can be or include a fleet of pump systems.

As an example, a method can include use of a trained encoder that is part of a trained controller where such a method can include generating the trained controller by providing training data to a controller; generating a control action using the controller; simulating a state based on the control action; generating a reward based on the simulated state; and using the reward to adjust one or more parameters of the controller to generate the trained controller. In such an example, the controller can include a Q-model where, for example, the Q-model is represented using a neural network.

As an example, a method can include generating a reward by utilizing at least one datum-dependent reward function, where, for example, the datum-dependent reward function includes a gradient and where a reward output by the datum-dependent reward function increases or decreases depending on a value of the datum (e.g., according to the gradient, etc.). In such an example, a gradient may be linear and/or nonlinear. As an example, a reward function may be multidimensional in that a reward value can depend one or more datums (data). As mentioned with respect to the example reward function 2200 of FIG. 22, a relationship may exist between operational data and a reward value. As an example, operational data may be sensor data and/or derived from sensor data. As an example, sensor data can include data indicative of a physical phenomenon or physical phenomena.

As an example, a method can include training one or more models, features, etc., of a controller using training data. As an example, training data can be associated with heterogeneous equipment such that, for example, a trained controller can be configured to control heterogeneous pieces of equipment of a system. As to heterogeneity, differences in model, manufacturer, history (e.g., use, service, etc.), may be measures of heterogeneity. As an example, a method can include specifying and/or tracking characteristics of a system, which may provide for indications as to how homogeneous and/or heterogeneous the system is and/or becomes.

As an example, a system can include a real time data interface; a compressor operatively coupled to the real time data interface; and a controller operatively coupled to the compressor, where the compressor receives real time data via the real time data interface and outputs reduced dimensionality data of the real time data and where the controller generates a control action using the reduced dimensionality data. In such an example, the controller can include a trained encoder of a variational autoencoder as the compressor and, for example, the controller can include a Q-model as a trained machine model.

As an example, a system can generate a control action that calls for at least one of enabling running with less equipment, running equipment according to a desired operating range to reduce failure and increase reliability, automatically adjusting at least one operating range to improve consistency and failure prediction, and reducing fuel consumption by optimizing equipment performance.

As an example, one or more computer-readable storage media can include processor-executable instructions executable to instruct a computing system to: receive sensor data from a system; encode the sensor data to a latent space representation via a trained encoder; generate a control action using the latent space representation; and issue an instruction that corresponds to the control action for control of the system.

As an example, a system may include instructions, which may be provided to analyze data, control a process, perform a task, perform a workstep, perform a workflow, etc.

Figure 32:
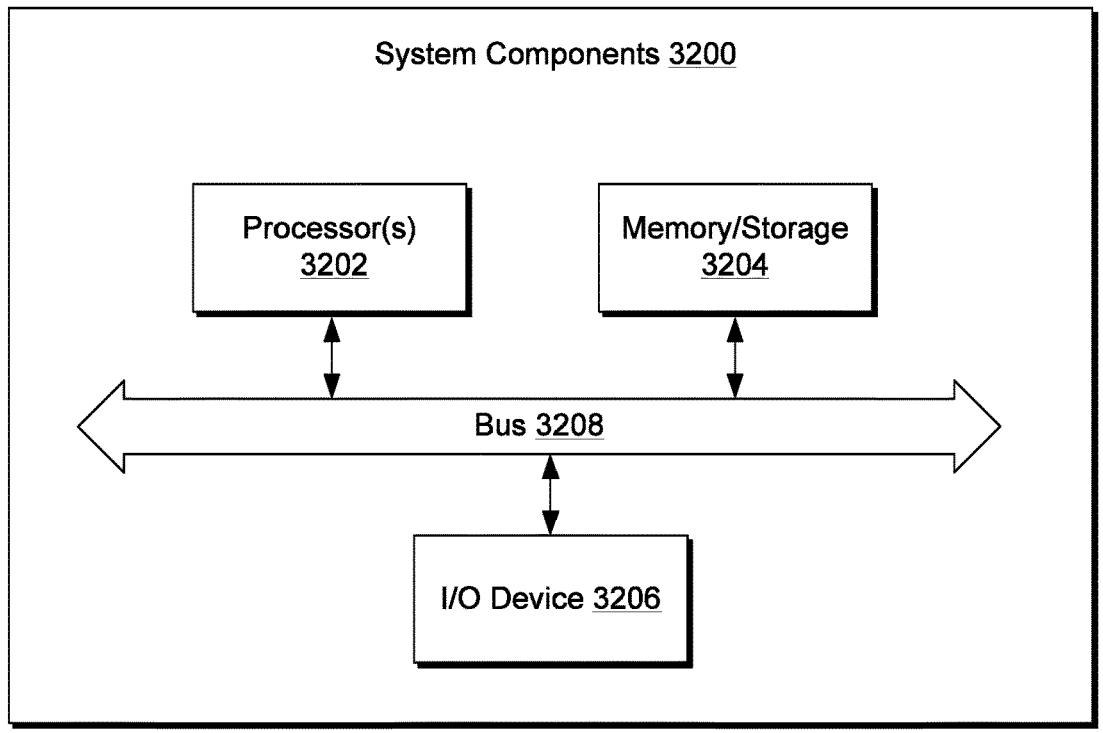
FIG. 32 illustrates example components of a system and a networked system.
Figure 32:
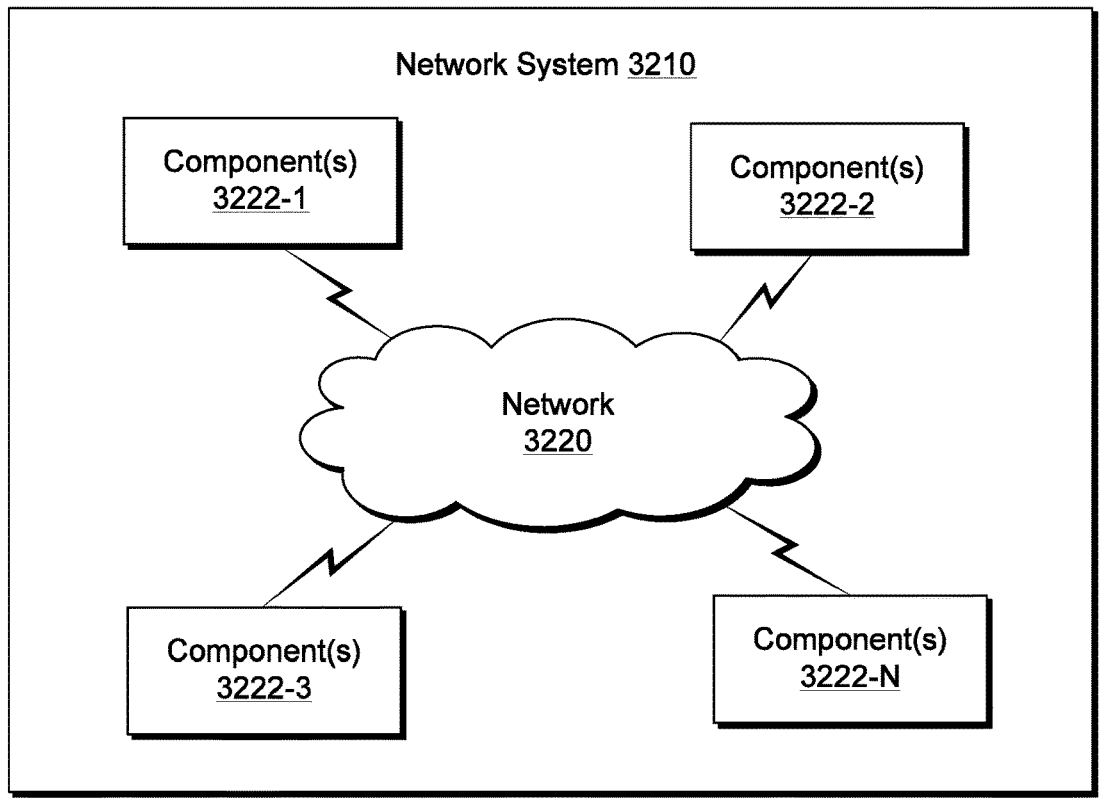

FIG. 32 shows components of an example of a computing system 3200 and an example of a networked system 3210. The system 3200 includes one or more processors 3202, memory and/or storage components 3204, one or more input and/or output devices 3206 and a bus 3208. In an example embodiment, instructions may be stored in one or more computer-readable media (e.g., memory/storage components 3204). Such instructions may be read by one or more processors (e.g., the processor(s) 3202) via a communication bus (e.g., the bus 3208), which may be wired or wireless. The one or more processors may execute such instructions to implement (wholly or in part) one or more attributes (e.g., as part of a method). A user may view output from and interact with a process via an I/O device (e.g., the device 3206). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 3210. The network system 3210 includes components 3222-1, 3222-2, 3222-3, . . . 3222-N. For example, the components 3222-1 may include the processor(s) 3202 while the component(s) 3222-3 may include memory accessible by the processor(s) 3202. Further, the component(s) 3222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

Bibliography: The following documents are incorporated by reference herein:

Mnih, Volodymyr, et al. "Human-level control through deep reinforcement learning." Nature 518.7540 (2015): 529.

Van Hasselt, Hado, Arthur Guez, and David Silver. "Deep reinforcement learning with double q-learning." Thirtieth AAAI Conference on Artificial Intelligence. 2016, pp. 2094-2100 (arXiv preprint arXiv:1509.06461, 2015).

Wang, Ziyu, et al. "Dueling network architectures for deep reinforcement learning." arXiv preprint arXiv: 1511.06581 (2015).

What is claimed is:

1. A method, comprising:
   receiving, via a controller, a digital avatar that corresponds to physical equipment configured to perform one or more operations in a system;
   generating, via the controller using reinforcement learning, an optimized controller based on the digital avatar, wherein the optimized controller is configured to control the physical equipment in the system;
   receiving, via the optimized controller, sensor data associated with the one or more operations from the system;
   encoding, via a trained encoder associated with the optimized controller, the sensor data to a latent space representation;
   generating, via a Q-model associated with the optimized controller, a control action associated with the physical equipment using the latent space representation; and
   issuing, via the optimized controller, an instruction that corresponds to the control action.

2. The method of claim 1, wherein the trained encoder is a trained encoder of a variational autoencoder.

3. The method of claim 1, comprising assessing the control action using the digital avatar.

4. The method of claim 3, comprising deciding whether to issue the instruction based on output of the digital avatar.

5. The method of claim 1, wherein the physical equipment comprises a prime mover of the system.

6. The method of claim 1, wherein the physical equipment comprises a transmission operatively coupled to a prime mover of the system.

7. The method of claim 1, wherein the physical equipment comprises a prime mover of the system, and the instruction provides for control of a relationship between the prime mover and an energy source.

8. The method of claim 1, wherein the physical equipment is disposed between a prime mover and rotating machinery.

9. The method of claim 1, wherein the system comprises a pump system.

10. The method of claim 1, wherein the system comprises a fleet of pump systems.

11. The method of claim 1, comprising:
    simulating, via the digital avatar, a state based on the control action;
    generating a reward based on the simulated state; and
    using the reward to adjust one or more parameters of the controller to generate the optimized controller.

12. The method of claim 11, wherein the controller comprises the Q-model.

13. The method of claim 12, wherein the Q-model is represented using a neural network.

14. The method of claim 11, wherein generating the reward comprises utilizing at least one datum-dependent reward function, wherein the datum-dependent reward function comprises a gradient, and wherein a reward output by the datum-dependent reward function increases or decreases depending on a value of the datum.

15. The method of claim 11, wherein the physical equipment comprises heterogeneous equipment and wherein the optimized controller is configured to control the heterogeneous equipment of the system.

16. A system comprising:
a real time data interface;
a compressor operatively coupled to the real time data interface; and
a controller operatively coupled to the compressor;
wherein the compressor:
receives real time sensor data associated with one or more operations via the real time data interface; and
outputs reduced dimensionality data of the real time data; and
wherein the controller:
generates an optimized controller using reinforcement learning based on a digital avatar that corresponds to physical equipment configured to perform the one or more operations, wherein the optimized controller is configured to control the physical equipment; and
generates, via the optimized controller, a control action associated with the physical equipment using the reduced dimensionality data.

17. The system of claim 16, wherein the controller comprises a trained encoder of a variational autoencoder as the compressor and wherein the controller comprises a Q-model as a trained machine model.

18. The system of claim 16, wherein the control action calls for at least one of enabling running with less equipment, running the physical equipment according to a desired operating range to reduce failure and increase reliability, automatically adjusting at least one operating range to improve consistency and failure prediction, and reducing fuel consumption by optimizing equipment performance.

19. One or more non-transitory, computer-readable storage media comprising processor-executable instructions executable to instruct a computing system to perform operations comprising:
optimizing the computing system using reinforcement learning based on a digital avatar that corresponds to physical equipment configured to perform one or more operations in a system, wherein the optimized controller is configured to control the physical equipment;
receiving sensor data associated with the one or more operations from the system;
encoding the sensor data to a latent space representation via a trained encoder;
generating, via a Q-model, a control action associated with the physical equipment using the latent space representation; and
issuing an instruction that corresponds to the control action.

* * * * *